US005906468A

United States Patent [19]

Vander Syde et al.

[11] Patent Number: 5,906,468

[45] Date of Patent: May 25, 1999

[54] PIVOTAL TRAY UNLOADING APPARATUS

[75] Inventors: Gary L. Vander Syde, Naperville; Anatoly Estis, Morton Grove; Jose S. Pioquinto, Des Plaines; Eduard Svyatsky, Libertyville, all of Ill.

[73] Assignee: Bell & Howell Postal Systems Inc., Lincolnwood, Ill.

[21] Appl. No.: 08/691,698

[22] Filed: Aug. 1, 1996

Related U.S. Application Data

[63] Continuation-in-part of application No. 08/532,274, Sep. 22, 1995.

[51] Int. Cl.[6] .................... B65G 65/00

[52] U.S. Cl. .................... 414/403; 414/786

[58] Field of Search .................... 414/419–421, 414/403, 425, 776, 778, 779, 788, 790, 786, 917; 271/158, 159, 218; 198/468.6

[56] References Cited

U.S. PATENT DOCUMENTS

| | | | |
|---|---|---|---|
| 2,727,641 | 12/1955 | Tomkins | 414/421 X |
| 3,703,242 | 11/1972 | Marradi | 414/403 X |
| 4,688,980 | 8/1987 | Kikuchi et al. | 414/421 X |
| 4,690,603 | 9/1987 | Graner | 414/421 X |
| 4,830,564 | 5/1989 | Walker et al. | 414/421 X |
| 4,979,864 | 12/1990 | Cahlander et al. | 414/421 |
| 5,044,877 | 9/1991 | Constant et al. | 271/158 X |
| 5,059,090 | 10/1991 | Bobroff et al. | 404/778 X |
| 5,209,629 | 5/1993 | Rasmussen | 414/779 X |
| 5,271,710 | 12/1993 | Decharran et al. | 414/421 X |
| 5,302,073 | 4/1994 | Riemersma et al. | 414/421 |
| 5,358,372 | 10/1994 | Meredith | 414/779 X |
| 5,435,688 | 7/1995 | Tokunaga et al. | 414/421 X |
| 5,507,614 | 4/1996 | Leonov et al. | 414/778 X |
| 5,551,336 | 9/1996 | Griffin et al. | 414/421 X |
| 5,558,485 | 9/1996 | Haynes | 414/421 |
| 5,567,105 | 10/1996 | Williams | 414/421 X |

OTHER PUBLICATIONS

"Back To Basics On Flats Feeding", Rabindran, Faber, Filicicchia, Guenther, Kalika and Kerstein—Advanced Technology Conference Nov. 30–Dec. 2, 1992 vol. 1, pp. 19–31.

*Primary Examiner*—David A. Bucci

*Attorney, Agent, or Firm*—Sonnenschein Nath & Rosenthal

[57] ABSTRACT

The apparatus is used to remove a generally rectangular container from an unloading device that places the container in a predetermined position. The container has a bottom surface, upstanding sidewalls and forward and rear endwalls. The apparatus includes a base portion for supporting the apparatus and a container removing arm pivotally attached to the base portion configured to releasably engage the container and remove the container from the unloading device. Also included are container engaging clamps operatively connected to the container removing arm arranged to contact and releasably engage at least one of the bottom surface, the upstanding sidewalls, the forward endwall, and the rear endwall of the container. A powered assembly pivotally displaces the container removing arm when the clamps releasably engage the container. A controller is operatively coupled to the powered assembly to selectively control forward and backward pivoting of the arm. The controller is also operatively coupled to the container engaging clamps to selectively control engagement of the clamps such that backward pivoting of the arm while the clamps engage the container facilitates removal of the container from the unloading device when the arm is pivoted in a backward direction.

20 Claims, 41 Drawing Sheets

193
196
312
30
310
401
308
16
402
399
8°
400
192
28
404
14
26
96
414
94
18
160
414
410
412

PIVOTAL TRAY UNLOADING APPARATUS

This patent/patent application is a continuation-in-part of Ser. No. 08/532,274 filed on Sep. 22, 1995 entitled Pivotal Tray Unloading Apparatus and currently pending.

BACKGROUND OF THE INVENTION

The present invention relates generally to document handling systems, and more specifically to a novel method and apparatus for efficiently depositing a stack of documents onto a feed ramp which conveys the documents toward sequential processing stations.

It is common practice in the automated handling of documents, such as mailing envelopes and flats, to progressively feed a stack of documents in a feeder station, feed ramp or magazine to a shingling station and then to a singulating station. The documents are then directed from the singulating station as separated single documents to sorting stations or other processing stations and devices.

Postal requirements demand that a high volume of documents be handled in a short period of time. Typically, document handling devices are required to process thousands of documents per hour with a minimum of sorting defects and product damage. If documents cannot be fed rapidly enough to the processing stations, system throughput is reduced.

Typically, the first stage in the document handling process after the documents have been placed in a container or tray with the address labels or indicia facing the same direction, is to load the stack of documents onto some form of feed transport mechanism, such as a conveyor belt mechanism. The tray is then generally grasped by an operator, lifted, and essentially "dumped" onto a feed ramp or conveyor belt device. The conveyor mechanism then directs the documents toward the various separators, shinglers and sorting devices.

Known systems and methods typically require substantial human intervention and action to load the stacks of documents from the tray onto the document transport mechanism. The operator must gather the stack of documents or lift the tray and place the documents on the conveyor belt so that all of the documents are in an on-edge orientation. The trays containing the documents are heavy and cumbersome and typically require up to forty-five to sixty seconds or longer to unload. Such manual unloading often causes the edges of the documents to become unaligned which further reduces system throughput as the documents are routed to the various processing stations.

Often, multiple operators are employed to unload multiple trays in an attempt to increase system throughput. Hiring multiple operators to perform the same repetitive operation is expensive and inefficient. Additionally, the above-described unloading process must be performed while taking steps to prevent a previously unloaded stack of documents from falling over. Unloading is typically performed as the conveyor belt is continuously advancing the stack of documents toward the various processing stations. This is a time-intensive process and is one of the limiting factors in achieving high-speed document processing and throughput. Such inefficient steps increase document processing costs and may even cause operator injury, such as repetitive stress injuries.

The documents are typically transported to an initial processing station, such as a shingling station, prior to singulation. Shingling results in orienting either the top or bottom document in a vertical stack, or the front or lead document in a stack, so that the forward or leading edge of each successive top, bottom or front document is disposed slightly forwardly or laterally of the leading edge of the next adjacent document, preferably by a distance of approximately one inch. By shingling the stacked documents, only one document at a time will enter a nip defined by singulating belts or rollers, thereby substantially reducing the possibility that more than one document at a time will be fed simultaneously through the singulating belts or rollers. The singulating belts or rollers then transport each document in an on-edge single file manner towards other sorting and processing devices. The present invention can also be used to feed documents sequentially into a singulation apparatus, where shingling of the documents is not required.

Thus, a method and apparatus which significantly increases the efficiency of loading stacks of documents onto a conveyor system would greatly improve the rate at which documents could be handled in a document processing system.

Accordingly, it is a object of the present invention to substantially overcome the above-described problems.

It is another object of the present invention to provide a novel tray unloading apparatus which allows rapid and efficient unloading of documents from a tray or bin onto a conveyor system.

It is a further object of the present invention to provide a novel tray unloading apparatus able to provide document processing stations with documents at a rate of over ten thousand documents per hour.

It is also an object of the present invention to provide a novel tray unloading apparatus configured to urge the edges of the documents against reference surfaces.

It is still an object of the present invention to provide a novel tray unloading apparatus that promotes ergonomically correct manipulation and unloading of trays of documents.

It is yet another object of the present invention to provide a novel tray unloading apparatus that automatically urges the documents towards a parallel orientation relative to a bottom and a side wall of a feed ramp device.

It is also an object of the present invention to provide a novel tray unloading apparatus that allows a tray to be unloaded by a single operator in less than thirteen seconds.

It is yet a further object of the present invention to provide a novel tray unloading apparatus that allows a reduction in the number of workers required to unload documents from the trays.

It is still a further object of the present invention to provide a novel tray unloading apparatus having pneumatic actuators to control movement of the apparatus under computer control.

It is another object of the present invention to provide a novel tray unloading apparatus that automatically pivots and rotates a container or tray of documents under computer control.

It is a further object of the present invention to provide a novel tray unloading apparatus having a tray removing portion that automatically engages the tray and removes the tray from the unloading apparatus after the documents are in position to be unloaded from the tray.

SUMMARY OF THE INVENTION

The disadvantages of known tray unloading devices are substantially overcome with the present invention by providing a novel pivotal tray unloading apparatus for unloading trays or containers of documents onto a conveyer belt system. The present apparatus permits a stack of documents to be unloaded from a container or tray in less than or equal to thirteen seconds. This represents a substantial reduction in time over manual methods of unloading documents, which may require forty-five to sixty seconds to unload a single tray. A greater quantity of documents can be unloaded using fewer workers resulting in higher document throughput and reduced costs. Additionally, the apparatus provides an ergonomically correct approach to unloading heavy containers of documents by supporting the load of the documents at critical points and by partially mechanizing the manipulation of such documents. This, in part, may reduce physical injury to workers and may also reduce repetitive stress related injuries.

More specifically, the pivotal tray unloading apparatus is directed to unloading a plurality of generally rectangular documents onto a feed ramp where the documents are disposed in a generally rectangular container. The container has a bottom surface, upstanding sidewalls and forward and rear endwalls. The apparatus has a primary axis defined to be coaxial with the common edge of the bottom surface and the rear endwall of the container.

The apparatus includes a first generally planar reference surface, a second generally planar reference surface fixedly attached to the first reference surface at a substantially right angle, where the second reference surface has a support paddle operatively coupled thereto. The first and second reference surfaces are configured to pivot forwardly and backwardly about the primary axis where forward pivoting of the reference surfaces causes the first reference surface to engage the rear endwall of the container and maintain planar contact therewith.

The rearward pivoting of the reference surfaces effects registration of the plurality of documents toward the first reference surface such that first common edges of the documents are in planar alignment therewith. The first and second reference surfaces are configured to rotate leftwardly and rightwardly about a longitudinal axis where the longitudinal axis is perpendicular to the primary axis. Leftward rotation of the reference surfaces and the container, simultaneously, effects registration of the plurality of documents toward the second reference surface such that second common edges of the documents are in planar alignment with the second reference surface where the second common edges are perpendicular to the first common edges of the documents.

Rightward rotation of the reference surfaces and the container, simultaneously, effects positioning the documents in an on-edge orientation in a generally coplanar relationship with the feed ramp such that the documents have first and second common edges in registration with the first and second reference surfaces, respectively.

A method for unloading a plurality of generally rectangular documents includes the steps of (a) positioning the container at a rest position on a generally flat feed ramp such that a common edge between the bottom surface of the container and an endwall of the container abuts an edge of a first generally planar reference surface where the first reference surface is forwardly and backwardly pivotal about a primary axis; (b) forwardly pivoting the first reference surface and a second reference surface about the primary axis so that the first reference surface engages the endwall of the container and maintains planar communication therewith, the second surface being fixedly attached to the first reference surface at substantially a right angle; (c) rearwardly pivoting the reference surfaces and the container simultaneously about the primary axis to effect registration of the plurality of documents toward the first reference surface; and (d) leftwardly rotating the reference surfaces and the container simultaneously about a longitudinal axis where the longitudinal axis is perpendicular to the primary axis, where such leftward rotation effects registration of the plurality of documents toward the second reference surface.

The method also includes the steps of: (e) removing the container while retaining registration of the plurality of documents against the first and second reference surfaces, simultaneously; (f) rightwardly rotating the reference surfaces and the plurality of documents simultaneously about the second axis; (g) forwardly pivoting the reference surfaces and the plurality of documents simultaneously about the primary axis so that the first reference surface is generally in planar alignment with the feed ramp such that the documents are operatively positioned at a pre-feed position; (h) operatively displacing the plurality of documents from the pre-feed position to a feed position where the feed position is forward of the pre-feed position; and (I) continuously repeating steps (a) through (h).

According to an alternate embodiment, the pivotal unloading device is under control of a controller and is automatically powered by a plurality of pneumatic cylinders. All rotational and pivotal movement of the unloader is performed without human intervention, including final removal of the tray or container once the documents have been aligned. The human operator need only remove the empty tray after it has been captured by the tray removing arm.

More specifically, the apparatus is used to remove a generally rectangular container from an unloading device that places the container in a predetermined position after the documents are in position to be removed from the container. The container has a bottom surface, upstanding sidewalls, forward and rear endwalls, and an open top. The apparatus includes a base portion for supporting the apparatus and a container removing arm pivotally attached to the base portion configured to releasably engage the container and remove the container from the unloading device. Also included are container engaging clamps operatively connected to the container removing arm arranged to contact and releasably engage at least one of the bottom surface, the upstanding sidewalls, the forward endwall, and the rear endwall of the container. A powered means pivotally displaces the container removing arm when the clamps releasably engage the container. A controller is operatively coupled to the powered means to selectively control forward and backward pivoting of the arm. The controller is also operatively coupled to the container engaging clamps to selectively control engagement of the clamps such that backward pivoting of the arm while the clamps engage the container facilitates removal of the container from the unloading device when the arm is pivoted in a backward direction.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

DETAILED DESCRIPTION OF THE INVENTION

Figure 1:
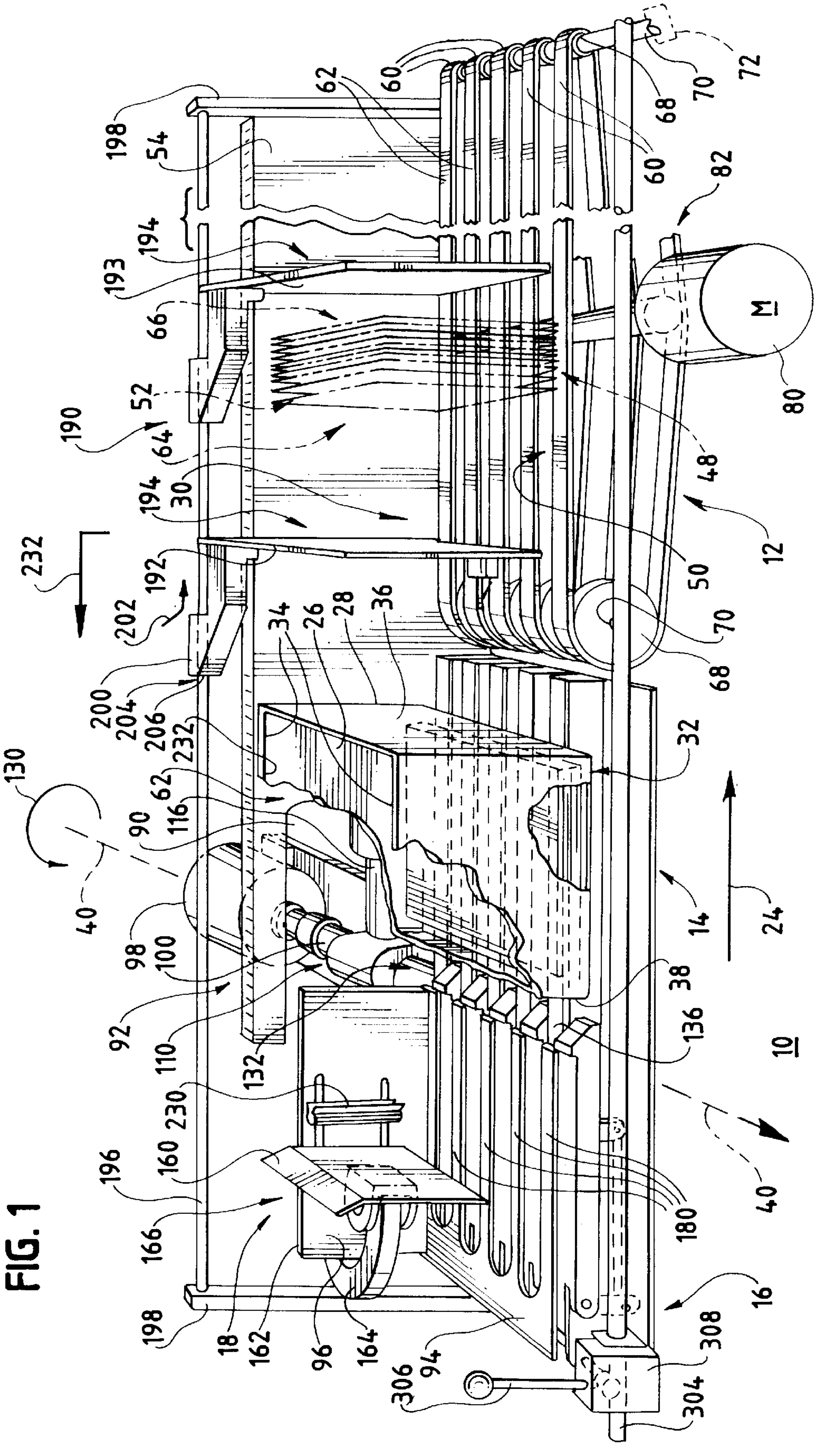
FIG. 1 is a perspective view of a specific embodiment of a pivotal tray unloading apparatus according to the present invention shown in an operative position.
Figure 2:
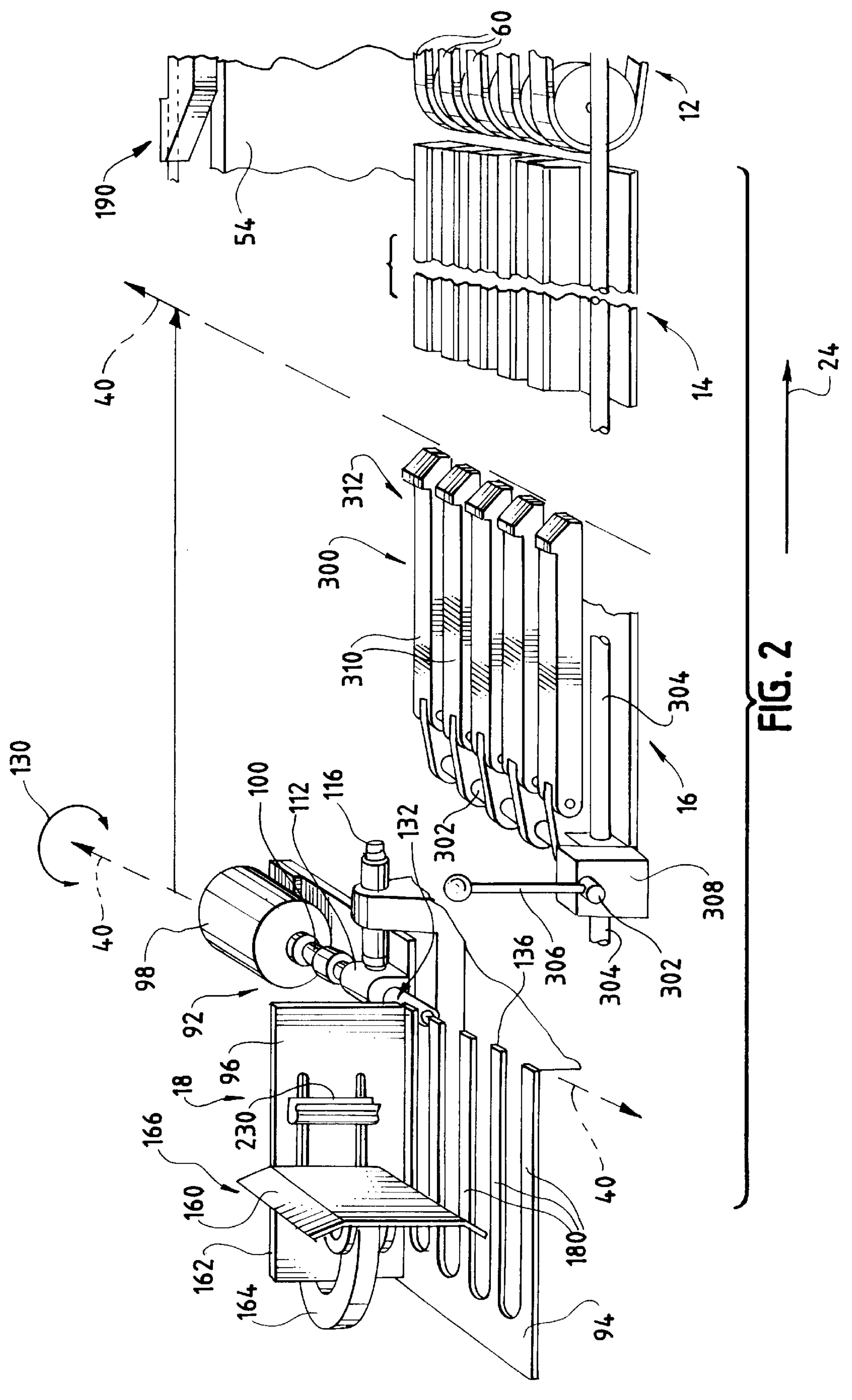
FIG. 2 is a partially exploded perspective view of a specific embodiment of a pivotal tray unloading apparatus according to the present invention, particularly showing a pivoting platform separated from an in-feed management system in a non-operative position.
Figure 3:
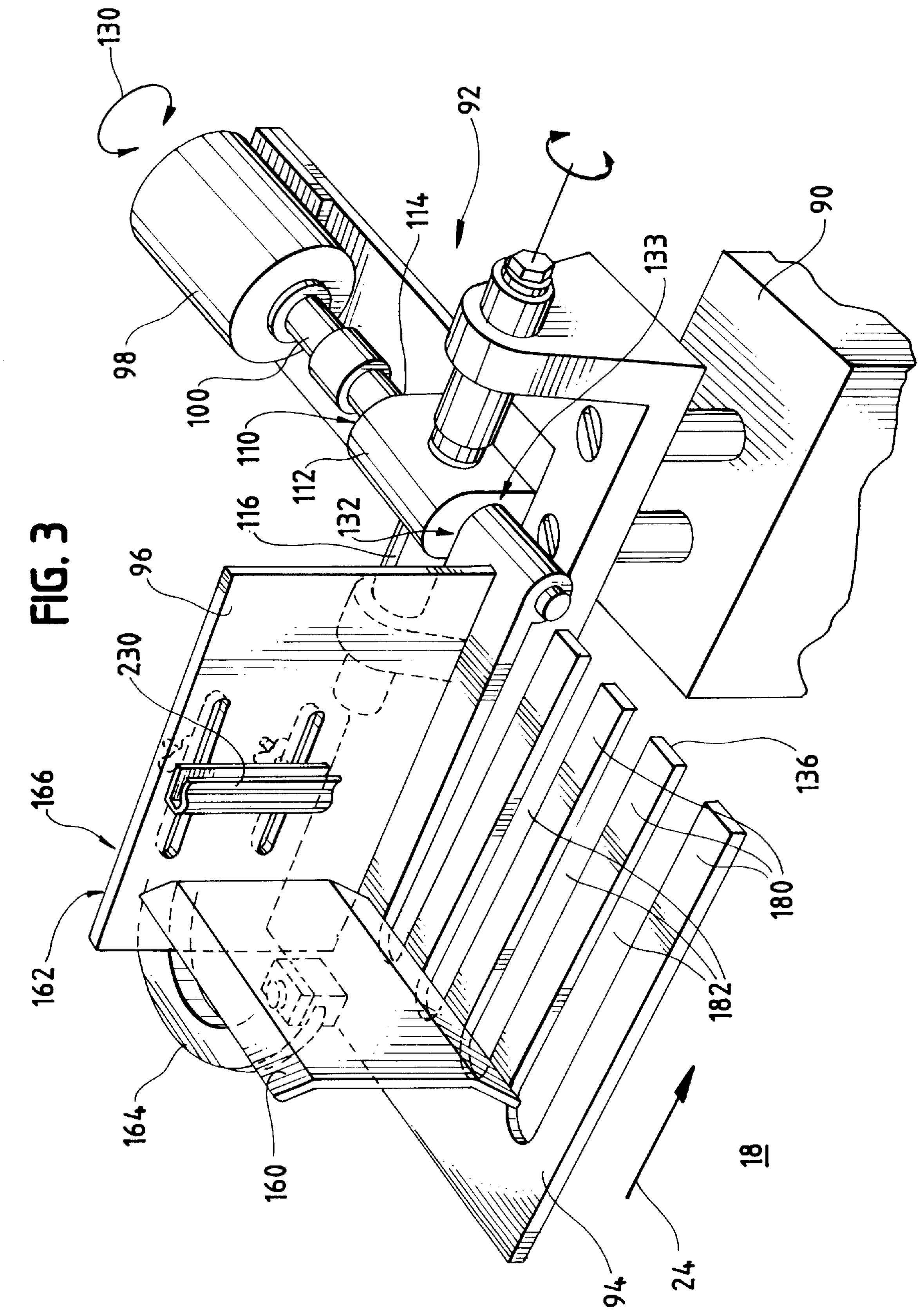
FIG. 3 is a perspective view of a specific embodiment of the pivotal tray unloading apparatus shown in FIG. 1, particularly showing a pivoting platform according to the present invention.

Referring now to FIGS. 1–3, FIG. 1 illustrates the pivotal tray unloading apparatus 10 generally. The apparatus 10 includes a document conveyor system 12, a tray platform 14, an in-feed management system 16 and a pivoting document unloading platform 18. A substantial portion of the pivoting platform 18 overlaps the in-feed management system 16 along a longitudinal axis 24 and is shown for purposes of illustration only as being separated from the in-feed management system in FIG. 2.

The apparatus 10 is operative to unload a plurality of generally rectangular documents 26 from a container or tray 28 onto a generally flat inclined feed ramp 30. The documents 26 are disposed horizontally in the generally rectangular tray 28 which may be constructed from plastic or any suitable material. The tray 28 includes a bottom surface 32, a plurality of upstanding sidewalls 34 and forward 36 and rear 38 endwalls. A primary axis 40 is defined to be parallel with a common edge of the bottom surface 32 and the rear endwall 38 of the container.

The documents 26 are stacked in the tray 28 in a flat or planar orientation with address labels or indicia of the documents all facing the same direction, preferably facing upwards. The documents 26 may include mailing envelopes of conventional personal or commercial letter size, or “flats” which are mail pieces generally between approximately 7½ by 10½ inches and 11½ by 14½ inches along their edges, and up to approximately ¾ inches thick or more, such as magazines, catalogs, large envelopes and the like.

To be effectively transported by the feed ramp 30 and processed by “upstream” sorting devices (not shown), the documents 26 must be positioned on the feed ramp in an “on-edge” orientation with the bottom edges 48 of the documents aligned with a bottom surface 50 of the feed ramp and left-most side edge 52 aligned with an upstanding ramp wall 54.

The ramp wall 54 is disposed at a left lateral side of the feed ramp 30 in the illustrated embodiment and extends along substantially the entire length of the feed ramp. The ramp wall 54 is substantially perpendicular to the bottom surface 50 of the feed ramp 30 forming a guide surface against which the left-most side edges 52 of the documents 26 are registered as the documents are transported along the feed ramp toward the right, as shown in FIG. 1.

The documents 26 are transported along the feed ramp 30 by a plurality of five parallel endless toothed conveyor belts 60 spaced transversely across the bottom surface 50 of the feed ramp 30. However, any suitable number of conveyor belts 60 may be used. The surface of the conveyor belts 60 are substantially flush with the bottom surface 50 of the feed ramp 30 and include timing notches or teeth 62 that project upwardly from the conveyor belts 60 to engage the bottom edges 48 of documents 26 placed on the feed ramp.

After the documents 26 have been properly positioned on the feed ramp 30, as will be described in greater detail hereinafter, the documents assume a generally upstanding “on-edge” orientation on the feed ramp, as shown by reference numeral 64 in FIG. 1 of the illustrated embodiment. The on-edge documents 64 are then fed along the feed ramp 30 in a forward direction along the longitudinal axis 24 where each document is generally parallel to a face 66 of adjacent documents and transverse to the longitudinal axis.

Each conveyor belt 60 is supported at opposite ends of the feed ramp 30 by a pair of rollers or pulleys 68 which define a continuous loop formed by the conveyor belts. Each roller 68 is fixedly supported by a transverse shaft 70 having opposite ends supported by brackets 72 mounted on the document conveyor system 12. The belts 60 are rotatably driven by a conveyor belt motor 80 via a drive belt and pulley assembly 82, diagrammatically illustrated in FIG. 1. When the conveyor belt motor 80 is energized, the conveyor belts 60 rotate to effect forward motion of the documents 64 disposed thereupon. The conveyor belt motor 80 may be, for example, a servo motor, as is well known in the art.

The pivoting platform 18 is shown in detail in FIG. 3 but reference to FIGS. 1 and 2 will be advantageous where like reference numerals identify like structures. The pivoting platform 18 includes a base support 90 which supports a pivot assembly 92. The pivot assembly 92 allows rotation and pivoting of a first generally planar reference surface 94 and a second generally planar reference surface 96 fixedly attached to the first reference surface at a substantially right angle.

The pivot assembly 92 includes a motor 98 coupled to a first drive shaft 100 which extends within a throughbore 110 disposed in a shaft junction housing 112. The shaft junction housing 112 includes a plurality of bushings 114 to support the first drive shaft 100 and allows rotation of the first drive shaft relative to the shaft junction housing. The junction housing 112 also provides bushings 114 to support a second drive shaft 116 disposed transverse to the first drive shaft 100 and allows rotation of the second drive shaft relative to the junction housing. Preferably, the second drive shaft 116 does not extend through the junction housing 112, but rather, is firmly mounted to opposite sides of the junction housing.

When the motor 98 is energized, the fixed reference surfaces 94 and 96 can rotate or pivot clockwise and counter-clockwise about the first drive shaft 100, as shown by arrow 130. A gearing arrangement 132 within the shaft junction housing 112 allows the first and second drive shafts 100 and 116 to rotate relative to each other. Alternatively, a second motor may be used to rotate the second drive shaft 116 to permit independent motion of the drive shafts 100 and 116. Note that the axis of the first drive shaft 100 is essentially coaxial with the primary axis 40.

The first and second reference surfaces 94 and 96 are fixedly attached to the first drive shaft 100 by welds, bolts or other suitable fasteners 133, as is well known in the art. The reference surfaces 94 and 96 are affixed to the first drive shaft 100 at a point toward a forward edge 136 of the reference surfaces at a point proximal to the intersection of the first and second reference surfaces. Alternatively, the first drive shaft 100 may be affixed to the second reference surface 96 by similar means. Such an attachment allows the reference surfaces 94 and 96 to pivot and rotate along with corresponding pivoting and rotation of the drive shafts 100 and 116.

Rotation about the first drive shaft 100 will be referred to hereinafter as “pivoting” about the first drive shaft, or preferably, “pivoting” about the primary axis 40. Additionally, rotation about the second drive shaft 116 will be referred to hereinafter as “rotation” about the second drive shaft, or preferably, “rotation” about the longitudinal axis 24. Thus, the first 94 and second 96 reference surfaces are configured to pivot forwardly and backwardly about the primary axis 40 and to rotate leftwardly and rightwardly about the longitudinal axis 24 where the longitudinal axis is perpendicular to the primary axis.

The first and second reference surfaces 94 and 96 are generally solid and rectangular in shape. The second reference surface 96 has a support paddle 160 coupled to its back surface 162 through a “U-shaped” slider arm 164. The slider arm 164 is movably affixed to the back surface 162 by means of brackets 166 or other suitable support means that allow the support paddle 160 to be displaced relative to the forward edge 136 of the first reference surface 96 in the direction shown by arrow 24 in FIG. 3. When the reference surfaces 94 and 96 are forwardly pivoted in an operative position, as will be described in greater detail below, the support paddle 160 may be forwardly or downwardly displaced to contact documents placed in the tray 28.

The first reference surface 94 is generally rectangular in shape but is fork-like in appearance and includes a plurality of spaced apart support fingers 180 defining a plurality of channels 182 disposed between adjacent fingers. Each support finger 180 extends generally along the longitudinal axis 24 and is substantially coaxial with each corresponding conveyor belt 60, as will be described in greater detail hereinafter.

Referring now to FIG. 1, a document support paddle assembly 190 is shown. The paddle assembly 190 includes a rear paddle 192 and a forward paddle 193 that are each generally flat and have planar surfaces or faces 194 transverse to the longitudinal axis 24. Thus, the faces 194 of the rear paddle 192 and the forward paddle 193 are generally parallel to the face 66 of the on-edge documents 64.

The paddle assembly 190 includes a guide shaft 196 horizontally disposed along the apparatus 10 and fixedly mounted between two guide shaft brackets 198. Each guide shaft bracket 198 upwardly projects from the document conveyor system 12 at a position transversely leftward of the ramp wall 54 to permit unimpeded linear displacement of the rear paddle 192 and the forward paddle 193 along the guide shaft 196. The position of the guide shaft brackets 198 and the length of the guide shaft 196 allow both the rear paddle 192 and the forward paddle 193 to be positioned at a point defined by the primary axis 40. This corresponds approximately to the back edge of the in-feed management system 16 and allows the rear paddle 192 to contact the support paddle 160, as will be described in greater detail hereinafter.

The rear paddle 192 is movably secured to the guide shaft 196 by an extension arm 200 mounted at substantially right angles to the rear paddle. The extension arm 200 may be bent or angled outwardly toward the guide shaft 196 as shown by arrow 202. The extension arm 200 includes a throughbore 204 disposed through a portion of its length through which the guide shaft 196 passes. A bushing 206 mounted within the throughbore 204 allows the extension arm 200 and the rear paddle 192 to slide linearly relative to the guide shaft 196.

The forward paddle 193 is movably secured to the guide shaft 196 in a similar manner as attachment of the rear paddle 192. Both the forward paddle 193 and the rear paddle 192 can rotate relative to the guide shaft 196 so that the paddles can be upwardly rotated from between documents and linearly displaced along the guide shaft unimpeded by documents on the feed ramp 30. This allows positioning of the paddles 192 and 193 relative to each end of the stack of documents 64.

Figure 4A:
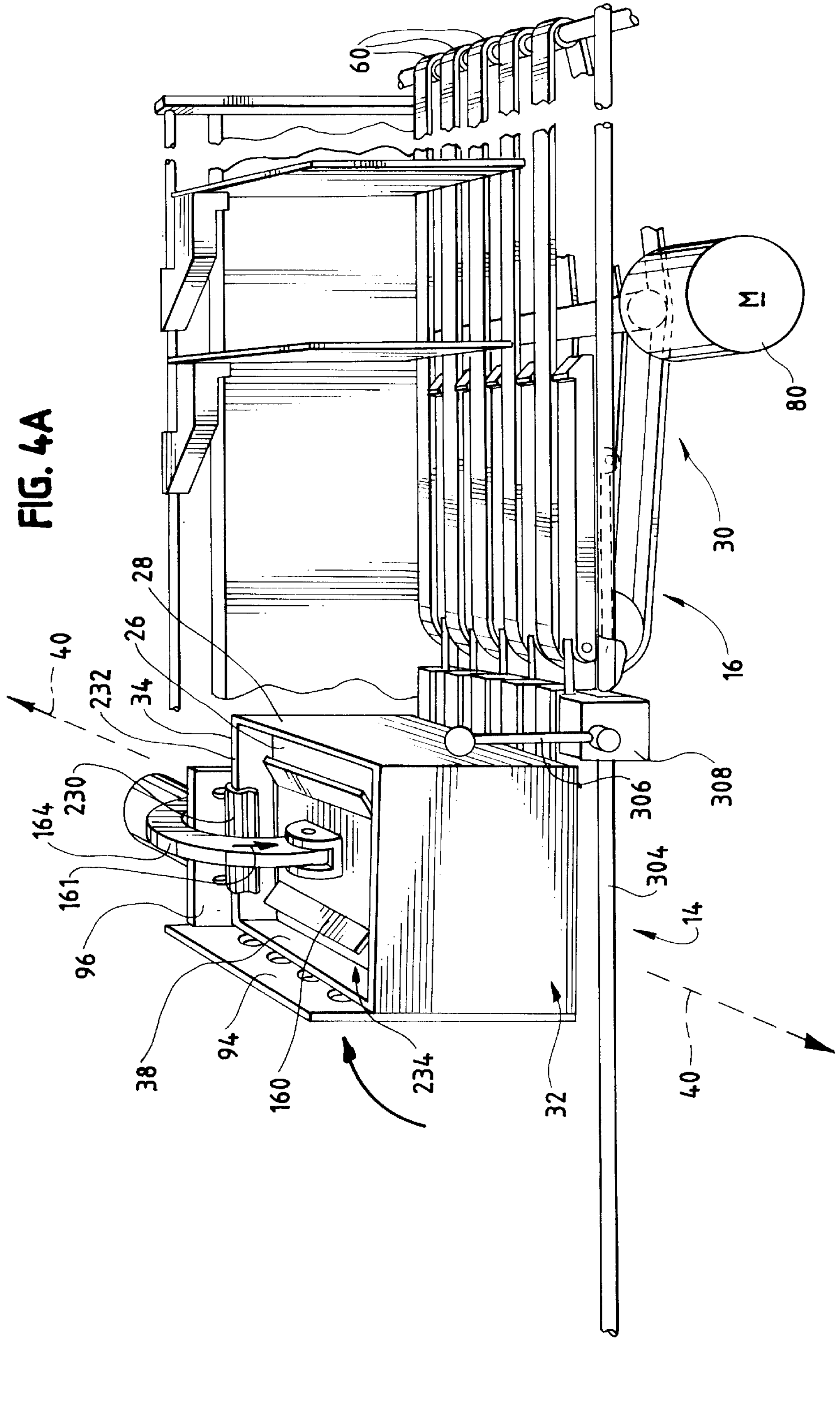
FIGS. 4A–4F are perspective views of a specific embodiment of a pivotal tray unloading apparatus, particularly showing an operational sequence of unloading a tray containing documents.

Referring now to FIGS. 1 and 4A–4G, FIGS. 4A–4G show an operational sequence of unloading the documents 26 from the tray 28. Initially, as illustrated in FIG. 1, the documents 26 are stacked within the tray 28 and the tray is placed upon the tray platform 14 at a rest position. The tray platform 14 is disposed to the left of the feed ramp 30 and provides a stable and non-moving surface upon which to initially place the tray 28 of documents 26 prior to transfer of the documents to the moving conveyor belts 60. As shown in FIG. 4A, the in-feed management system 16 is in a position essentially overlapping a portion of the conveyor belts 60 of the feed ramp 30.

The tray platform 14 is generally flat and may be tilted at an angle substantially equal to the angle of incline of the feed ramp 30, which may be, for example, eight degrees. However, such an incline may, for example, be in the range of about between zero to twenty degrees. The tray 28 is preferably positioned on the tray platform 14 such that a common edge between the bottom surface 32 of the container and the rear endwall 38 of the container abuts the forward edge 136 of the first reference surface 94. This allows for pivoting of the first and second reference surfaces 94 and 96 about the primary axis 40. Thus, the bottom edge of the tray 28 defined between the bottom surface 32 and the rear endwall 38 of the container is essentially collinear with the primary axis 40.

Next, as illustrated in FIG. 4A, the first and second reference surfaces 94 and 96 are forwardly pivoted about the primary axis 40 whereby reference surface 94 engages the rear endwall 38 of the tray 28. The first reference surface 94 maintains planar communication with the rear endwall 38. Preferably, forward pivoting of about ninety degrees is sufficient to engage the rear endwall 38. However, such pivoting, for example, may be in the range of about between seventy-five to one-hundred and fifteen degrees.

As the first and second reference surfaces 94 and 96 are forwardly pivoted, the support paddle 160 is moved in the direction shown by arrow 161 (FIG. 4A) and engages the uppermost document 26 in the tray 28 so as to retain and lightly compress the plurality of documents between the support paddle and the bottom surface 32 of the tray. Displacement of the support paddle 160 toward the documents 26 sufficient to retain the documents may, for example, be performed manually, or may be gravity assisted. If the support paddle 160 is gravity assisted, a one-way rachet arrangement (not shown) attached to the slider arm 164 prevents the support paddle from moving away from the documents 26 until released by the operator.

Note that during forward pivoting, one or both of the reference surfaces 94 and 96 engage the tray 28 which becomes secured to the reference surfaces when the paddle 160 is moved into position atop documents 26. Preferably, the second reference surface 96 includes a releasable clip or flange 230 which releasably engages a corresponding lip 232 disposed on the left sidewall 34 of the tray 28. However, either or both of the reference surfaces 94 and 96 may have such releasable clips corresponding to lips 232 on either or both of the rear endwall 38 or the left sidewall 34 of the tray 28. Thus, once the first and second reference surfaces 94 and 96 have been forwardly pivoted, the support paddle 160 retains the documents 26 within the tray 28 while the tray is fixedly secured to the reference surfaces.

Figure 4B:
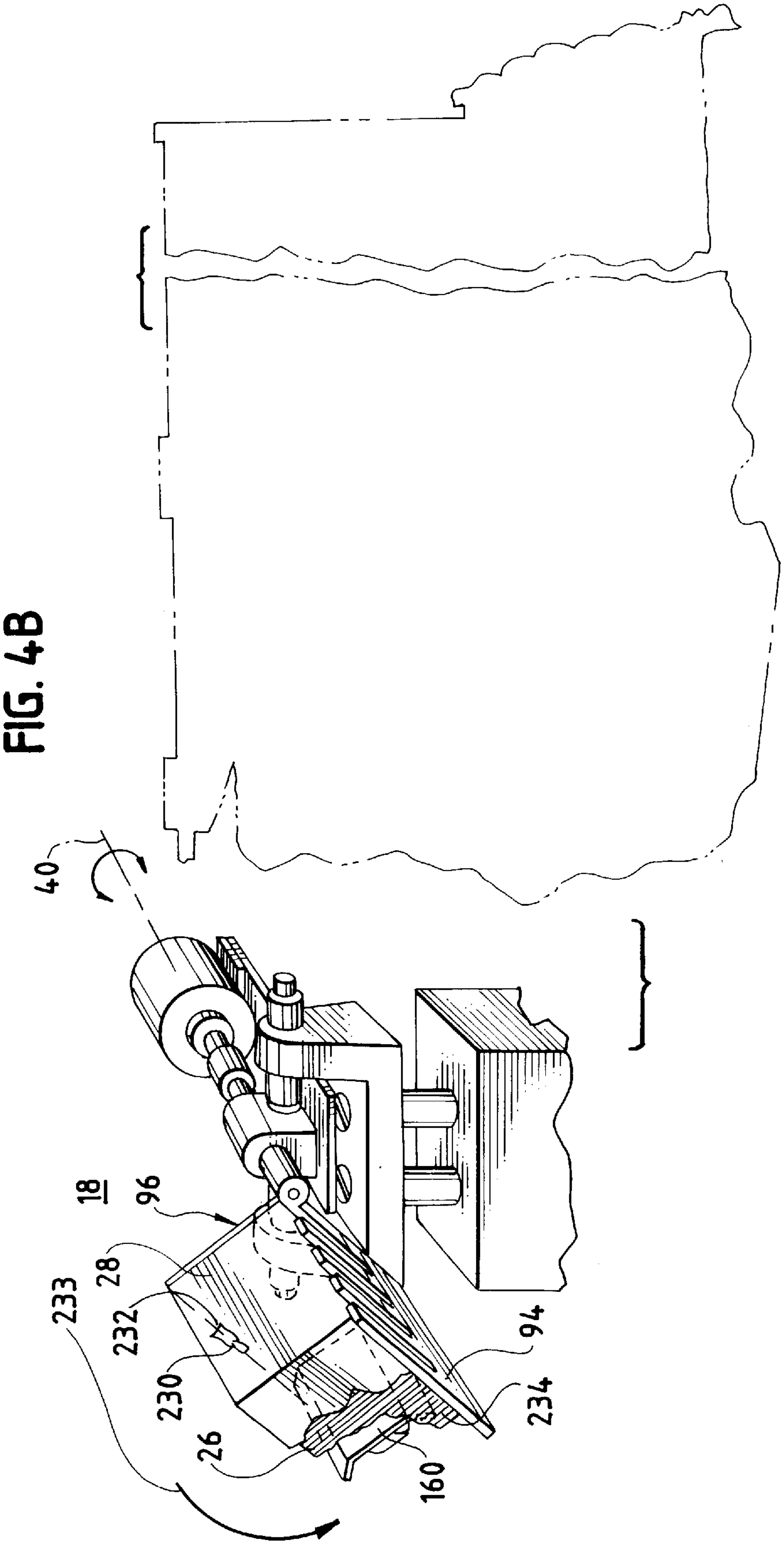

Next, as shown in FIG. 4B, the first and second reference surfaces 94 and 96 and the tray 28 are simultaneously pivoted backwardly about the primary axis 40 to effect registration of the plurality of documents 26 toward the first reference surface, as shown by arrow 233. In this position, first common edges 234 of the documents 26 are in planar alignment with the first reference surface 94 and with the rear endwall 38 of the tray 28.

Preferably, rearward pivoting by about ninety degrees is sufficient to effect registration of the documents 26. However, such pivoting, for example, may be in the range of about between ninety to one-hundred and seventy degrees. The rearward pivoting more than compensates for the previous forward pivoting illustrated in FIG. 4A so that the documents are inclined at an angle greater than ninety degrees. The general eight degree incline of the feed ramp 30 (FIG. 1) and the pivoting platform 18 in combination with the rearward pivoting prevents the documents 26 from falling forward when the tray 28 is subsequently removed and causes the documents to be retained against the support paddle 160, as will be described hereinafter. Note that the rearward pivoting, as shown by arrow 233, the tray 28 simultaneously pivots along with the reference surfaces 94 and 96 since the releasable clip 230 engages the lip 232 on the tray and secures the tray to the reference surfaces.

Figure 4C:
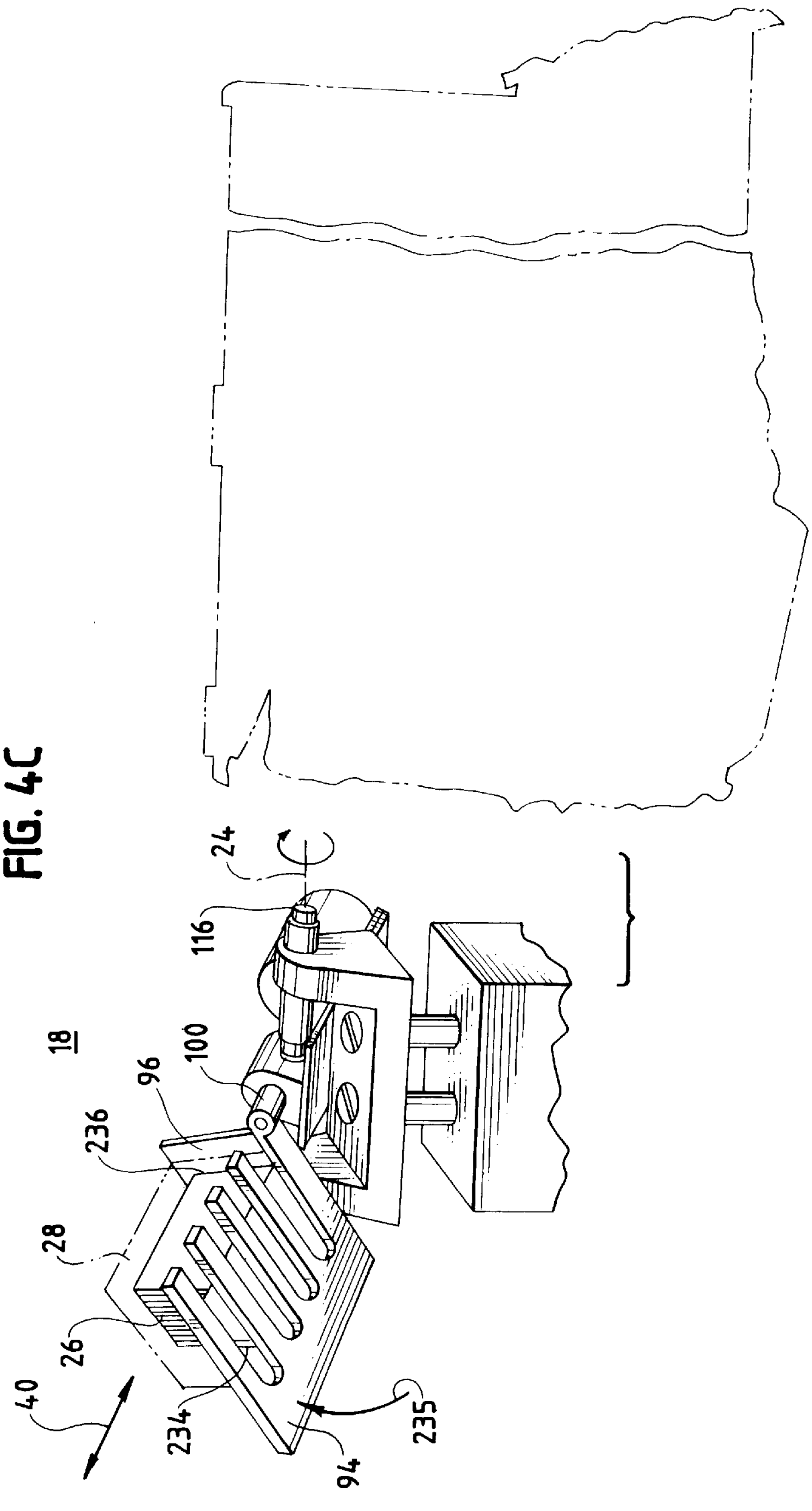

Next, as illustrated in FIG. 4C, the first and second reference surfaces 94 and 96 are rotated leftwardly about the longitudinal axis defined by the second drive shaft 116 along with the tray 28 and the documents 26, as shown by arrow 235. Such leftward rotation effects registration of the plurality of documents 26 toward the second reference surface 96 such that second common edges 236 of the documents are in planar alignment with the second reference surface and are also perpendicular to the first common edges 234. Preferably, leftward rotation of about thirty degrees is sufficient to effect registration of the documents 26 against the second reference surface 96. However, such rotation, for example, may be in the range of about between twenty to seventy degrees.

Thus, in the position shown in FIG. 4C, the reference surfaces 94 and 96 and the tray 28 containing the documents 26 have been pivoted backwardly and rotated leftwardly so that the documents are registered against the first and second reference surfaces and against the face of support paddle 160 (FIGS. 4A–4B) by the affect of gravity acting on the weight of the documents. Note that as the reference surfaces 94 and 96 leftwardly rotate about the second drive shaft 116 and the longitudinal axis 24, the pivot angle caused by pivoting of the first drive shaft 100 remains unchanged with respect to the primary axis 40 since motion about the primary axis 40 and the longitudinal axis 24 occurs independently.

Figure 4D:
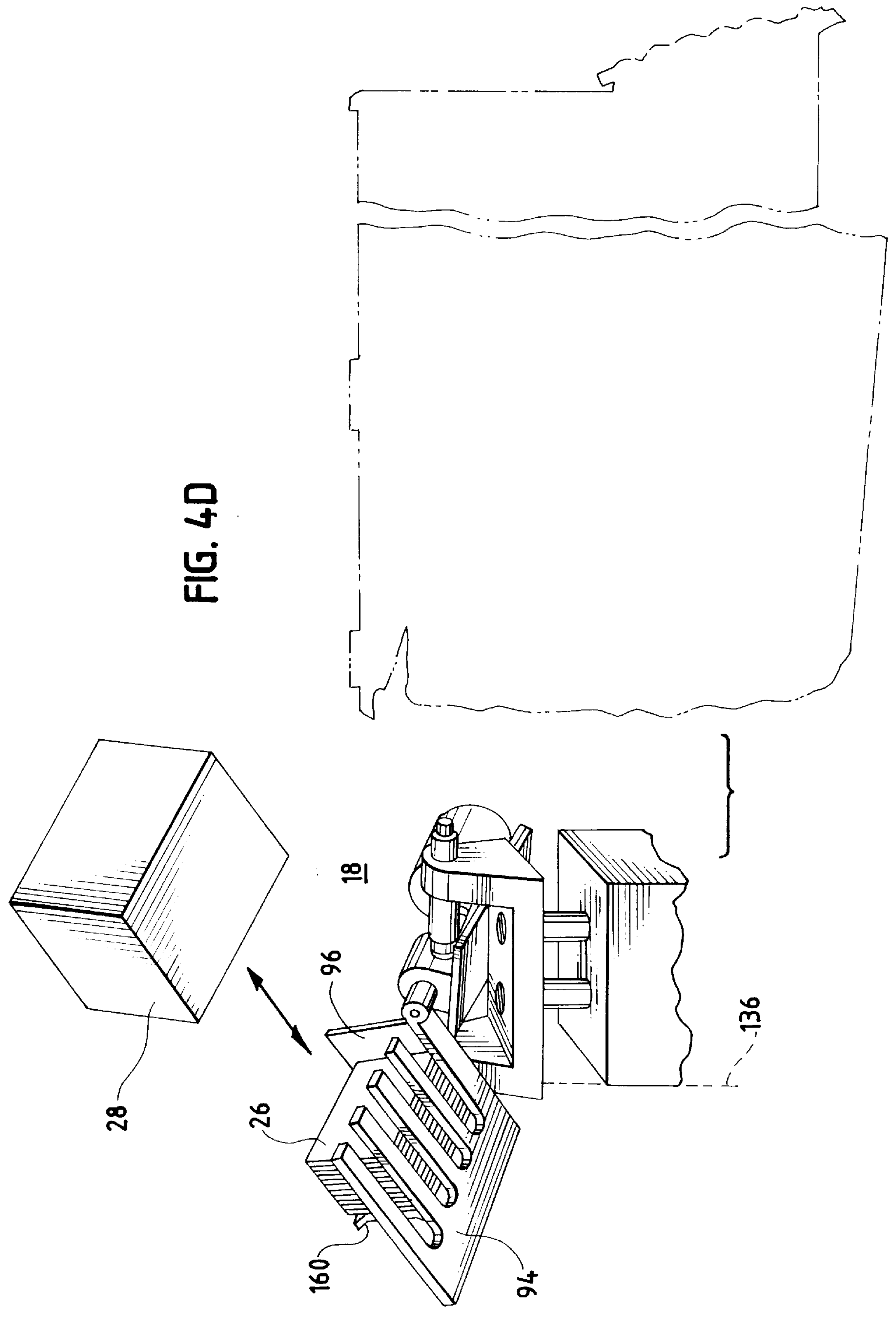

Next, as illustrated in FIG. 4D, the tray 28 is removed by releasing the clips 230 (FIGS. 4A–4B) either by manual intervention or by automatic means, such as by an electrically activated solenoid (not shown), as is well known in the art. The tray 28 is removed while the documents 26 retain registration against the first and second reference surfaces 94 and 96 and against the face of the support paddle 160 (FIGS. 4A–4B), simultaneously. Since the documents 26 have been pivoted backwardly and rotated leftwardly, they remain in position and cannot fall over.

Additionally, the rear paddle 192 (FIG. 1) is backwardly displaced toward its rear-most linear position corresponding to the rear-most edge of the tray platform 14 so as to essentially be aligned with the forward edge 136 of the first reference surface 94. Thus, when the reference surfaces 94 and 96 and the documents 26 are later forwardly pivoted and rightwardly rotated, as will be described hereinafter, the documents are prevented from falling forward, in part, by the rear paddle 192. However, the general eight degree incline is sufficient to prevent the documents 26 from falling forward.

Figure 4E:
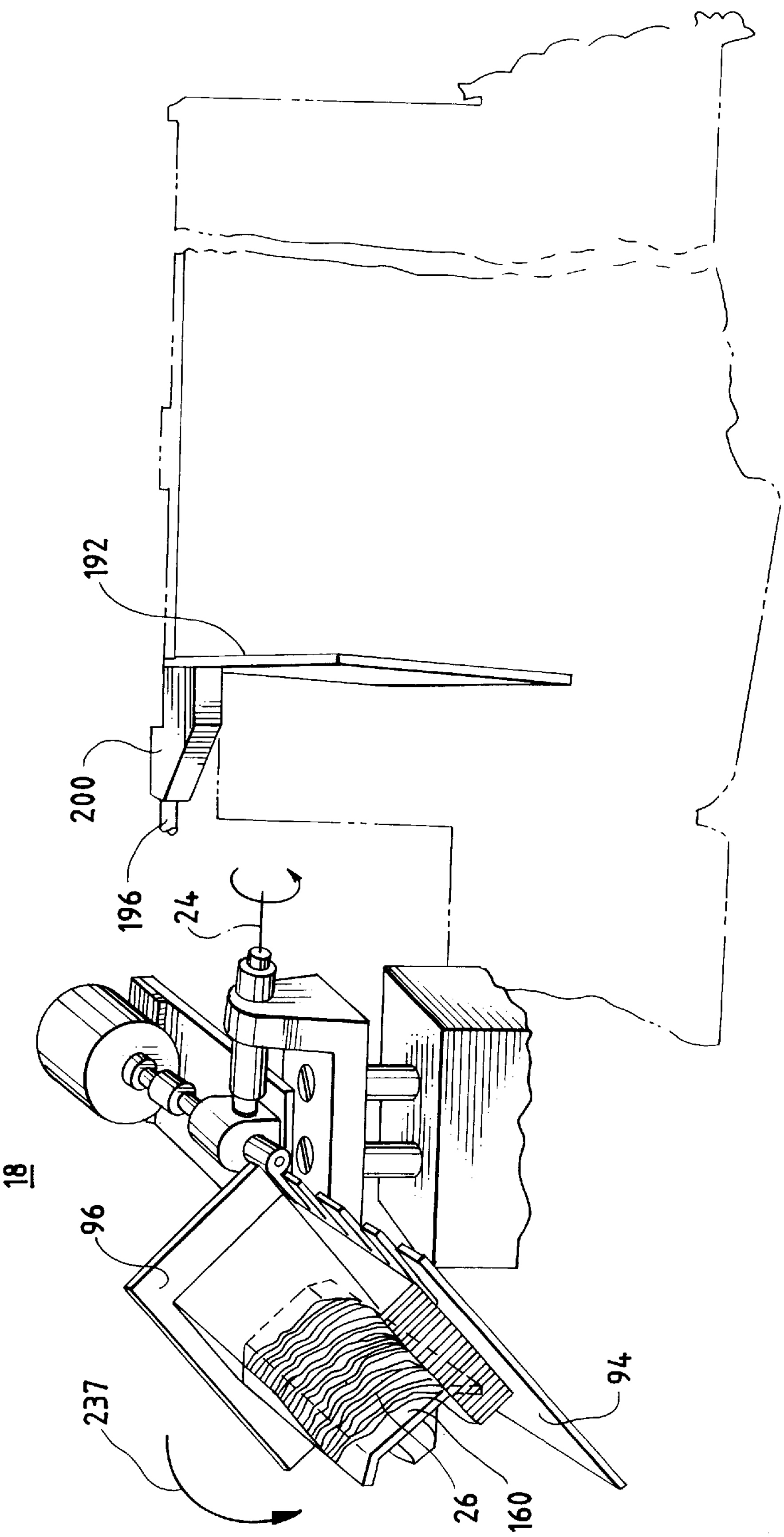

As illustrated in FIG. 4E, after the tray 28 (FIG. 4D) has been removed and the rear paddle 192 has been backwardly displaced, the first and second reference surfaces 94 and 96 and the plurality of documents 26 are rightwardly rotated about the longitudinal axis 24, as shown by arrow 237. The degree of rightward rotation is essentially equal to the degree of previous leftward rotation illustrated in FIG. 4C by arrow 235, such that the first reference surface 94 and the documents 26 are disposed in an unrotated position with respect to the longitudinal axis 24.

Figure 4F:
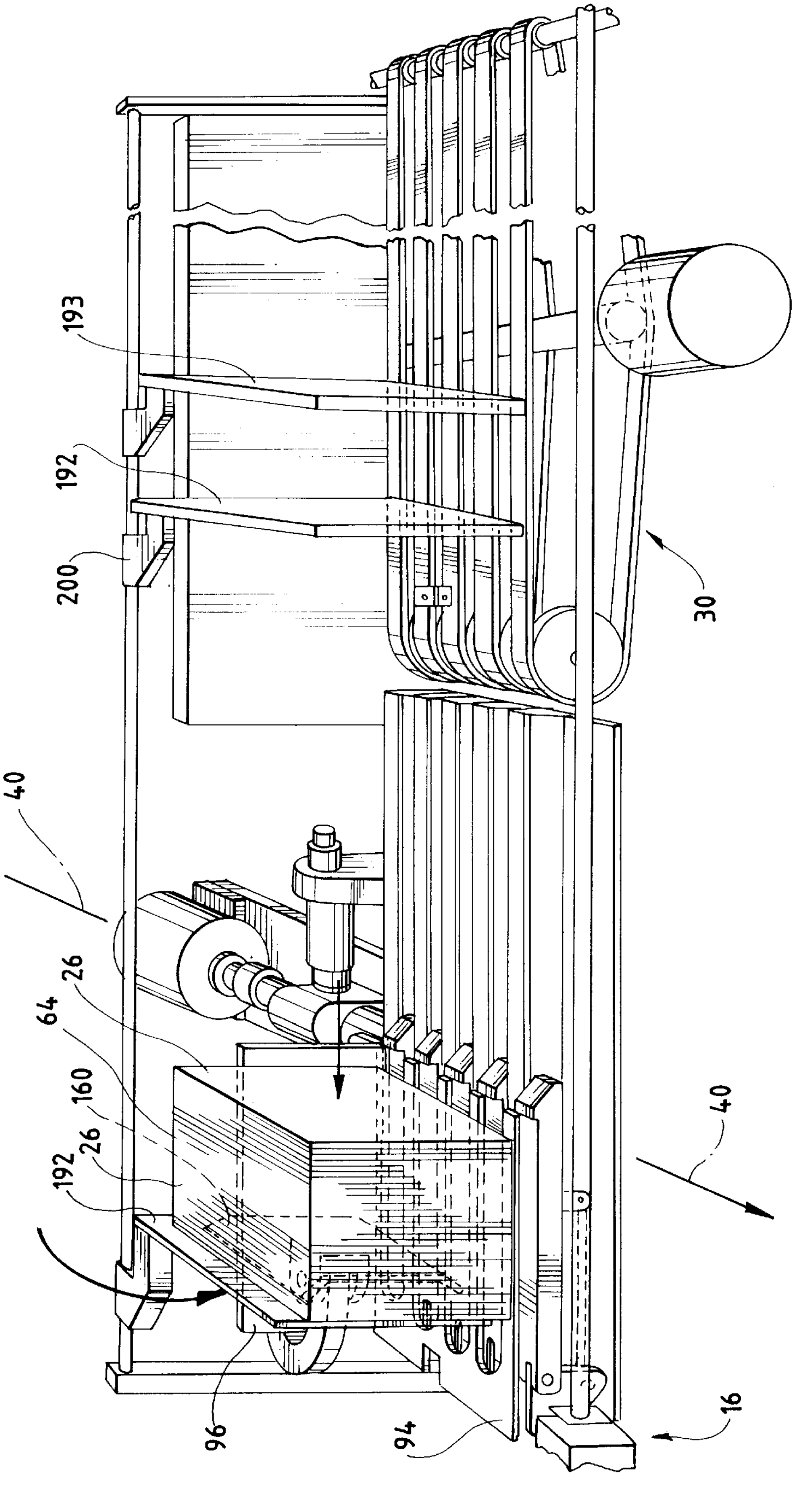

Next, as illustrated in FIG. 4F, the first and second reference surfaces 94 and 96 and the plurality of documents 26 are further forwardly pivoted about the primary axis 40. The degree of further forward pivoting places the first reference surface 94 in a coplanar relationship with the feed ramp 30 still inclined at the eight degree angle described above. Thus, if the amount of initial backward pivoting was one-hundred and thirty-five degrees, for example, as illustrated in FIG. 4B, then the amount of further forward pivoting illustrated in FIG. 4F is equal to about forty-five degrees so that the first reference surface 94 is substantially coplanar with the feed ramp 30. However, such further forward pivoting, for example, may be in the range of about between zero to eighty degrees, depending upon the amount of prior backward pivoting.

As shown in FIG. 4F, the in-feed management system 16 is rearwardly displaced from its position shown in FIG. 4A. This places the in-feed management system 16 in planar alignment just beneath the first reference surface 94. Also not specifically shown in FIG. 4F, just prior to the forward pivoting of the documents 26 and the first and second reference surfaces 94 and 96, the rear paddle 192 is rearwardly positioned so that it abuts the stack of documents 26 as the documents are forwardly pivoted. After the stack of documents 26 has been forwardly pivoted and is in horizontal alignment with the feed ramp 30, the rear paddle 192, which may, in part, be supporting the forward portion of the stack of documents 26, is upwardly rotated. Since the stack of documents 26 is now in an "on-edge" orientation, the reference numeral 64 will be associated with the documents hereafter. The rear paddle 192 is then rearwardly displaced and downwardly rotated so that it is "wedged" between the support paddle 160 and the rear portion of the stack of documents 64.

This effects positioning the documents 64 in an on-edge orientation in a generally coplanar relationship with the feed ramp 30 with the rear paddle 192 providing vertical support at the back end of the documents. The general eight degree incline of the feed ramp 30, the pivoting platform 18 and the in-feed management system 16 prevents the documents 26 from falling forward. The documents 64 are disposed in the "on-edge" position supported on the bottom by the first reference surface 94 and are registered against both reference surfaces 94 and 96. This position is referred to as a "pre-feed" position and it is from this position that the documents are forwardly displaced toward the feed ramp 30, as will be described in greater detail hereinafter.

Figure 5:
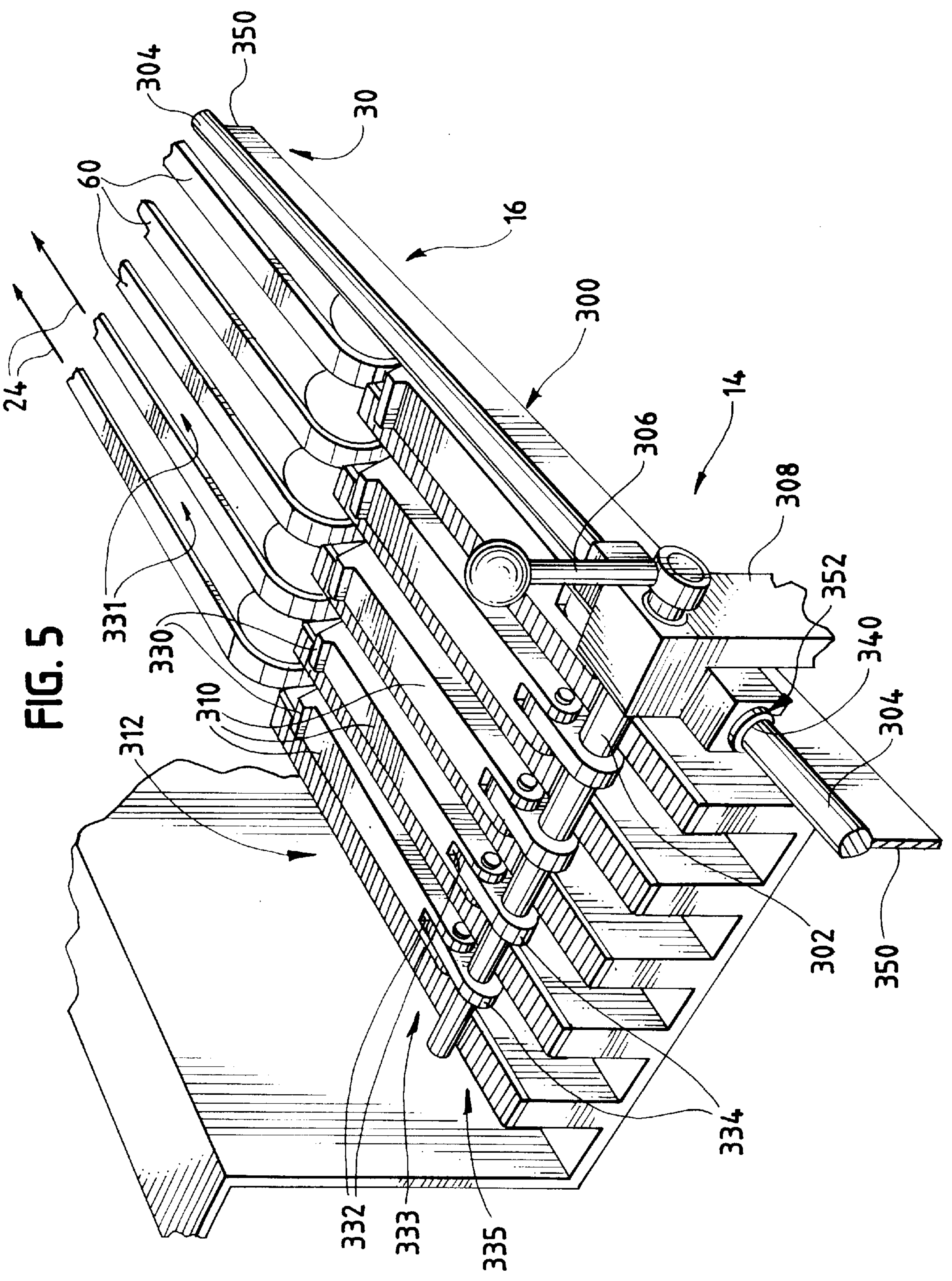
FIG. 5 is a perspective view, particularly showing an in-feed management system according to the present invention.

Referring now to FIGS. 1–2 and 5, FIG. 2 shows the in-feed management system 16 separated from the pivoting platform 18 in a non-operative position for purposes of illustration only, while FIG. 5 illustrates the in-feed management system in greater detail. In the operative position shown in FIG. 1, the first reference surface 94 of the pivoting platform 18 is disposed vertically just above the in-feed management system 16 and cooperates therewith.

Referring to FIGS. 2 and 5, the in-feed management system 16 is abuttingly positioned toward the back end of the tray platform 14 and includes an in-feed support platform 300, a transverse finger axle 302, a longitudinal support member 304, a handle 306, a support block 308, and a plurality of gripping fingers 310 defining a loading sled 312. The loading sled 312 is disposed beneath the first reference surface 94 and is generally coplanar with the first reference surface. The loading sled 312 is configured to support the on-edge documents 64 in conjunction with the support fingers 180 of the first reference surface 94.

The gripping fingers 310 are spaced apart in alternating longitudinal alignment with the support fingers 180 of the first reference surface 94 and form a substantially continuous planar surface when the first reference surface is disposed on top of the loading sled 312 in the operative position. However, the gripping fingers 310 need not form a continuous planar surface with the support fingers 180 in order to support the on-edge documents 64. Rather, the support fingers 180 of the first reference surface 94 or the gripping fingers 310 of the loading sled 312 alone are sufficient to support the on-edge documents 64.

Each support finger 180 of the first reference surface 94 is essentially in axial alignment with each conveyor belt 60 of the feed ramp 30. Since each gripping finger 310 is in alternating axial alignment with each support finger 180, each gripping finger is essentially in axial alignment with an axial gap 320 formed between adjacent conveyor belts 60 of the feed ramp 30. Additionally, the gaps 320 between adjacent conveyor belts 60 do not represent a solid planar surface. Rather, the gaps 320 are of sufficient depth to allow the gripping fingers 310 to be positioned within the gap and recessed below the surface of the conveyor belts 60 when the loading sled 312 is forwardly displaced towards the feed ramp, as will be described hereinafter.

Each gripping finger 310 includes a substantially upright stop 330 disposed at a distal end 331 (FIG. 5) of each gripping finger which acts to retain the bottom portion of the documents 64. Each gripping finger 310 includes a recessed notch 332 disposed at a proximal end 333 through which one or more linkage members 334 secure each gripping finger to the transverse finger axle 302.

Figure 6A:
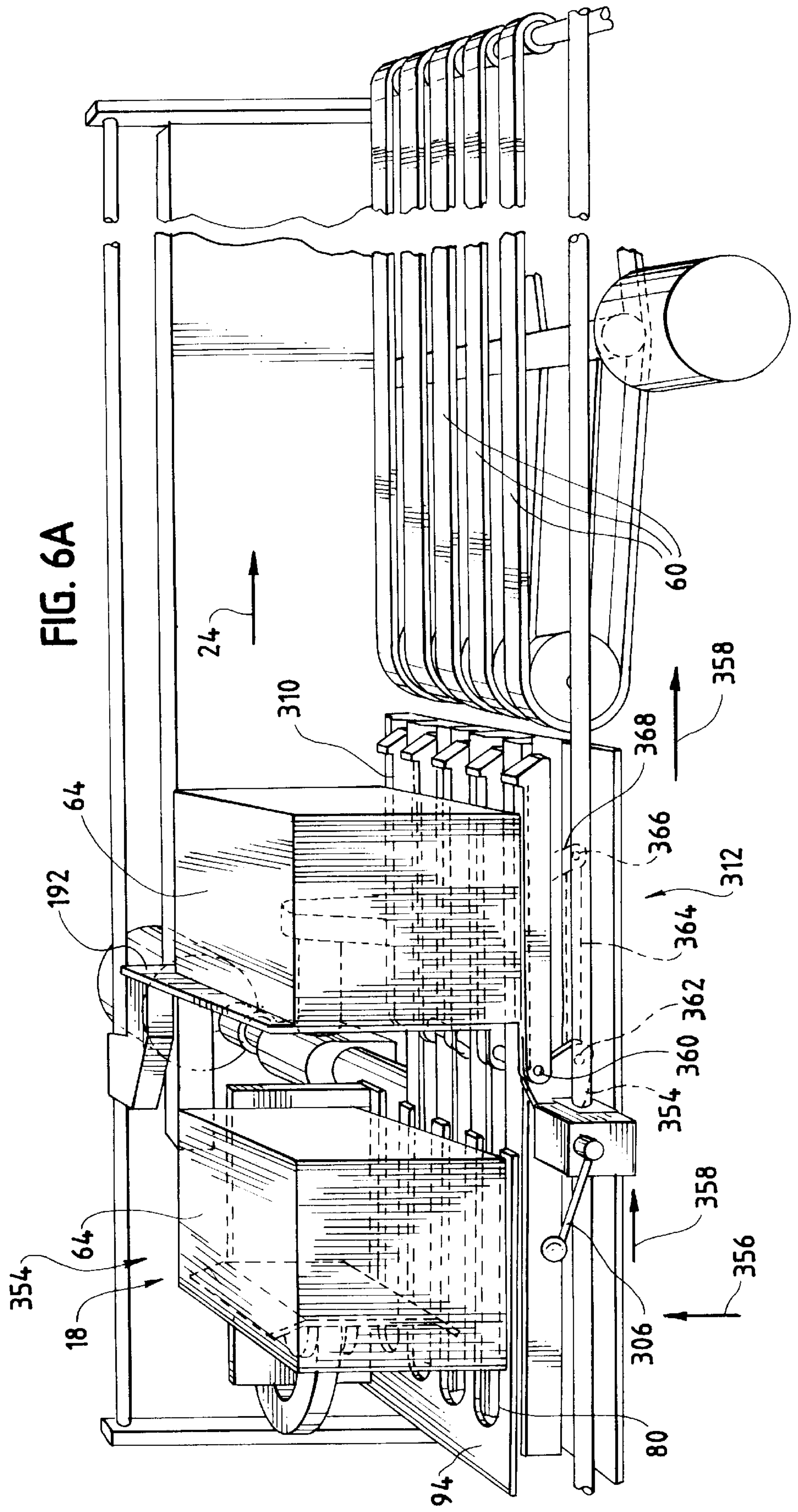
FIGS. 6A–6B are perspective views of a specific embodiment of a pivotal tray unloading apparatus, particularly showing an operational sequence of displacing documents from a pre-feed position to a feed position.
Figure 6B:
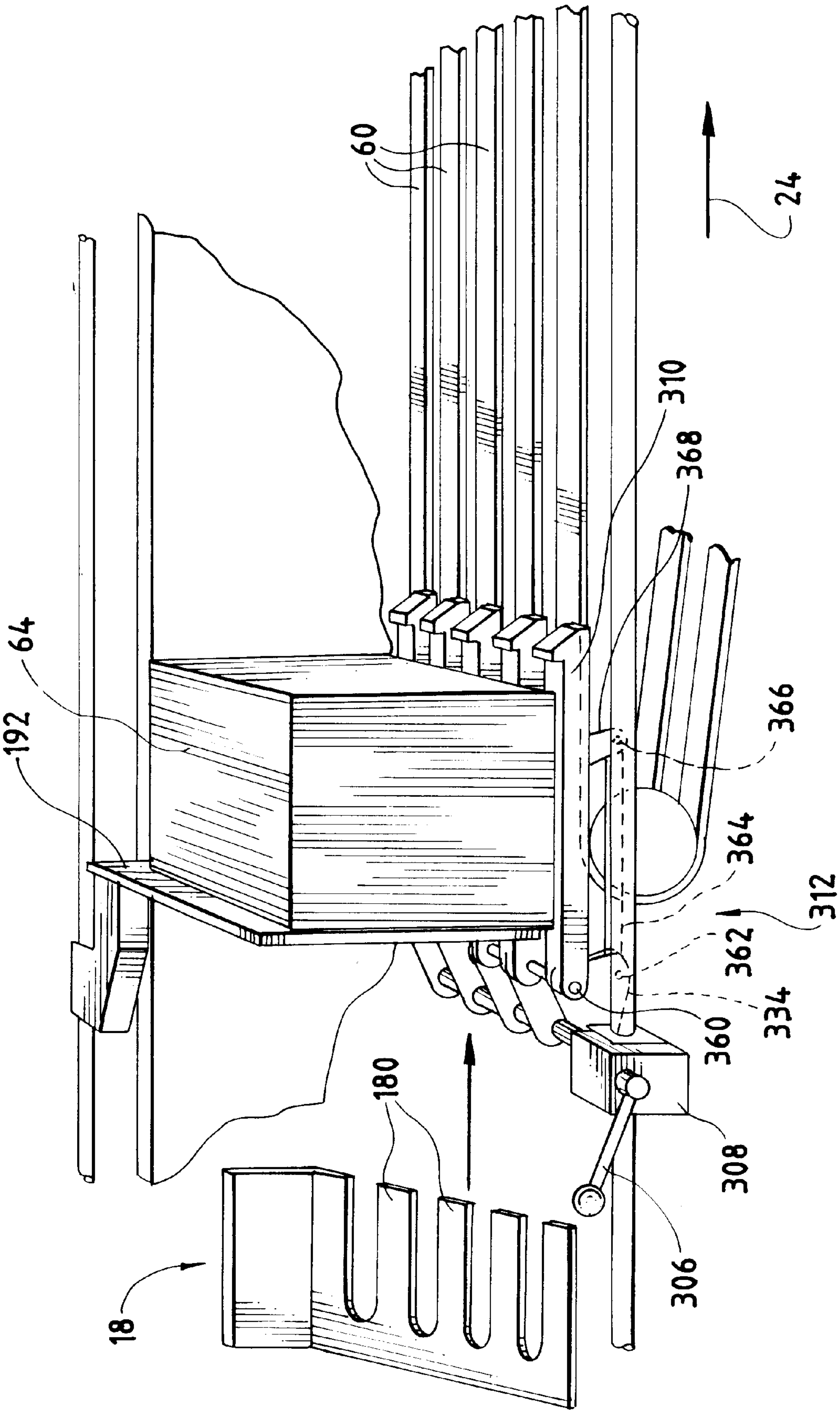

Referring to FIGS. 6A and 6B, each linkage member 334 is rigidly mounted at one end to the transverse finger axle 302. The other end of each linkage member 334 comprises apertures 360 and 362, spaced apart in a substantially vertical orientation. Gripping fingers 310 are pivotally connected to each linkage member 334 by means of a pin extending through an aperture at one end of each gripping finger and through each aperture 360. An outwardly extending arm 364 is pivotally connected to each linkage member 334 by a pin extending through aperture 362 and an aperture extending through an end of each arm 364. The forward end of each arm 364 is pivotally connected at 366 to a linkage element 368. The upper portion of each linkage element 368 (not shown) is pivotally connected to the underside of a corresponding gripping finger 310, thus forming a movable parallelogram linkage comprising each gripping finger 310, linkage member 334, arm 364 and linkage element 368.

The transverse finger axle 302 is rotatably mounted within the support block 308 at one end and is supported by a suitable mounting fixture (not shown) at its opposite end 335. The handle 306 is attached at substantially right angles to the transverse finger axle 302 so that when the handle is rotated in the forward and backward directions, the transverse finger axle rotates clockwise and counter-clockwise, respectively.

As the handle 306 is moved backward and forward, linkage members 334 are rotated by the movement of the transverse finger axle 302. Simultaneously, gripping fingers 310 and arms 364 move upward or downward while maintaining a horizontal altitude due to the parallelogram linkage described above. Thus, rotational movement of shaft 302 is translated into vertical up or down movement of the gripping fingers 310.

Referring to FIG. 5, the recessed notch 332 and the linkage members 334 are configured to raise and lower the gripping fingers 310 relative to the surface of the feed ramp 16 and the first reference surface 94 while maintaining the gripping fingers in a horizontal orientation relative to the feed ramp, as described above. Thus, the gripping fingers 310 do not circumscribe an arc when the transverse finger axle 302 is rotated. Rather, when the transverse finger axle 302 is rotated in the clockwise direction, the gripping fingers 310 are displaced vertically downward below the surface of the feed ramp 30, for example, by a distance of about one to three inches, while still maintaining a substantially horizontal orientation.

Similarly, when the transverse finger axle 302 is rotated in the counter-clockwise direction, the gripping fingers 310 are displaced above the surface of the feed ramp 16. Note that the gripping fingers 310 of the loading sled 312 are initially disposed under the first reference surface 94 which is positioned at the back end of the support platform 14 and is referred to as the pre-feed position. Note that the pre-feed position is operative after the loading sled 312 has been rearwardly displaced from its initial forward position illustrated in FIG. 4A. When the loading sled 312 and the first reference surface 94 are positioned in the pre-feed position, counter-clockwise rotation of the transverse finger axle 302 displaces the gripping fingers 310 above the surface of the first reference surface, for example, by a distance of about one to three inches, while still maintaining a substantially horizontal orientation.

The support block 308 includes a longitudinal throughbore 340 (FIG. 5) through which the longitudinal support member 304 passes. The support member 304 is fixed in place by a pair of brackets 350 while bushings 352 within the throughbore 340 allow the support block 308 to be linearly displaced along the longitudinal support member 304. When the support block 308 is displaced in the forward or backward direction, the loading sled 312 and all associated gripping fingers 310 move in unison, since they are affixed to the finger axle 302.

As described above, the support block 308 and the gripping fingers 310 can be forwardly displaced a sufficient distance so as to be disposed forward of the support platform 14 and vertically above the surface of the conveyor belts 60. This is referred to as an "intermediate" position. Thus, linear displacement of the support block 308 and gripping fingers 310 from a position under the first reference surface 94 (pre-feed position) to a position above the conveyor belts 60 (intermediate position) is possible, as is desirable for reasons described in greater detail hereinafter.

Referring now to FIGS. 1, 5 and 6A–6B, in operation, after the documents 64 have been positioned on the first reference surface 94 in the "on-edge" orientation through the sequence illustrated in FIGS. 4A–4F, the documents are in the pre-feed position, as indicated on the left in FIG. 6A by reference numeral 354 showing documents 64 in phantom outline. Note that the stack of documents 64 is supported between the rear paddle 192 and the forward paddle 193.

Next, the handle 306 is rotated in the counter-clockwise direction to raise the gripping fingers 310 and the documents 64 above the level of the support fingers 180, for example, by a distance of about between one to three inches, as shown by arrow 356. The operator then applies forward pressure to the handle 306 to longitudinally displace the loading sled 312 and associated gripping fingers 310 in the forward direction 24, as shown by arrow 358. This forwardly displaces the documents 64 along with the forward and rear paddles 192 and 193 bordering the documents. Forward displacement of the loading sled 312 causes the on-edge documents 64 disposed on the gripping fingers 310 to be positioned forward of the support fingers 180 and the support platform 14. In FIG. 6A, the documents are shown in transit from the pre-feed position toward the conveyor belts 60.

Referring now to FIG. 6B, once the stack of documents 64 has cleared the forward edge of the pivoting platform 16 and is proximal to the conveyor belts 60, the documents are disposed in the intermediate position elevated above the conveyor belts 60, which may or may not be moving. Since the documents 64 are elevated above the level of the conveyor belts 60 in the intermediate position, there is no contact between the documents and the conveyor belts. Additionally, the forward paddle 193 and the rear paddle 192 prevent the stack of documents 64 from falling forward or backwards.

Next, the handle 306 is rotated in the clockwise direction to lower the gripping fingers 310 and the documents 64. As the gripping fingers 310 vertically lower the documents 64 toward the moving conveyor belts 60, the gripping fingers are recessed below the level of the conveyor belts since they are alternately spaced between the conveyor belts. When the gripping fingers 310 recess below the level of the conveyor belts 60, the documents 64 contact the conveyor belts in the "feed" position. The documents 64 are then transported in the forward direction 24 by the movement of the conveyor belts 60. Note that the forward paddle 193 and the rear paddle 192 move along with the stack of documents 64 under computer control (not shown) where control of the paddles may be separate from control of the conveyor belts 60.

For the operator to receive additional documents, the loading sled 312 is returned to the pre-feed position, as shown in FIG. 6A. The handle 306 is rotated in the counter-clockwise direction to raise the gripping fingers 310 above the level of the conveyor belts 60 once the documents 64 have been transported forwardly and have cleared the forward edge of the gripping fingers. Next, the loading sled 312 and associated gripping fingers 310 are rearwardly displaced toward the pivoting platform 18. When the loading sled 312 and the first reference surface 94 are in alignment, the handle 306 is rotated in the clockwise direction to downwardly displace the loading sled until the gripping fingers 310 are at substantially the same vertical level as the support fingers 180. The loading sled 312 is now back in the pre-feed position and more documents are ready to be unloaded from trays 28 by repeating the cycle of operation of the apparatus 10 described above.

Figure 7A:
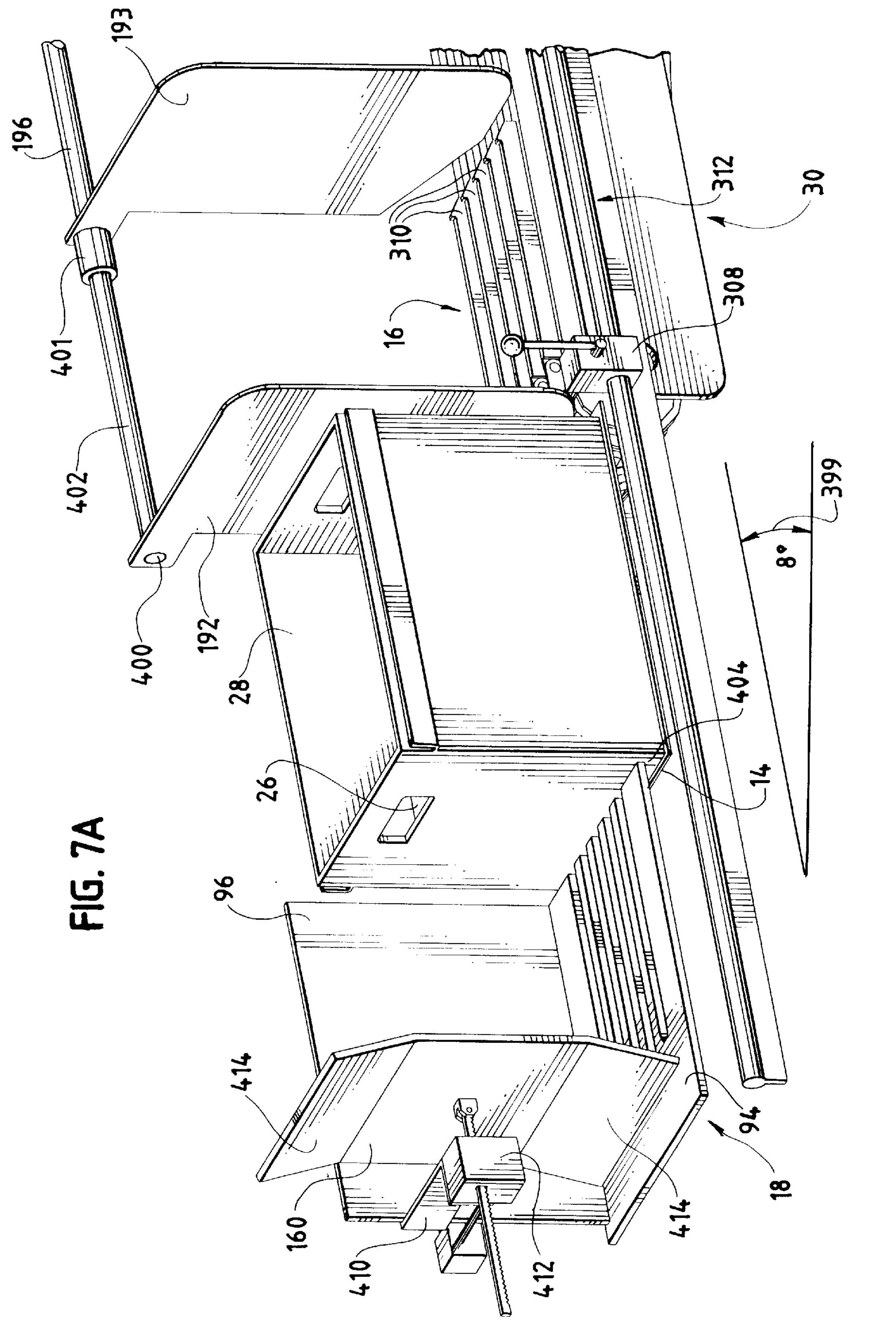
FIGS. 7A–7V are perspective views of an alternative embodiment of a pivotal tray unloading apparatus, particularly showing an operational sequence of unloading documents.
Figure 7B:
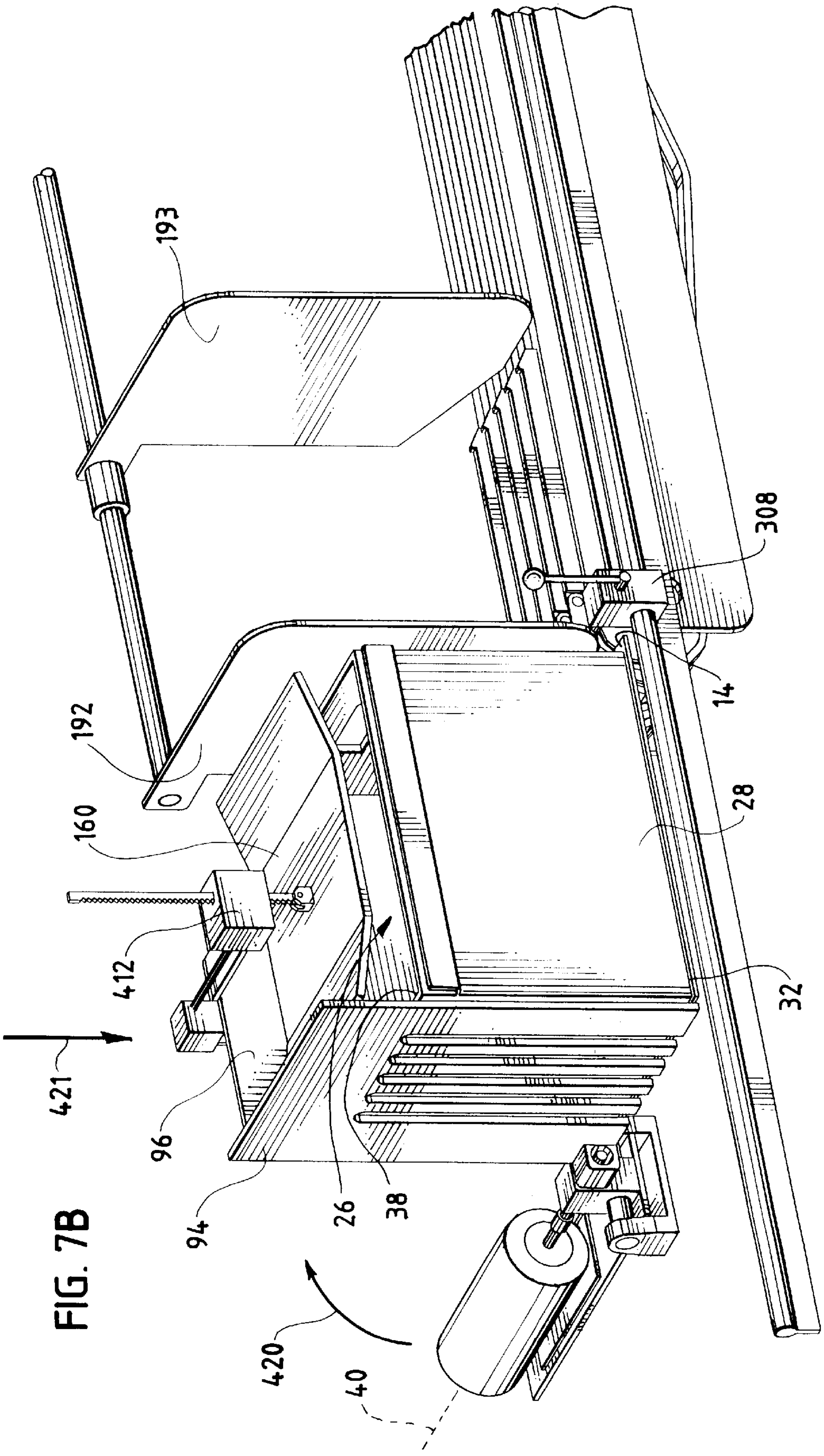
Figure 7C:
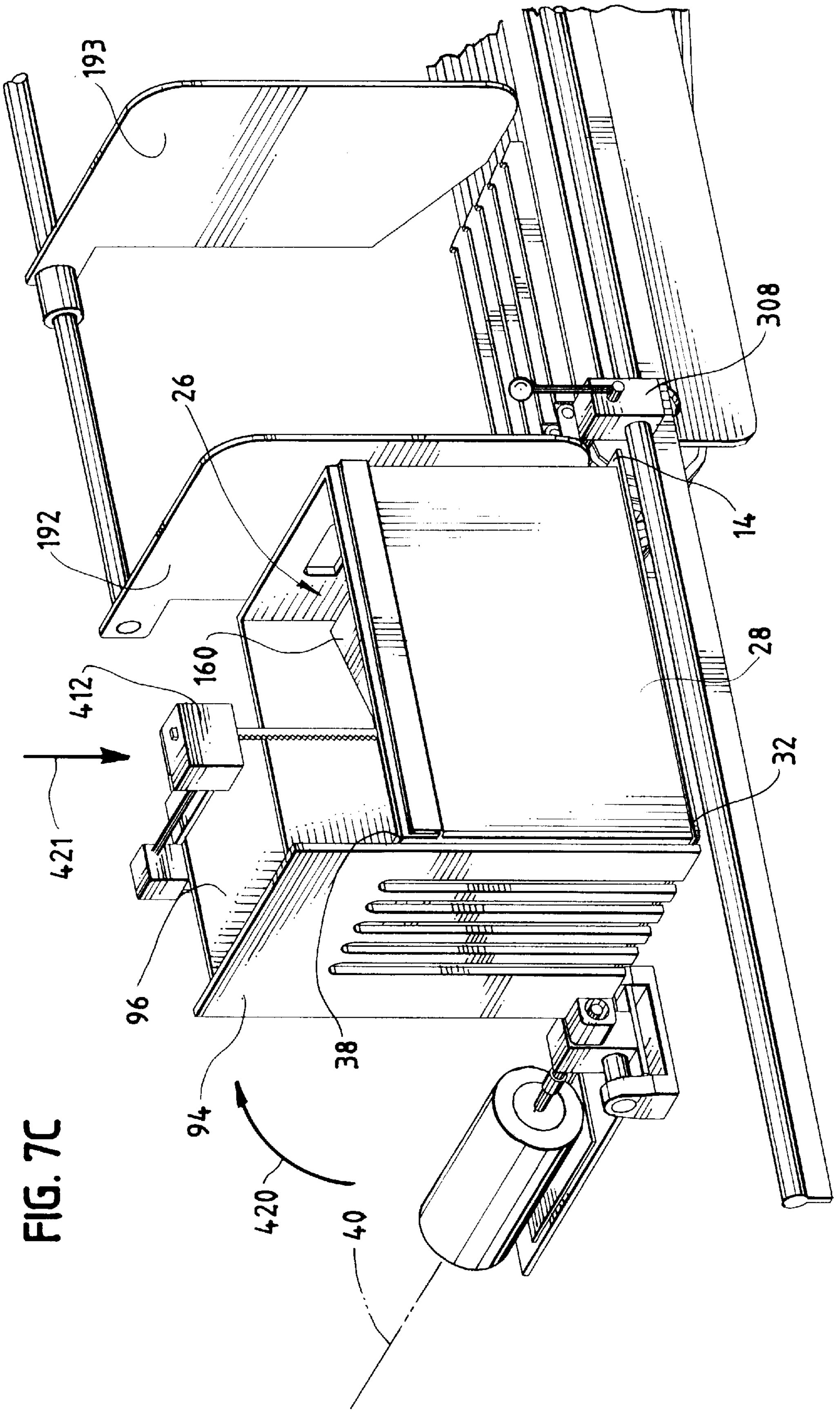
Figure 7D:
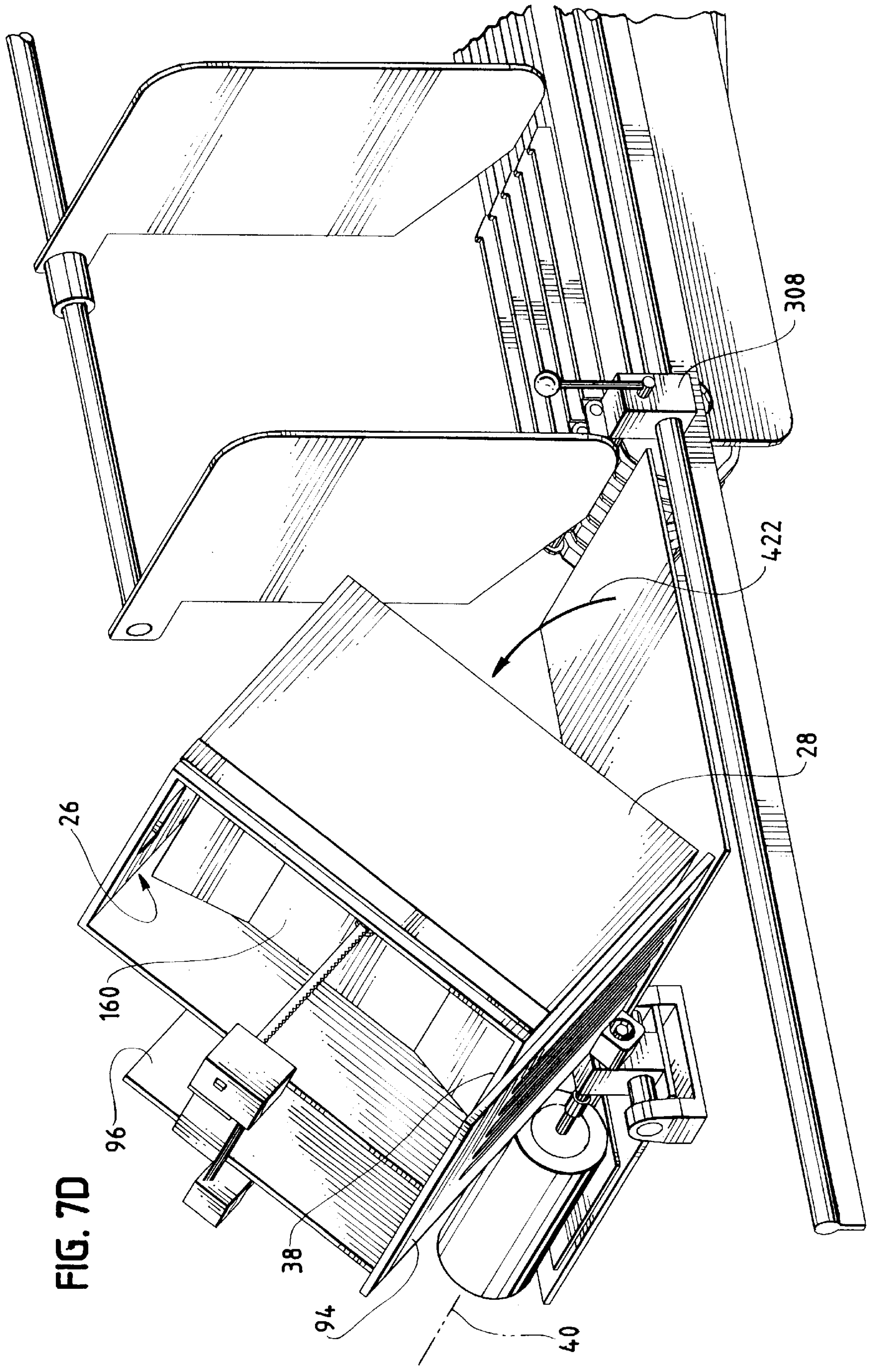
Figure 7E:
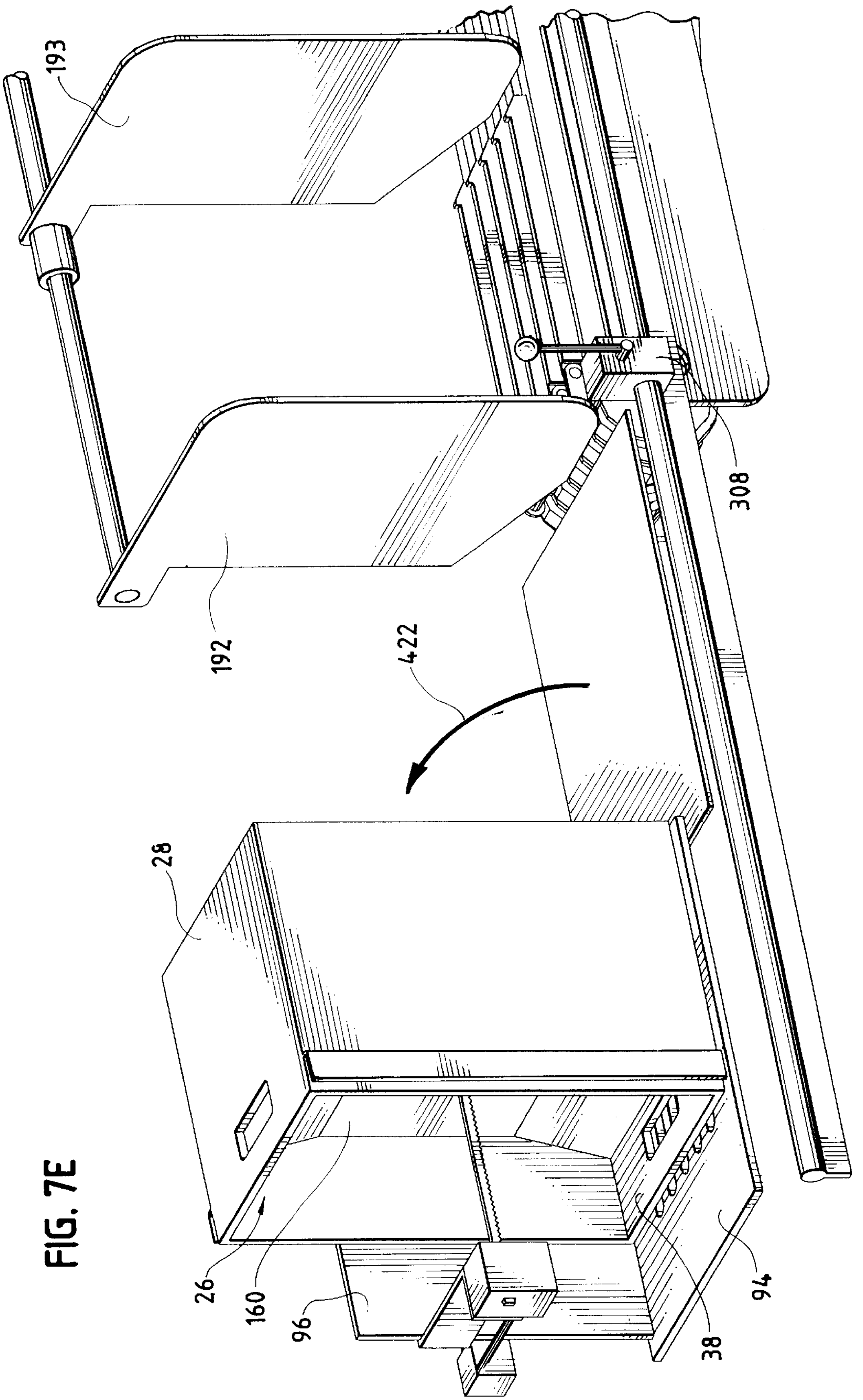
Figure 7F:
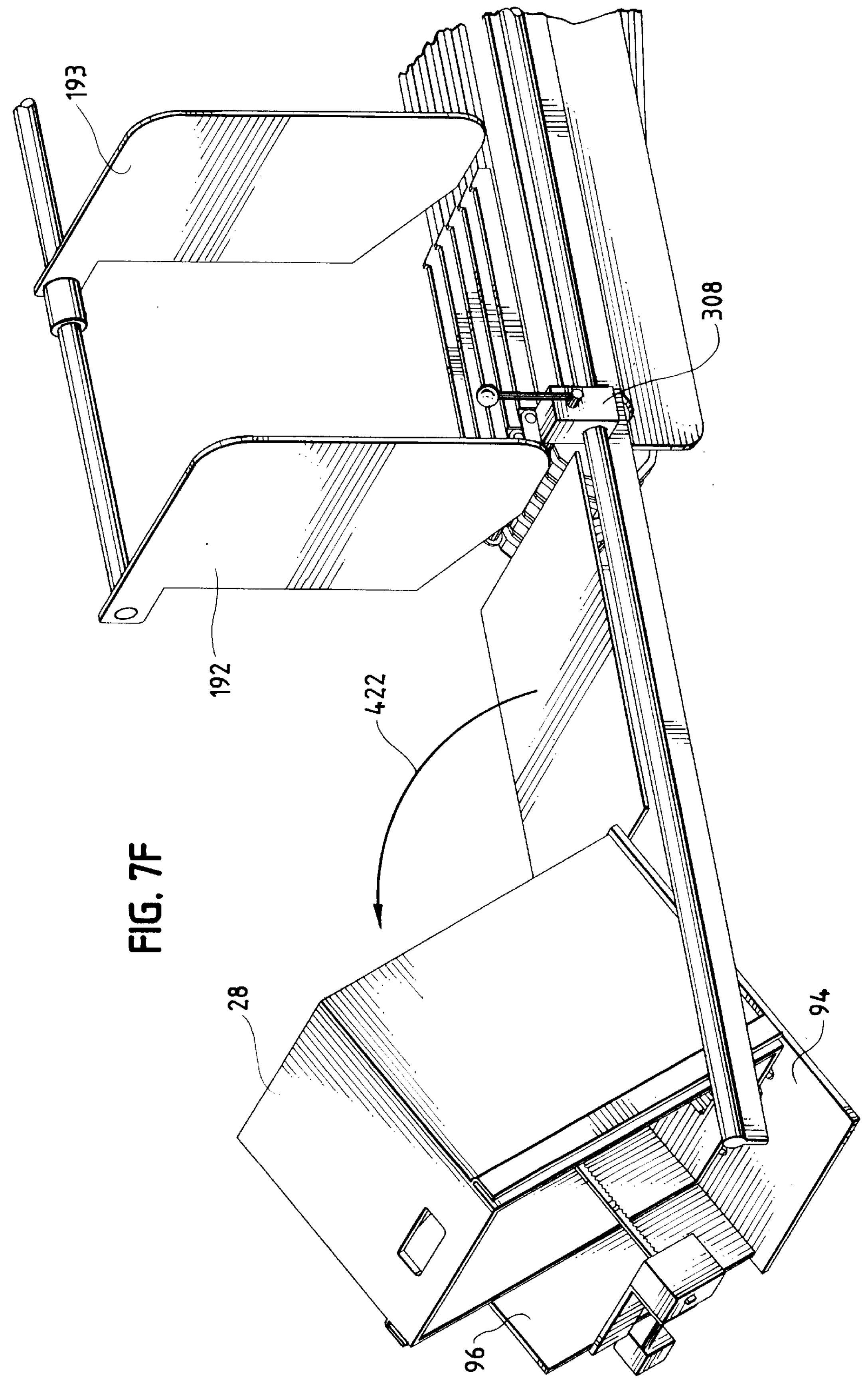
Figure 7G:
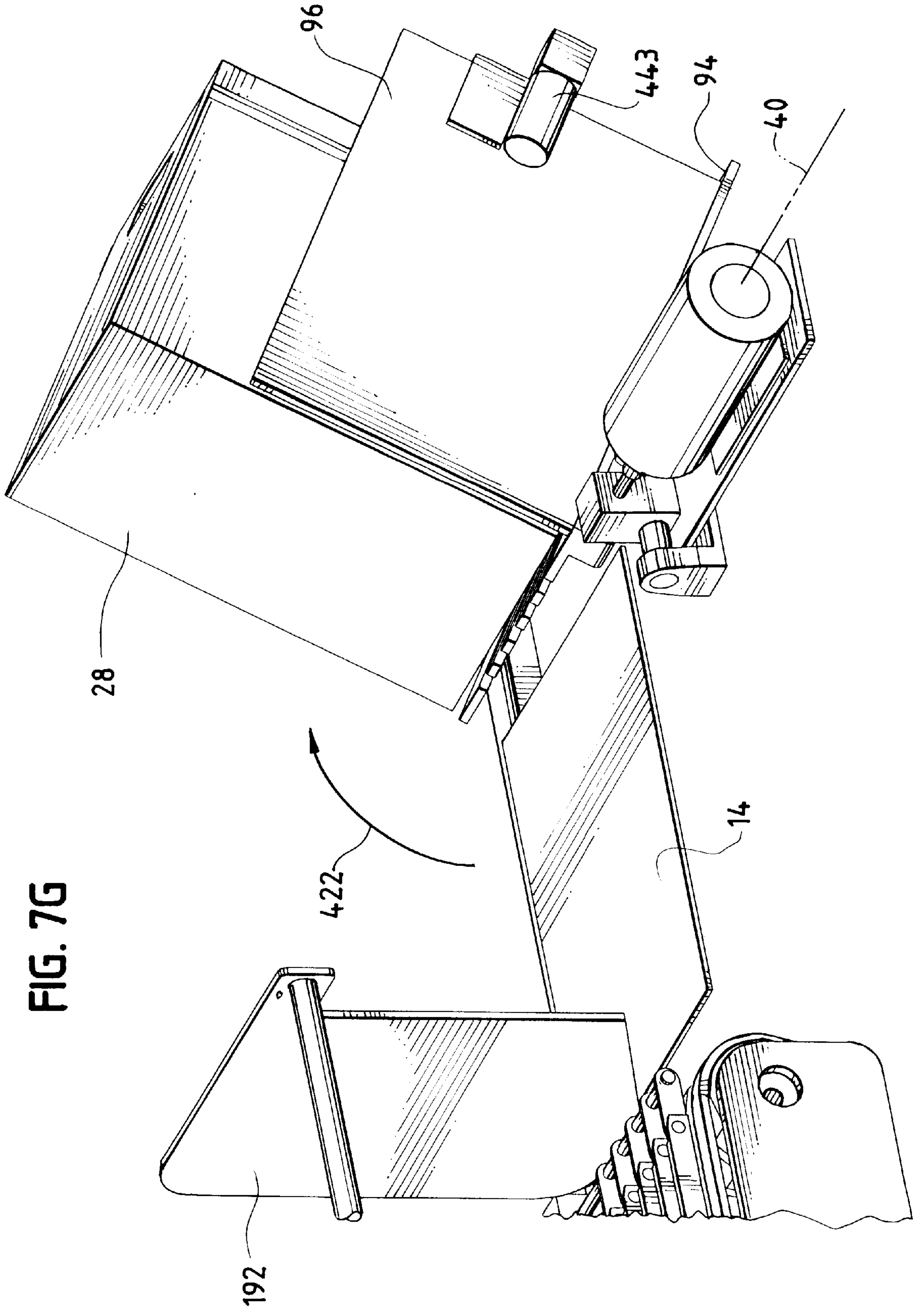
Figure 7H:
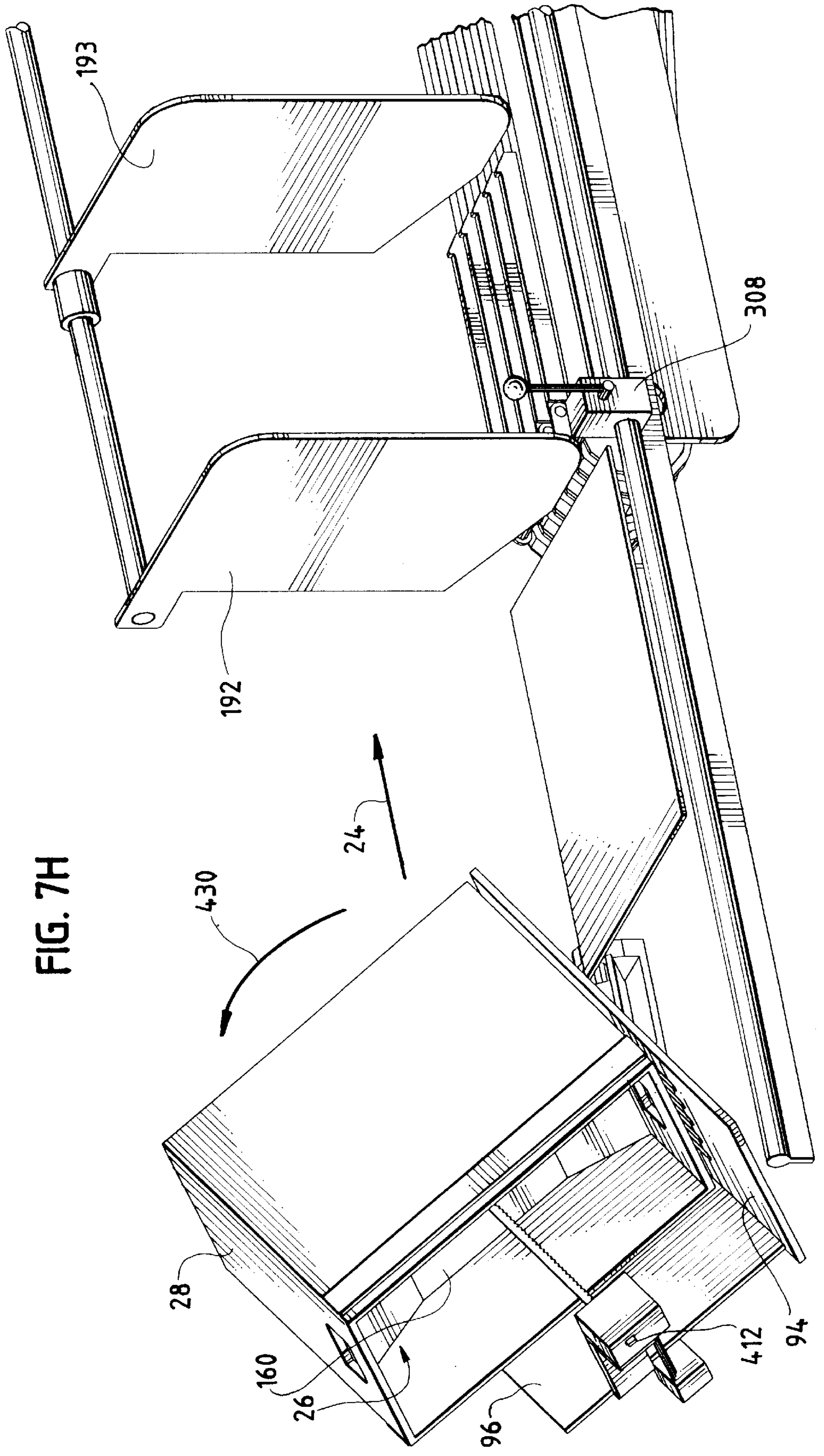
Figure 71:
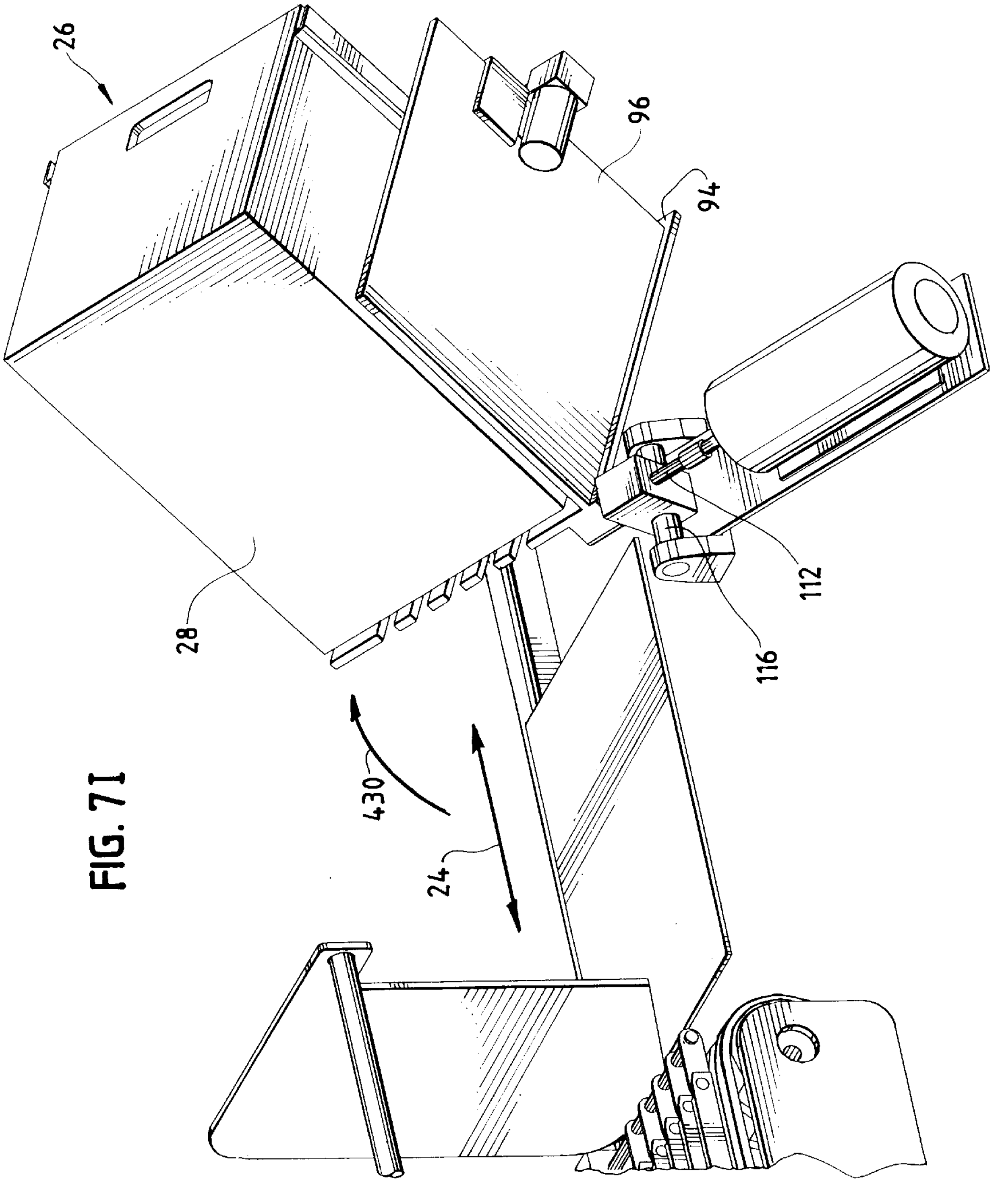
Figure 7J:
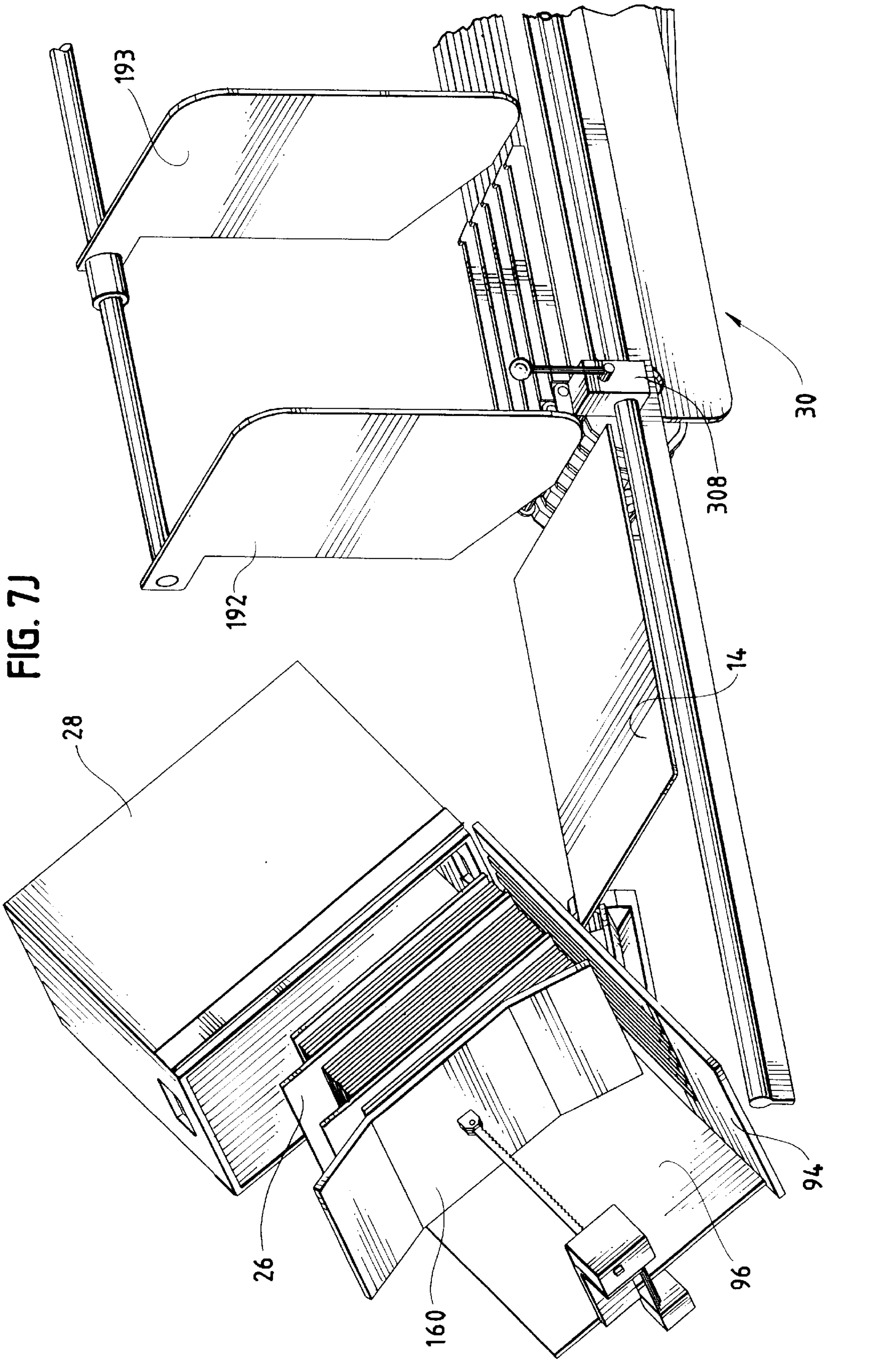
Figure 7K:
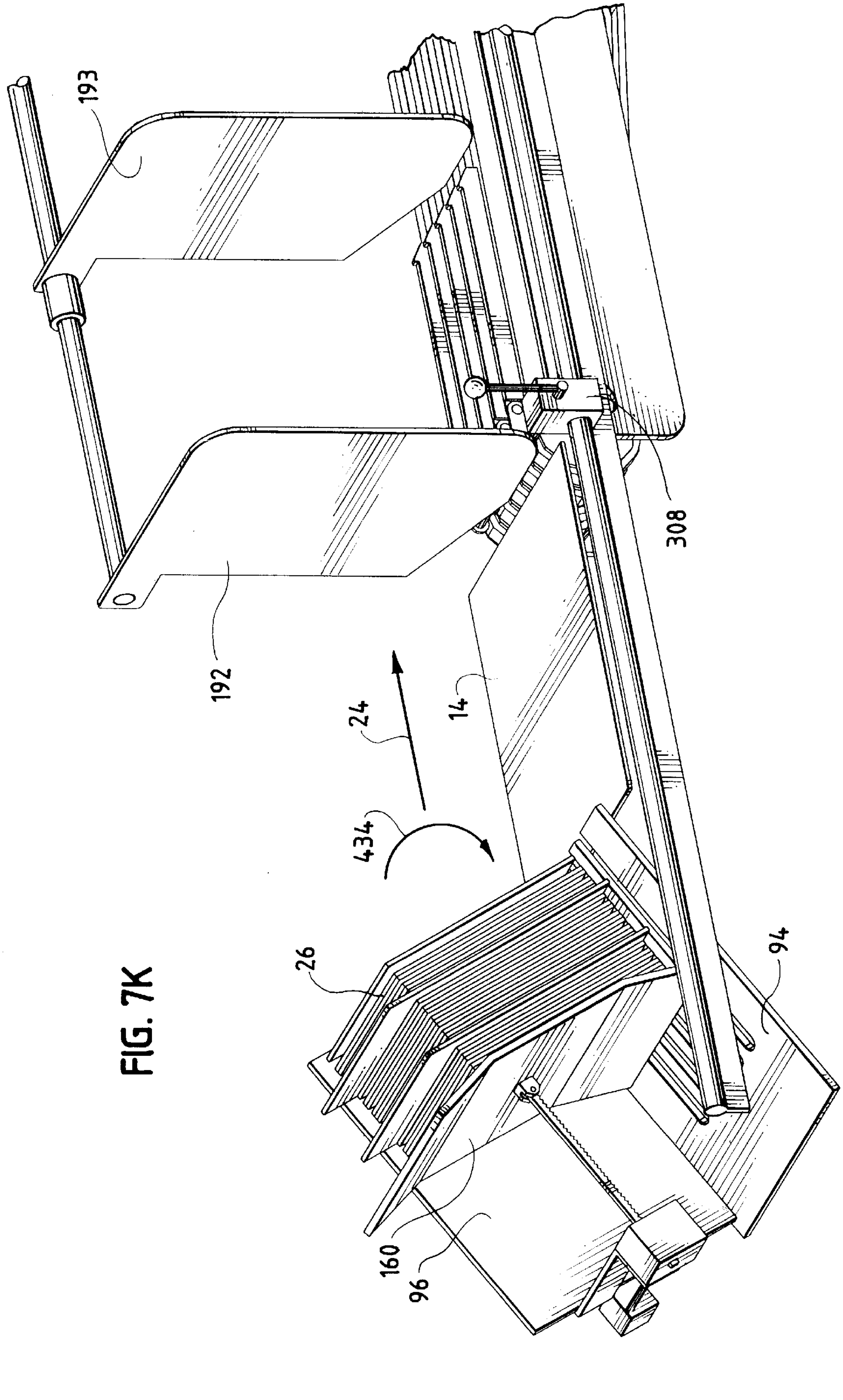
Figure 7L:
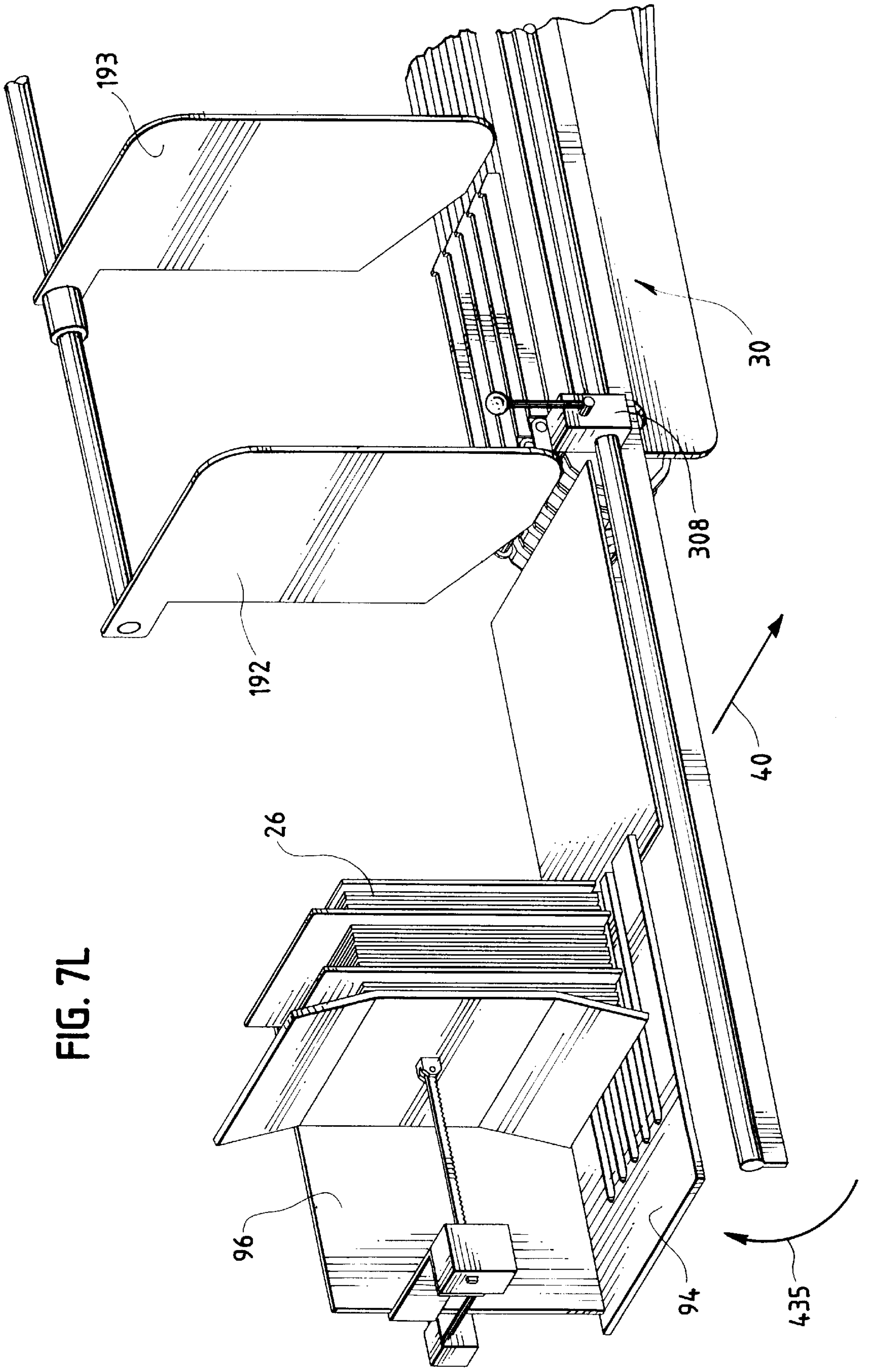
Figure 7M:
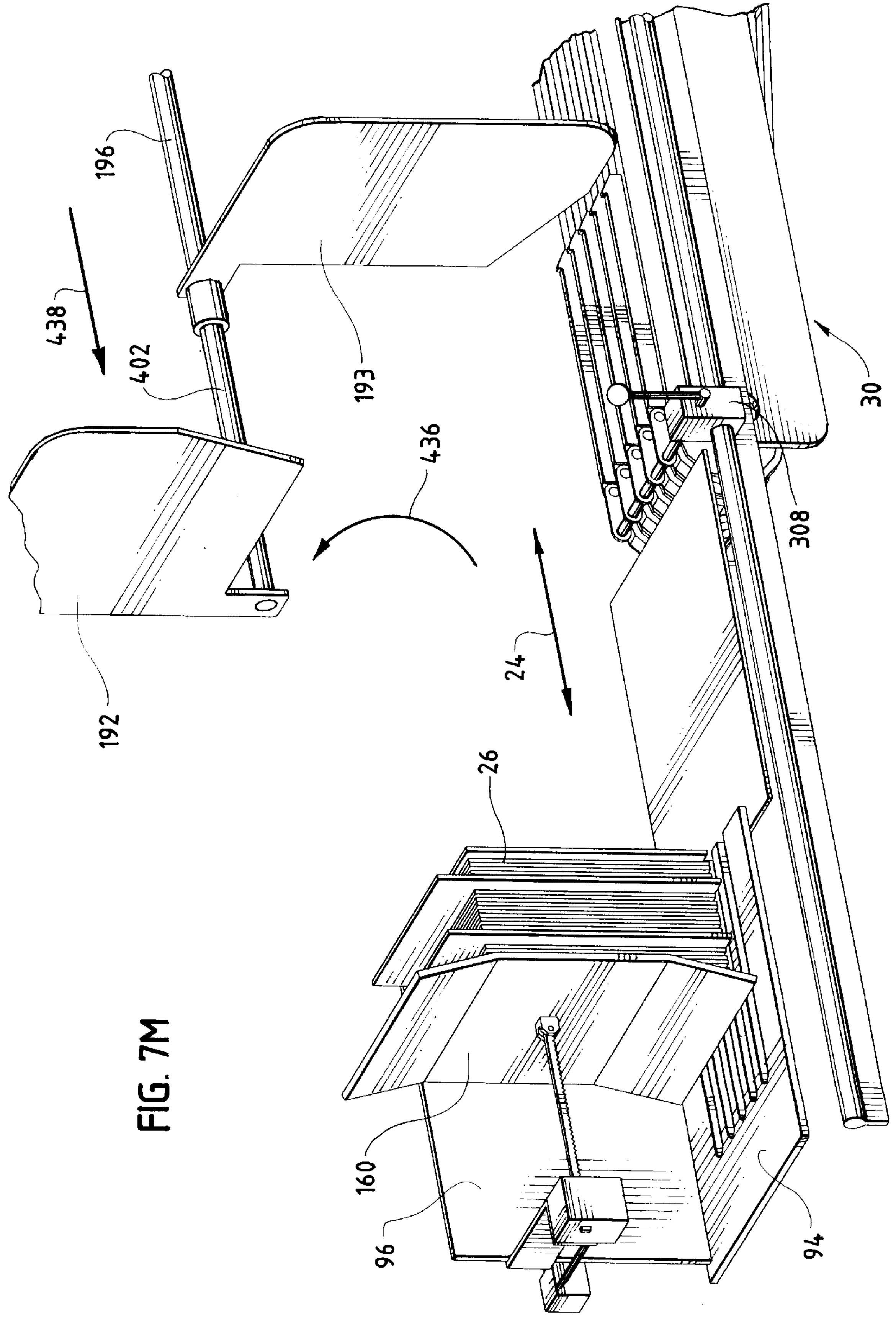
Figure 7N:
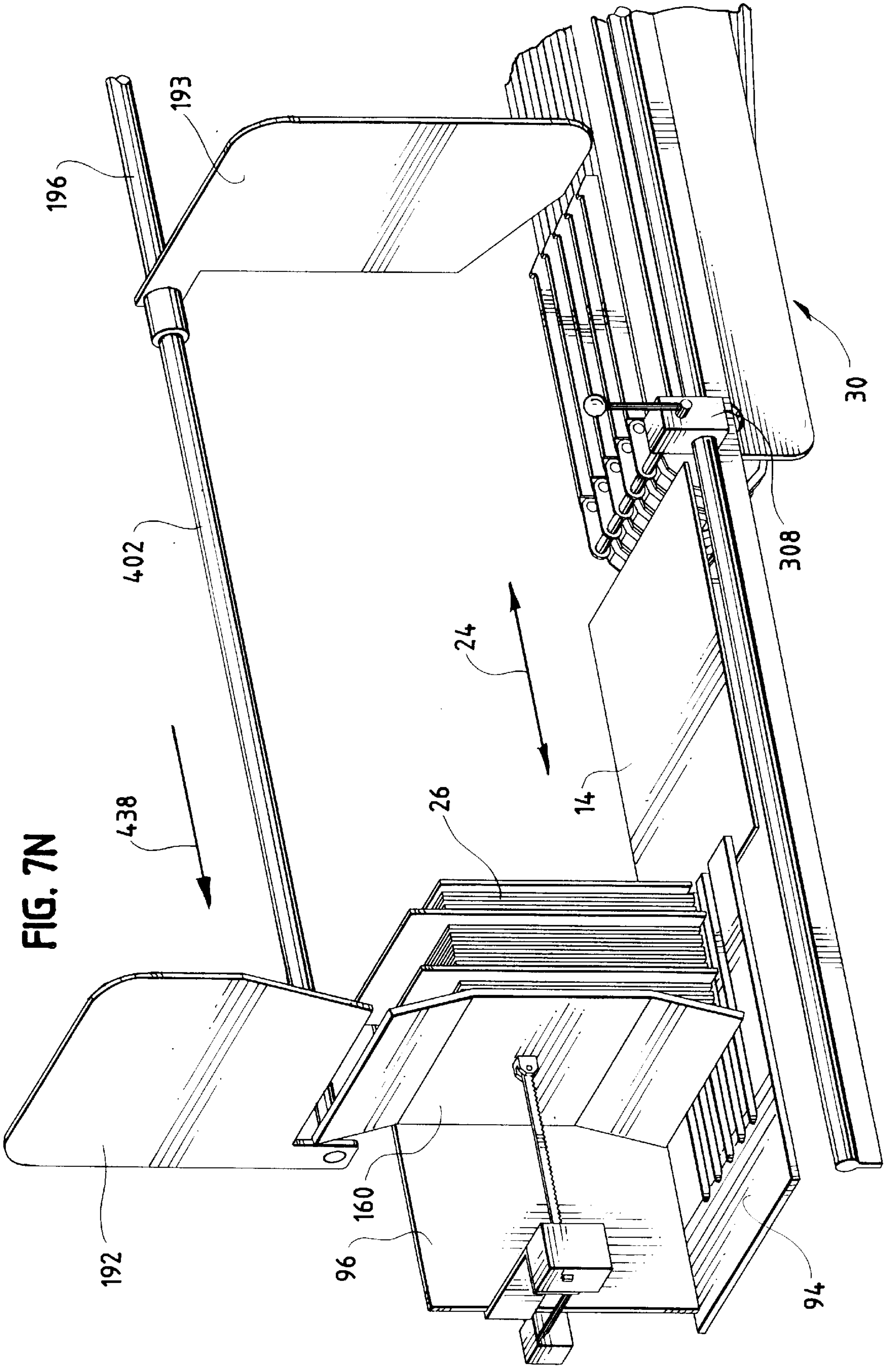
Figure 70:
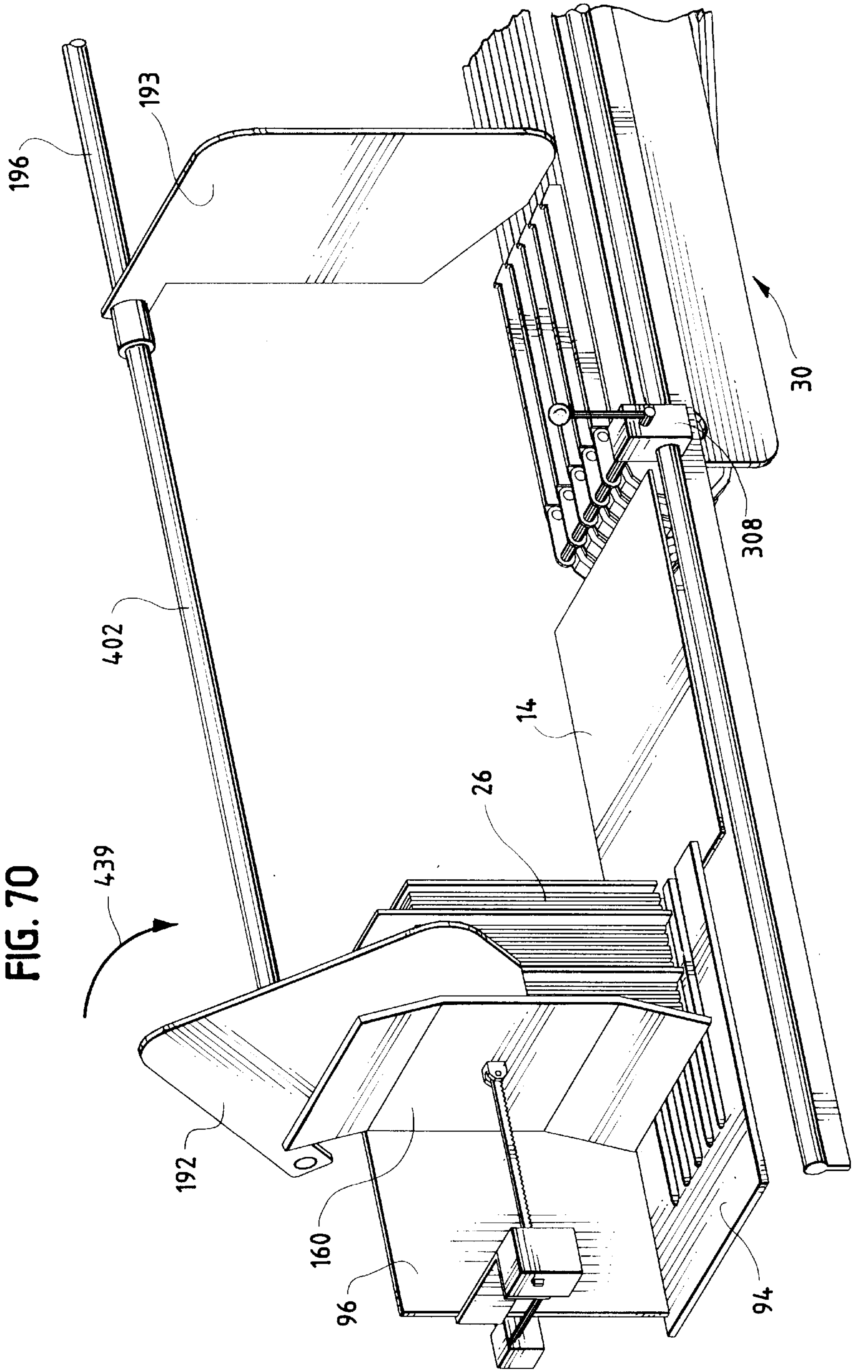
Figure 7P:
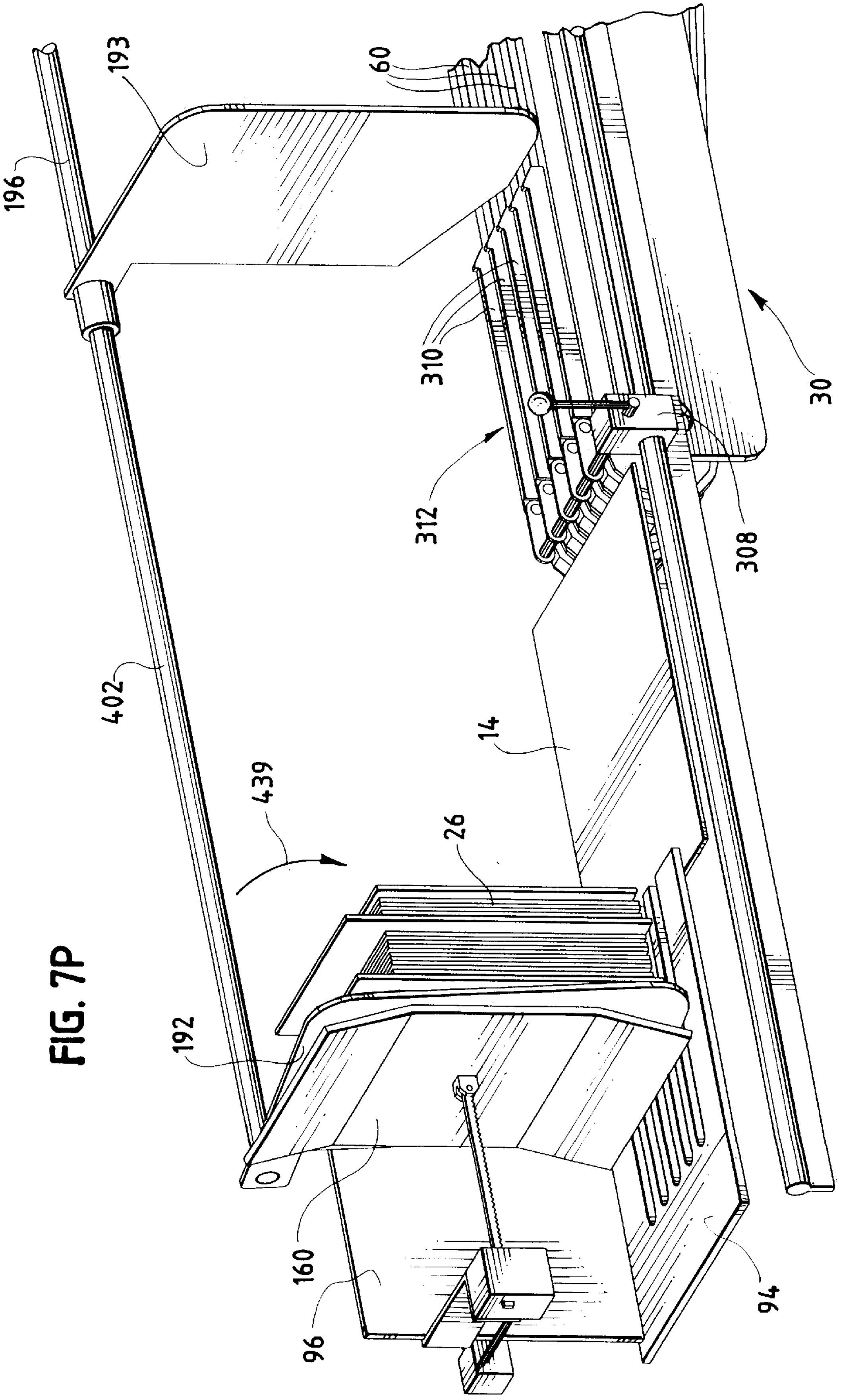
Figure 7Q:
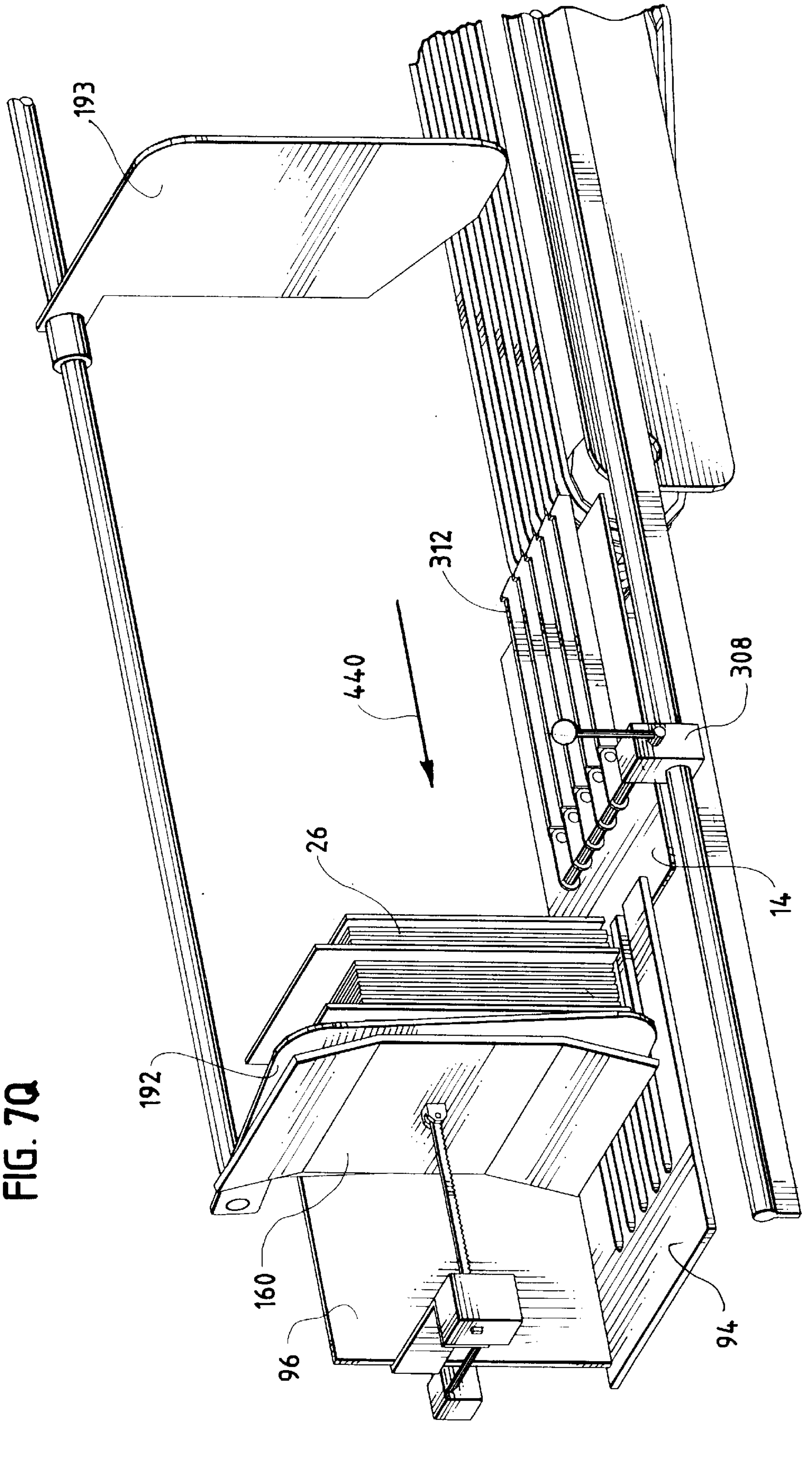
Figure 7R:
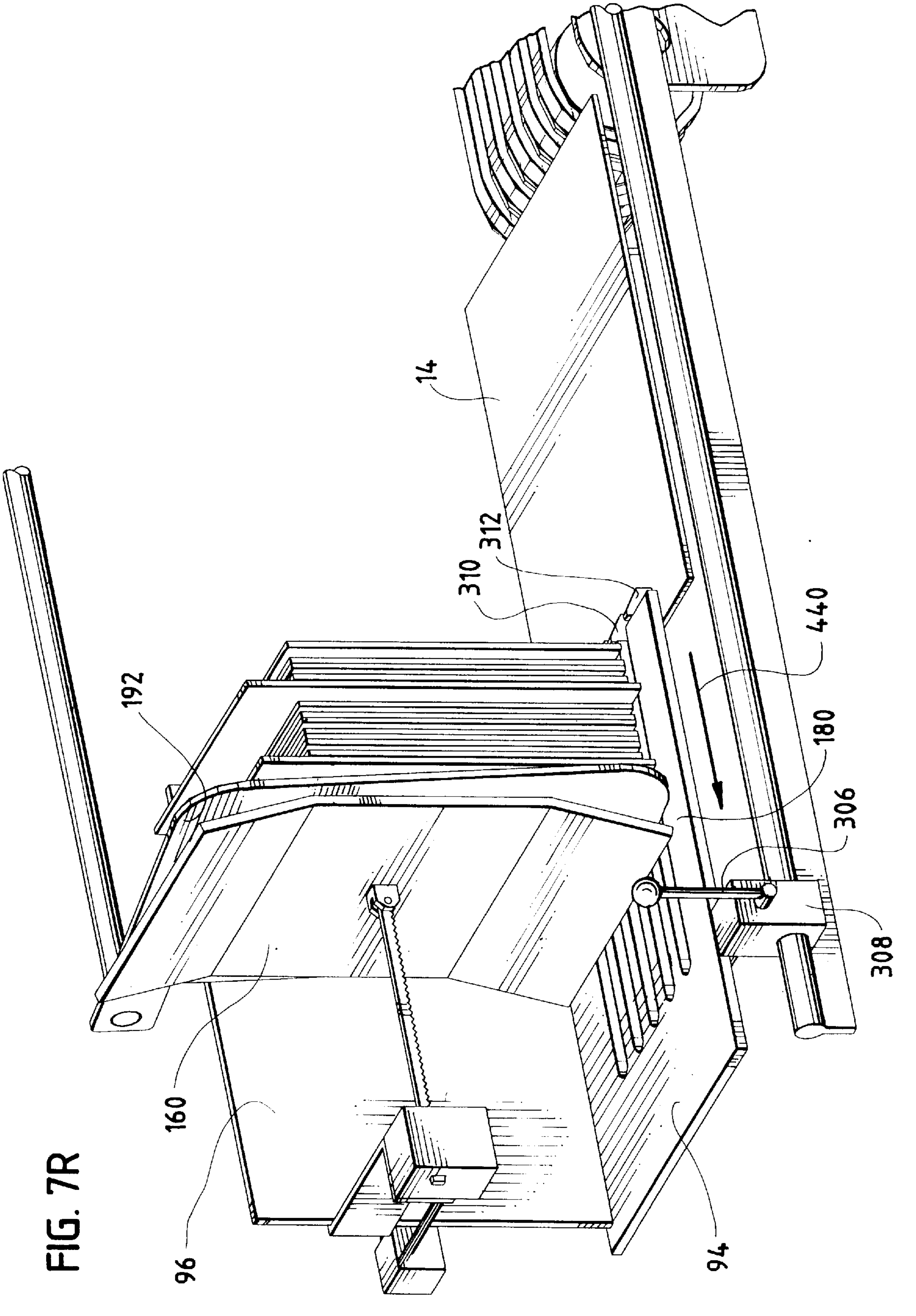
Figure 7S:
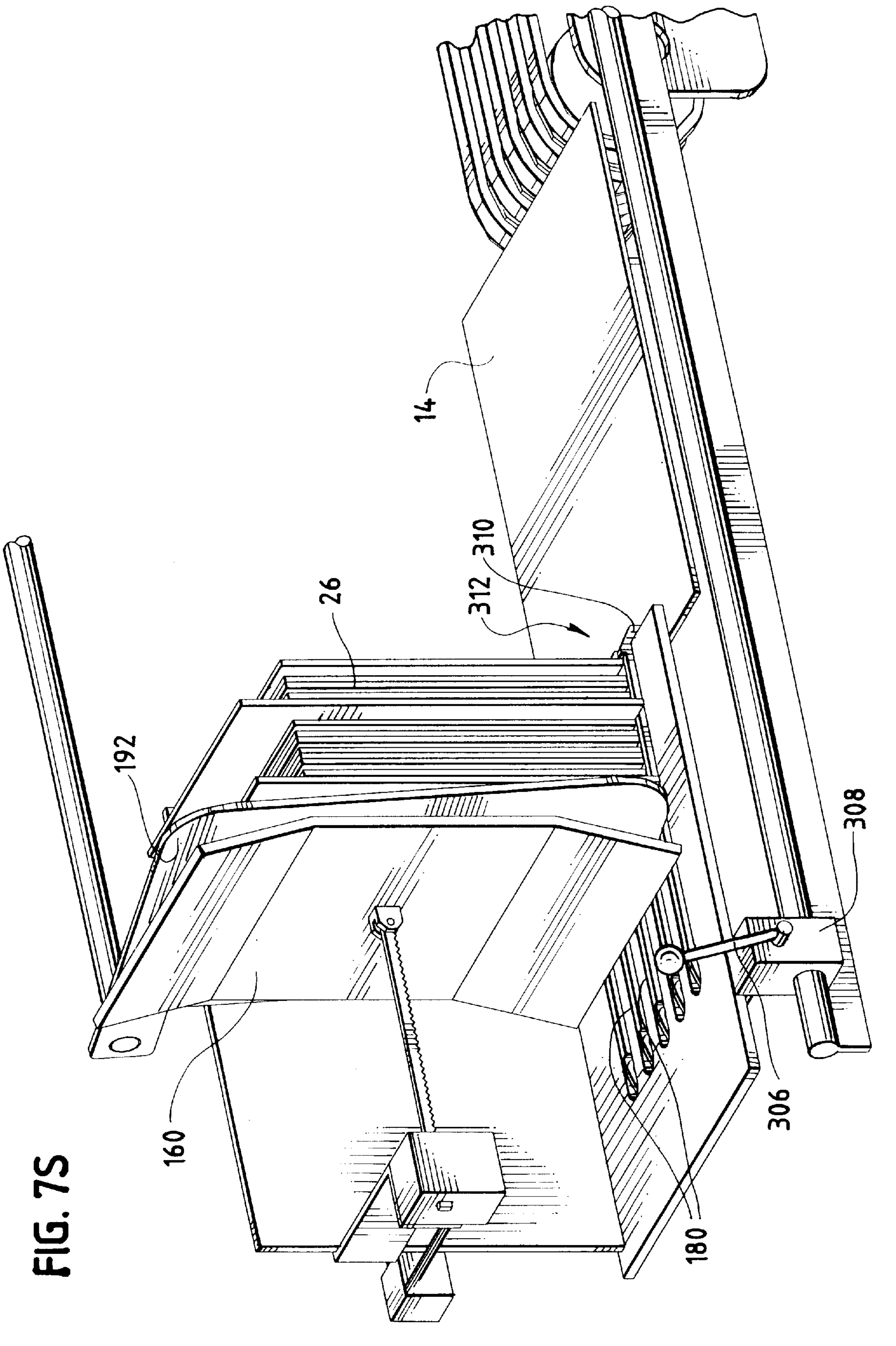
Figure 7T:
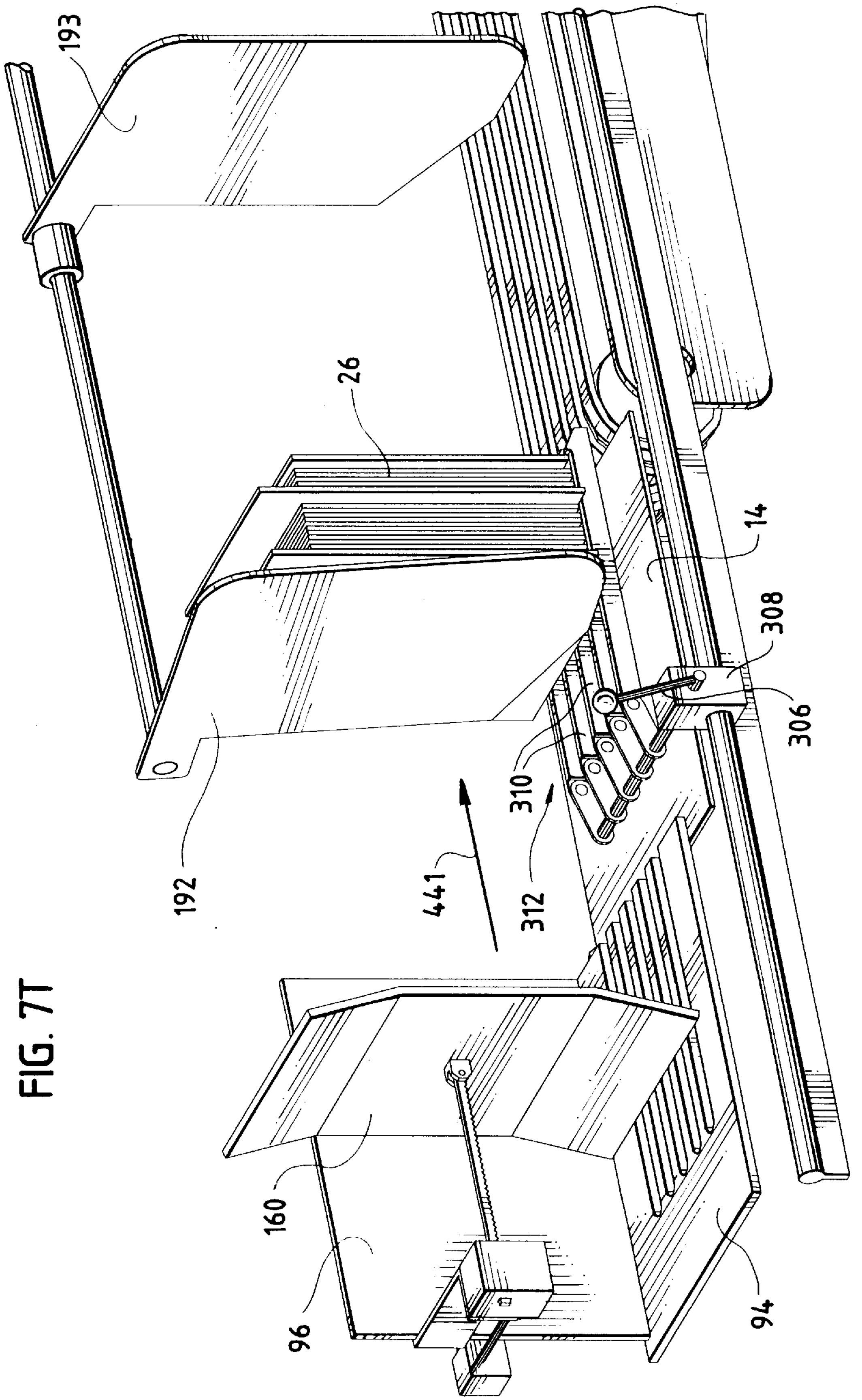
Figure 7U:
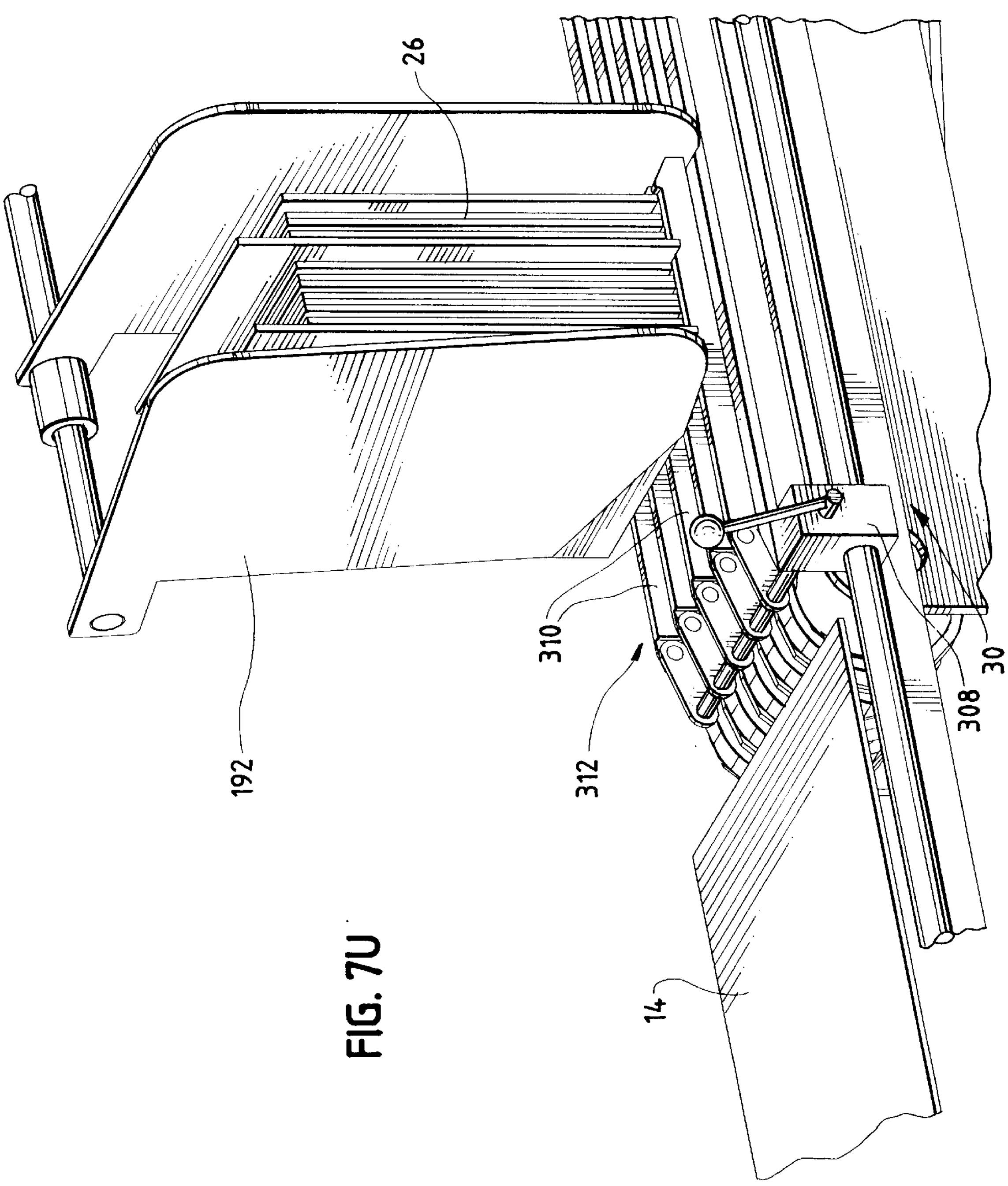
Figure 7V:
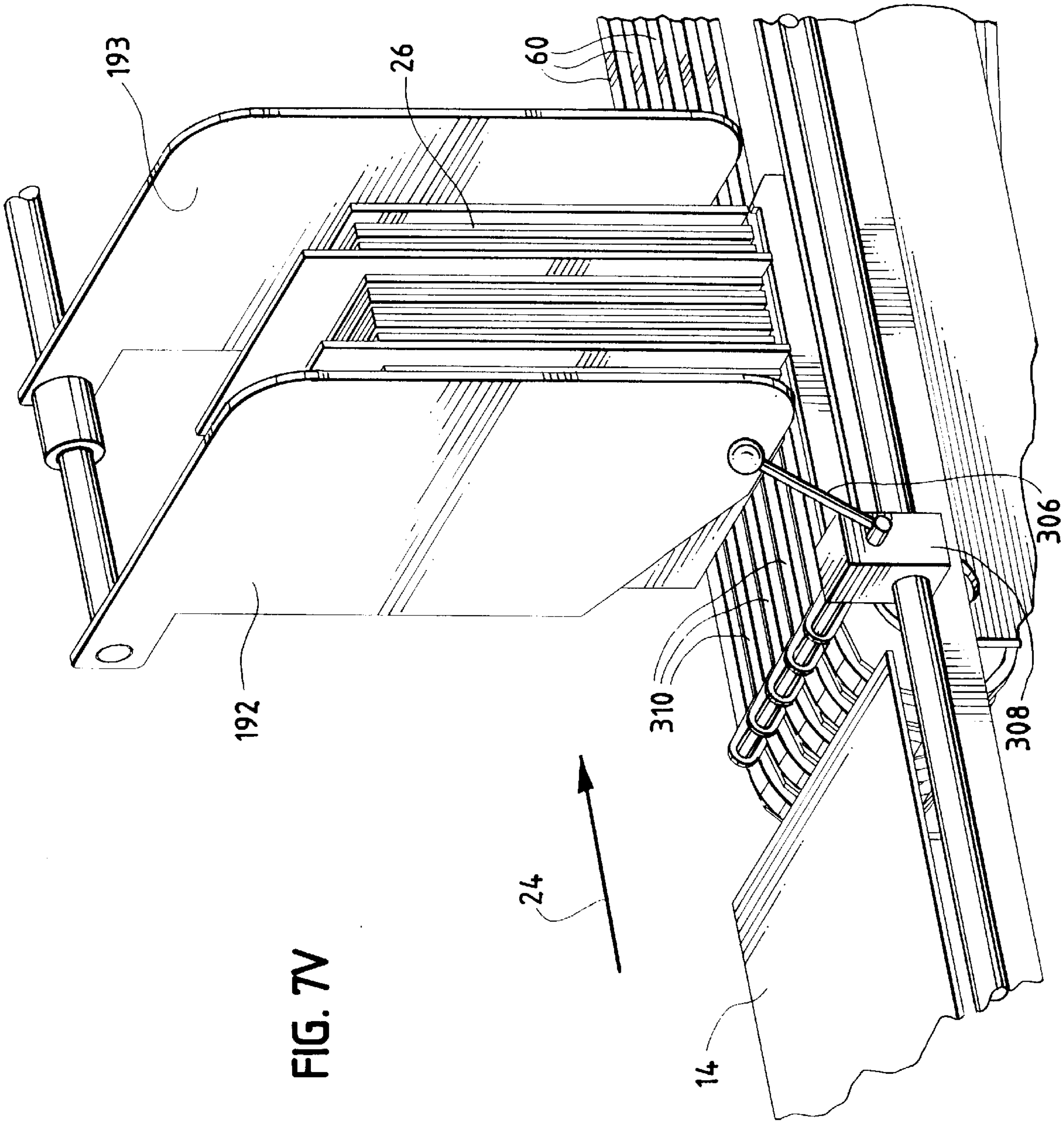

Referring now to FIGS. 7A–7V, an alternate embodiment of the apparatus 10 is shown where identical reference numerals are used to indicate like structures. FIGS. 7A–7V depict an operational sequence of unloading documents similar to the operational sequence illustrated in FIGS. 4A–4F.

Referring now to FIG. 7A, an operational sequence of unloading the documents 26 from the tray 28 is shown. Initially, the documents 26 are stacked within the tray 28 and the tray is placed on the tray platform 14 at a rest position. The tray platform 14 may be attached to the ramp wall 54 (FIG. 1) to provide a stable surface upon which to place the tray 28.

The tray platform 14, the feed ramp 30 and the pivoting platform 18 are all horizontally in-line and are inclined at about an eight degree angle relative to the floor, as shown by diagram 399. However, such an incline may, for example, be in the range of about between four degrees to twenty degrees.

In the illustrated embodiment, the rear paddle 192 and the forward paddle 193 are attached to the guide shaft 196 by rotatable couplings 400 and 401, respectively. The guide shaft 196 includes a telescoping portion 402 to which the rear paddle 192 is attached. The telescoping portion 402 has a diameter less than the diameter of the guide shaft 196 and is coaxially received therein such that forward and backward displacement of the rear paddle 192 is facilitated by the telescopic action.

Note that the first reference surface 94 of the pivoting platform 18 is vertically disposed above the plane of the tray platform 14 forming a gap 404 therebetween. Also, the vertical elevation of the loading sled 312 and associated gripping fingers 310 is at an intermediate height above the level of the tray platform 14 but below the level of the first reference surface 94 such that forward and rearward displacement of the loading sled permits the loading sled to fit within the gap 404 when the tray 28 is removed, as will be described in greater detail hereinafter.

The support paddle 160 is movably affixed to the second reference surface 96 by a bracket 410 and ratchet mechanism 412. The ratchet mechanism 412 is similar in function to the slider arm 164 shown in FIG. 1 and allows the support paddle 160 to be forwardly and backwardly displaced relative to the reference surfaces 94 and 96. The ratchet mechanism 412 may be manually operated or may be controlled by a motor (not shown). Additionally, edge plates 414 disposed on opposite sides of the support paddle 160 may be constructed from flexible material such that when the support paddle is lowered into the tray 28, the tray tends to become centered on the tray platform 14 via the aligning action of the edge plates.

Next, as illustrated in FIGS. 7B–7C, the first and second reference surfaces 94 and 96 are forwardly pivoted about the primary axis 40 whereby the first reference surface 94 engages the rear endwall 38 of the tray 28, as shown by arrow 420. The first reference surface 94 maintains planar communication with the rear endwall 38 of the tray 28.

As the first and second reference surfaces 94 and 96 are forwardly pivoted, the support paddle 160 is downwardly moved in the direction shown by arrow 421 and engages the uppermost document 26 in the tray 28 so as to retain and lightly compress the plurality of documents between the support paddle and the bottom surface 32 of the tray. As described above, displacement of the support paddle 160 toward the documents 26 sufficient to retain the documents may, for example, be performed manually, may be gravity assisted, or may be under motor control 443 (FIG. 7G).

Next, as shown in FIG. 7D, the first and second reference surfaces 94 and 96 and the tray 28 are simultaneously pivoted backward about the primary axis 40 to effect registration of the plurality of documents 26 toward the first reference surface, as shown by arrow 422. In this position, first common edges of the documents 26 are in planar alignment with the first reference surface 94 and with the rear endwall 38 of the tray 28.

FIGS. 7E and 7F next illustrate additional backward pivoting through ninety degrees, as shown in FIG. 7E, through a maximum pivot angle of about one-hundred and thirty-five degrees, as shown in FIG. 7F. However, rearward pivoting by about ninety degrees, shown in FIG. 7E, is sufficient to effect registration of the documents 26. Such pivoting, for example, may be in the range of about between ninety degrees to one-hundred and seventy degrees. Note that during rearward pivoting, as shown by arrow 422, the tray 28 simultaneously pivots along with the reference surfaces 94 and 96. FIG. 7G is a rear perspective view showing the apparatus 10 in the position shown in FIG. 7F, but from an opposite viewing angle.

Next, as illustrated in FIG. 7H, the first and second reference surfaces 94 and 96 are rotated leftwardly about the longitudinal axis 24 defined by the second drive shaft 116 (FIG. 4C) along with the tray 28 and the documents 26, as shown by arrow 430. Such leftward rotation affects registration of the documents 26 toward the second reference surface 96 such that second common edges 236 (FIG. 4C) of the documents are in planar alignment with the second reference surface 96 and are also perpendicular to the first common edges 234 (FIG. 4C) of the documents. Preferable, rotation of about thirty degrees is sufficient to effect registration of the documents 26 toward the second reference surface 96. However, such rotation, for example, may be in the range of about between twenty degrees to seventy-five degrees.

FIG. 7I illustrates the identical position of the tray 28 as shown in FIG. 7H, but viewed from an opposite viewing angle. Thus, in the position shown in FIGS. 7H–7I, the reference surfaces 94 and 96 and the tray 28 containing the documents 26 have been backwardly pivoted and leftwardly rotated so that the documents are registered toward the first and second reference surfaces and against the face of the support paddle 160 by the affect of gravity acting on the weight of the documents.

Next, as illustrated in FIG. 7J, the tray 28 is removed while the documents 26 retain registration against the first and second reference surfaces 94 and 96 and against the face of the support paddle 160, simultaneously. Since the documents 26 have been pivoted backwardly and rotated leftwardly, they remain in position and cannot fall over. Note that the rear paddle 192 has been rearwardly displaced to a position between the forward edge of the tray platform 14 and the rearward edge of the feed ramp 30.

As illustrated in FIG. 7K, after the tray 28 (FIG. 7J) has been removed, the first and second reference surfaces 94 and 96 and the plurality of documents 26 are rightwardly rotated about the longitudinal axis 24, as shown by arrow 434. The degree of rightward rotation is essentially equal to the degree of previous leftward rotation 430 illustrated in FIGS. 7H–7J, such that the first reference surface 94 and the documents 26 are disposed in an unrotated position with respect to the feed ramp 30.

Next, as illustrated in FIG. 7L, the first and second reference surfaces 94 and 96 and the plurality of documents 26 are forwardly pivoted about the primary axis 40, as shown by arrow 435. The degree of further forward pivoting places the first reference surface 94 in a coplanar relationship with the feed ramp 30 which is inclined at the eight degree angle, as previously described. Thus, if the amount of initial rearward pivoting was equal to one-hundred thirty-five degrees, for example, as illustrated in FIGS. 7E–7G, then the amount of further forward pivoting, as illustrated in FIG. 7L, is equal to about forty-five degrees so that the first reference surface 94 is substantially coplanar with the feed ramp 30. However, such forward pivoting, for example, may be in the range of about between zero degrees to eighty degrees, depending on the amount of prior rearward pivoting. Note that the documents 26 remain in an upright position and do not fall forward due to the eight degree incline of the apparatus 10, generally.

Referring now to FIGS. 7M–7P, the rear paddle 192 is upwardly rotated, as shown by arrow 436 in FIG. 7M, and rearwardly displaced along the longitudinal axis 24, as shown by arrow 438 in FIG. 7N. Such rearward displacement is facilitated by the telescoping portion 402 of the guide shaft 196. The rear paddle 192 is then downwardly rotated so that it is "wedged" between the support paddle 160 and the rear portion of the stack of documents 26, as shown by arrow 439 in FIG. 7O. This effects positioning of the documents 26 in an on-edge orientation in a generally coplanar relationship with the conveyor belts 60 of the feed ramp 30, with the rear paddle 192 providing vertical support at the back end of the documents, as shown in FIG. 7P.

As shown in FIG. 7P, the documents 26 are disposed in the "on-edge" position supported on the bottom by the first reference surface 94 and are registered against both reference surfaces 94 and 96. This position is referred to as the "pre-feed" position and it is from this position that the documents 26 are forwardly displaced toward the feed ramp 30, as will be described hereinafter. Note that the loading sled 312 is still positioned ahead of the tray platform 14 and is disposed vertically above the feed ramp 30 and the conveyor belts 60.

Referring now to FIGS. 7Q and 7R, the loading sled 312 is rearwardly displaced utilizing handle 306 toward the first and second reference surface 94 and 96, as shown by arrow 440. Note, that the loading sled 312 is sufficiently vertically elevated such that it clears the tray platform 14 during rearward displacement to achieve positioning just under the first reference surface 94. Thus, as illustrated in FIG. 7R, the loading sled 312 and the associated gripping fingers 310 are positioned just beneath the first reference surface 94 and the associated support fingers 180.

Next, as shown in FIG. 7S, the handle 306 is rotated in the counter-clockwise direction to vertically raise the gripping fingers 310 and the documents 26 above the level of the support fingers 180. The documents 26 are then vertically supported by the gripping fingers 310 of the loading sled 312 and not by the supporting fingers 180 of the first reference surface 94.

As shown in FIG. 7T, the operator then applies forward pressure to the handle 306 to forwardly displace the loading sled 312, associated griping fingers 310 and the documents 26 in the forward direction, as shown by arrow 441. This forwardly displaces the documents 26 along with the rear paddle 192 bordering the documents. As the documents 26 and the loading sled 312 are forwardly displaced, they pass above and forward of the tray platform 14 until the documents 26, the loading sled and the rear paddle 192 are positioned forward of the tray platform and directly above the feed ramp 30, as shown in FIG. 7U.

Referring now to FIG. 7V, the handle 306 is then rotated in the clockwise direction to lower the gripping fingers 310 and the documents 26. As the gripping fingers 310 vertically lower the documents 26 toward the moving conveyor belt 60, the gripping fingers are recessed below the level of the conveyor belts since they are alternately spaced between the conveyor belts. When the gripping fingers 310 are recessed below the level of the conveyor belts 60, the documents 26 contact the conveyor belts in the "feed" position. The documents 26 are then transported in an upright position and in the forward direction 24 by movement of the conveyor belts 60. Note that the forward paddle 193 and the rear paddle 192 move along with the documents 26 under computer control (not shown) where control of the paddles may be separate from control of the conveyor belts 60. The loading sled 312 then remains in the position shown in FIG. 7V while an additional tray 28 of documents 26 (FIGS. 7A–7J) is loaded onto the apparatus 10, and the cycle is repeated.

Figure 8:
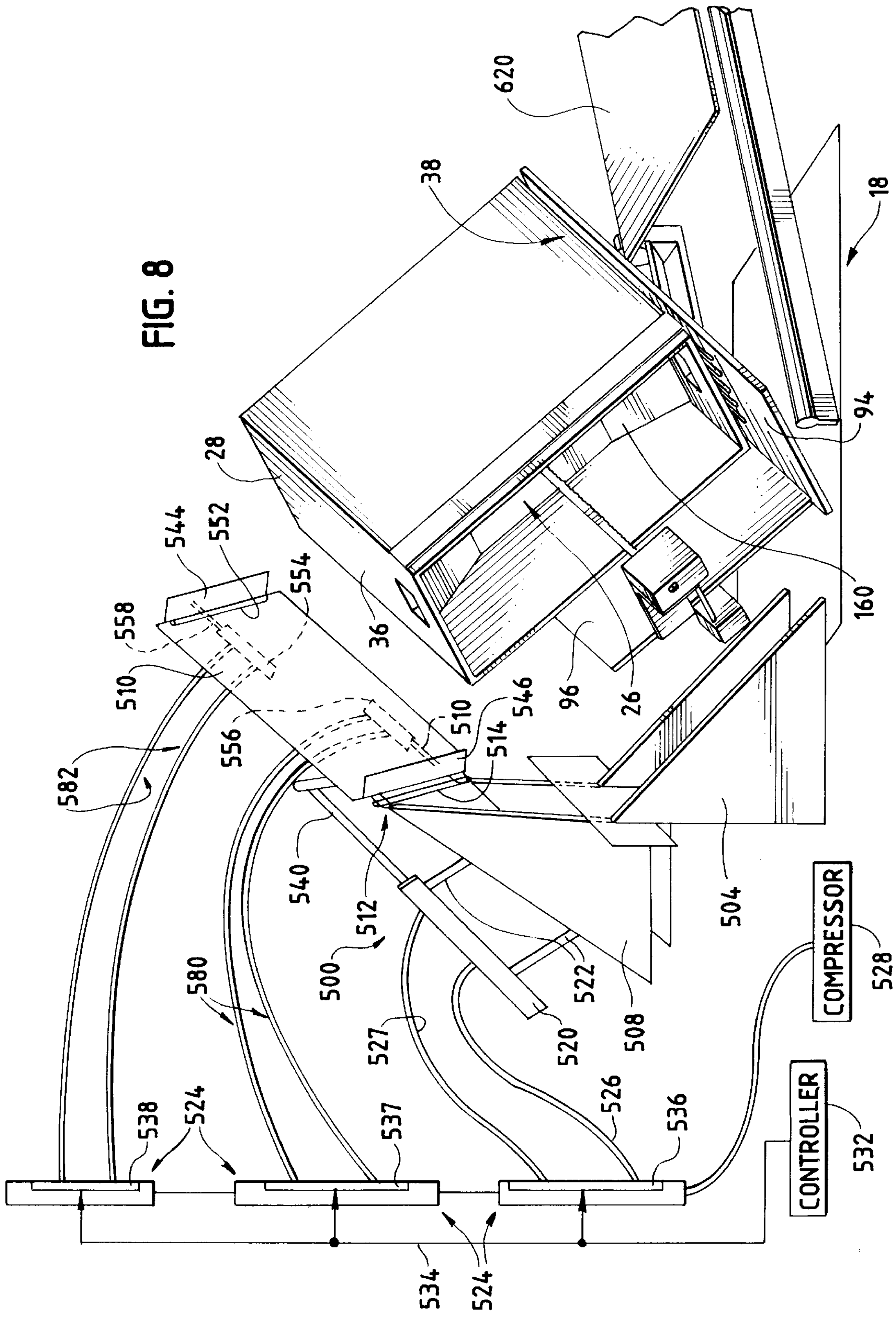
FIG. 8 is a perspective view of an alternate embodiment of a pivoting document unloading platform particularly showing a tray removing device connected thereto.

Referring now to FIG. 8, an alternate embodiment of the apparatus 10 (FIG. 1) is shown where like reference numerals are used to identify like structures. A tray removing device 500 is connected to or placed adjacent the pivoting unloading document platform 18 by a metal brace or plate 502 so that the distance between the tray removing device is fixed relative to the pivoting unloading document platform formed by reference surfaces 94 and 96. The tray removing device 500 includes a base portion 504 for supporting the device which may be constructed, for example, from a pair of spaced apart triangular metal plates fixed in place with welds, bolted brackets, rivets and the like, as is known in the art. However, the base portion may be constructed using any suitably shaped structure capable of supporting the device 500, such as brackets or beams.

An extension portion 508 fastened to the base portion 504 provides an elevated platform for supporting various components, as will be described hereinafter. The extension portion 508 may be, for example, constructed from triangular metal plates, similar to the metal plates of the base portion 504. A container removing arm assembly 510 is pivotally mounted to a distal end 512 of the extension portion 508 and is attached thereto by a pivot pin 514 which is received through corresponding apertures disposed in both the distal end of the extension arm and the container removing arm. The container removing arm 510 is formed as a generally planar rectangular plate having somewhat similar dimensions as the forward or rear endwalls 36 and 38 of the tray 28. The function of the container removing arm assembly 510 is to forwardly pivot until it contacts the forward endwall 36 of the tray 28 and is coplanar therewith. The container removing arm 510 is configured to releasably engage the tray 28, rearwardly pivot, and remove the tray from the first and second reference surfaces 94 and 96 once the documents 26 are registered and aligned toward these reference surfaces.

To effect pivotal displacement of the container removing arm assembly 510 about pivot pin 514, a dual-acting pneumatic arm cylinder 520 is affixed at one end of the extension portion 508. The pneumatic arm cylinder 520 may be mounted on raised standoffs 522 to attain proper angular positioning so that pivoting of the container removing arm 510 results in coplanar contact with the forward or rear endwalls 36 and 38 of the tray 28. The arm cylinder 520 is connected to a switchable pneumatic manifold 524 via first 526 and second 527 air input lines. The switchable pneumatic manifold 524, in turn, is directly connected to a source of compressed air 528, such as a known air compressor or the like.

A controller 532 is operatively coupled to the air compressor 528 and selectively activates and deactivates the air compressor as required to maintain a suitable level of pressure. The controller 532 may be a microprocessor, a programmable array logic device or discrete components, or any other suitable control device, as is known in the art. The controller 532 is also coupled to the manifold 524 through a series of electrical control lines 534 to control a series of independent pneumatic switches 536, 537, and 538 coupled thereto.

The pneumatic switch 536 associated with the arm cylinder 520 directs compressed air through one of its two outputs, such as through one of the two air input lines 526 and 527. The electrical control lines 534 are shown as a single line for purposes of illustration only, however, multiple lines exist. Each of the electrical control lines 534 independently controls an independent pneumatic switch 536–538 so that various pneumatic cylinders may be independently actuated, as will be described in greater detail hereinafter.

With respect to the arm cylinder 520 under control of the computer or controller 532, compressed air may be directed either into the first air input line 526 or the second air input line 527. When compressed air is directed into the first air input line 526, a piston 540 extends outwardly from within the pneumatic arm cylinder 520. Conversely, when compressed air is directed into the second air input line 527, the piston 540 contracts into the pneumatic arm cylinder 520.

Such cylinders are referred to as dual-acting cylinders since the piston 540 may be extended and contracted by application of compressed air into the appropriate air input line 526 or 527. Contraction and extension of the piston 540 causes the container removing arm 510 attached thereto to rearwardly and forwardly pivot with respect to the extension portion 508.

When the piston 540 is in a contracted position, the tray removing arm 510 is pivoted backwardly and displaced away from the tray 28, and does not interfere with the pivoting unloading document platform 18 as the unloading document platform rotates and pivots the tray 28 to align the documents 26 against the first and second reference surfaces 94 and 96. Once the documents 26 are properly aligned, the controller 532 directs the arm cylinder 520 to extend the piston 540, thus causing the tray removing arm 510 to forwardly pivot until it contacts the forward endwall 36 of the tray 28. The tray removing arm 510 then releasably engages the forward endwall 36 by actuating upper and lower clamps 544 and 546 to move toward each other and securely grip the tray 28. Sensing of coplanar contact between the tray removing arm 510 and the tray 28 may be accomplished using microswitches or equivalent sensing elements (not shown) to detect minimum and maximum positions, or may be accomplished by selective placement of the arm cylinder 520 accounting for the length of the piston 540 in its contracted and extended states, as is known in the art.

After the upper and lower clamps 544 and 546 have engaged the tray 28, the piston 540 of the arm cylinder 520 is directed to return to the contracted position. This causes the tray removing arm 510 to backwardly pivot causing the tray 28 to be removed from the first and second reference surfaces 94 and 96, thus leaving the aligned documents 26 disposed on the first and second reference surfaces.

Note that the container removing arm 510 may be operatively coupled to a pneumatic actuator, an hydraulic actuator, an electro-mechanical actuator or a servo-motor type actuator, as is known in the art. Any suitable means of pivotally displacing the container removing arm 510 may be used, including stepper motors, servo motors, hydraulic actuators, and the like.

The upper and lower clamps 544 and 546 in the illustrated embodiment are pivotally mounted to opposite ends of the tray removing arm 510 and are each secured thereto by a hinge-like mechanism 550. The hinge-like mechanism 550 permits the clamps 544 and 546 to reciprocally pivot to engage and securely grasp the tray 28 such that the tray is firmly secured between the two clamps 544 and 546. The upper clamp 544 and the lower clamp 546 are connected to dual-acting pneumatic clamp cylinders 554 and 556 by respective pistons 558 and 570.

Each clamp cylinder 554 and 556 is attached to the independent pneumatic switches 537 and 538 by air lines or hoses 580 and 582, respectively. For purposes of illustration only, the pneumatic manifold 524 is shown separated from the tray removing device 500, but in fact, is fixedly attached to the tray removing device and moves along therewith in the preferred embodiment.

As described above, the pneumatic switches 536, 537, and 538 are connected to the pneumatic manifold 524 and permit compressed air to be routed from the air compressor 528, through the air manifold 524, and into the proper input of each pneumatic cylinder 520, 554, or 556 to control contraction and extension of the pistons 540, 568, and 570, respectively. As shown in FIG. 8, the position of the pivoting unloading document platform 18 is shown after the documents 26 have been aligned with the first and second reference surfaces 94 and 96. The position of the pivoting unloading document platform 18 corresponds to the position of the pivoting unloading document platform shown in FIGS. 7H, 7I, and 7J, except that in FIG. 7J, the tray 28 is shown manually removed. FIG. 8 illustrates use of the tray removing device 500 to automatically remove the tray 28 without human intervention. This eliminates a significantly time-consuming manual labor step.

Figure 9:
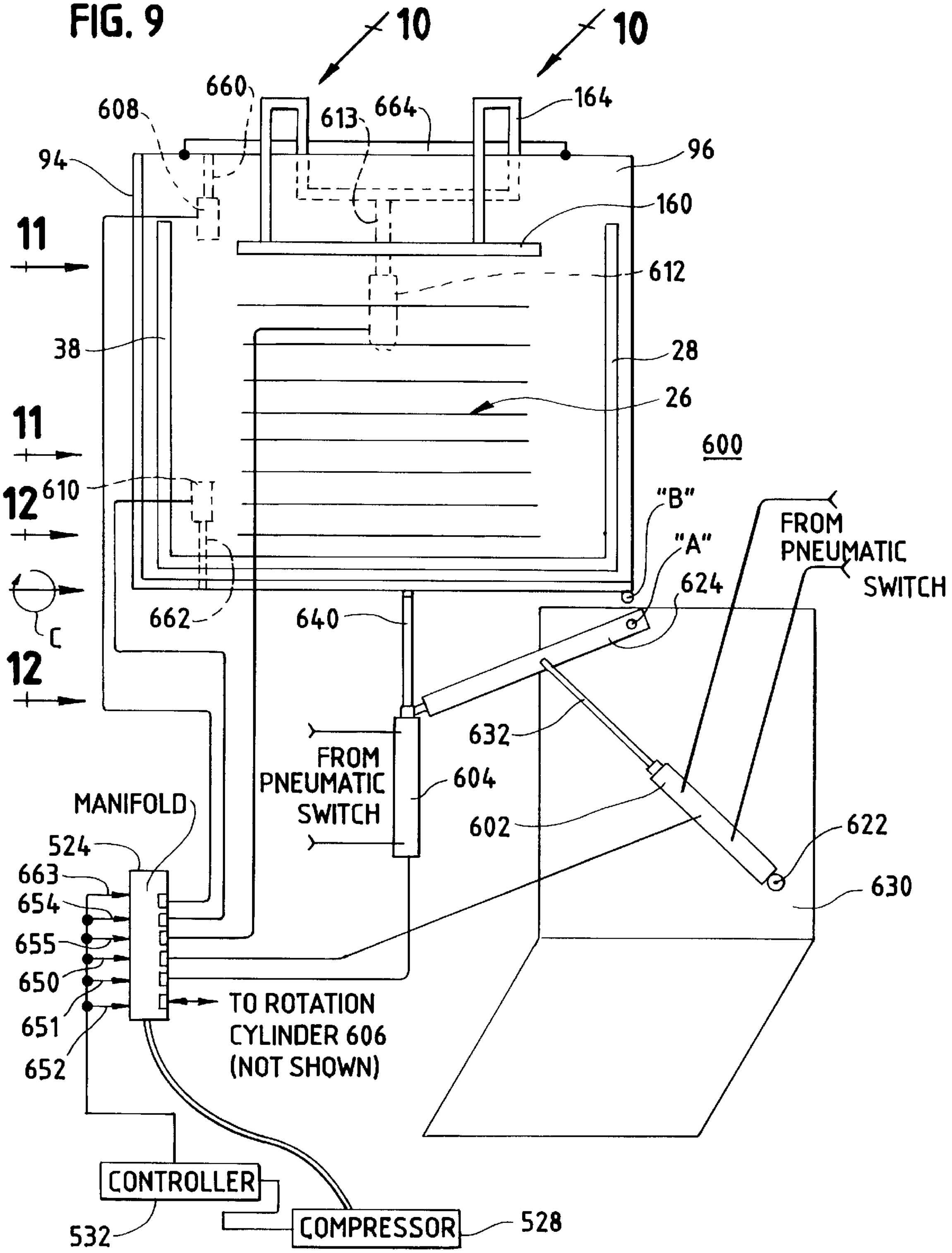
FIG. 9 is an elevational, partial section view of the alternate embodiment of a pivoting document unloading platform of FIG. 8 particularly showing pneumatic actuators and controllers used to automatically rotate and pivot the tray of documents.

Referring now to FIGS. 8 and 9, FIG. 9 illustrates an alternate embodiment of a fully automatic pivoting unloading document platform 600 preferably used in conjunction with the tray removing device 500 shown in FIG. 8. The automatic pivoting unloading document platform 600 is similar in function to the pivoting unloading document platform 18 shown in FIGS. 7A–7T and serves to pivot and rotate the tray 28 of documents 26 so that the documents are aligned toward the first and second reference surfaces 94 and 96. However, in the illustrated embodiment of FIG. 9, all such motions are fully automated and do not require human intervention. The automatic pivoting unloading document platform 600 is operatively coupled to the controller 532 and to an additional series of pneumatic switches to control extension and contraction of various pneumatic actuator pistons, as will be described in greater detail below.

Figure 12:
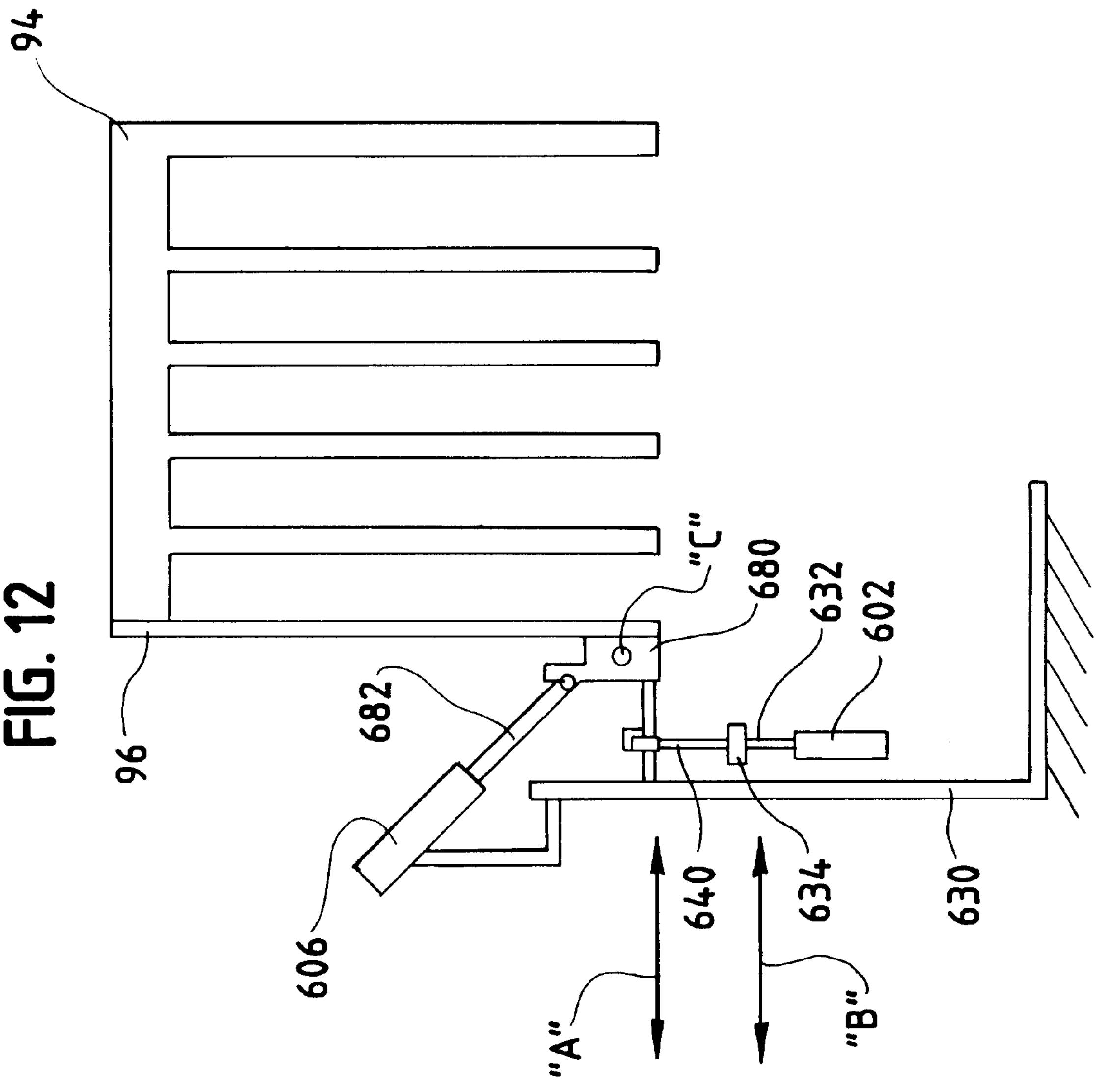
FIG. 12 is a side view of the reference surfaces taken along the line 12—12 of FIG. 9 in the direction generally indicated particularly illustrating the rotation cylinder.

The pivoting and rotational motions of the automatic pivoting unloading document platform 600 are determined by first and second dual-acting pneumatic pivot cylinders 602 and 604 and a dual-acting pneumatic rotation cylinder 606 (FIG. 12). An upper and lower dual-acting pneumatic clamp cylinder 608 and 610, and a dual-acting support paddle cylinder 612 are also included, as will be described below. Although not shown for purposes of clarity, each of the cylinders 602, 604, 606, 608, 610 and 612 are coupled to the pneumatic manifold 524 through individual pneumatic switches under direct control of the controller 532. Again, as described above with respect to FIG. 8, all cylinders are dual-acting cylinders and effect expansion and contraction of their respective pistons upon application of compressed air into the appropriate air input of the respective cylinders.

The first and second reference surfaces 94 and 96 pivot relative to a fixed flat base portion 620 (FIG. 8) which remains stationary and provides a non-movable fixed base upon which to initially place the tray 28 of documents. Placement of the tray 28 of documents on the flat base portion 620 is performed by the human operator. Once the tray 28 has been placed on the base portion 620, the pivoting unloading document platform 600 automatically pivots, and rotates the tray to align the documents 26 with the first and second reference surfaces 94 and 96. The tray 28 is then automatically removed by the tray removing device 500 and the pivoting unloading document platform 600 returns to its initial position so that additional trays of documents may be processed. The human operator may then release the captured tray 28 from the tray removing arm 510. A detailed explanation of this operation is set forth below.

Referring now to FIG. 9, first and second pivot cylinders 602 and 604 are mechanically coupled in series so that the first and second reference surfaces 94 and 96 can pivot up to about 135 to 165 degrees. The first pivot cylinder 602 has its lower end 622 pivotally mounted to a fixed frame 630 of the pivoting unloading document platform 600. A piston 632 extends from the first pivot cylinder 602 and is pivotally attached to a pivoting brace 634. The pivoting brace 634 is, in turn, pivotally mounted to the fixed frame 630 along a first pivot axis labeled "A", which is illustrated as a point. However, it is appreciated that the first pivot axis "A" is a linear axis disposed perpendicular to the drawing page. The second reference surface 96 is further pivotally attached to the pivoting brace 634 along a second pivot axis labeled "B", which is also illustrated as a point. Similarly, it is appreciated that the second pivot axis "B" is a linear axis disposed perpendicular to the drawing page and disposed parallel to the first pivot axis "A".

The first and second reference surfaces 94 and 96 are not mounted to the pivoting brace 634 directly at their bottom surfaces, as this would interfere with placement and pivoting movement of the tray 28. Rather, the pivoting brace 634 is indirectly coupled to the second reference surface 96 at a point behind its planar face, or leftward of the second reference surface so as not to interfere with the second reference surface.

The second pivot cylinder 604 is mounted to the end of the pivoting brace 634 and includes a piston 640 that extends therefrom. The piston 640 of second pivot cylinder 604 is mounted to the second reference surface 96 such that the second reference surface 96 can pivot along axis "B" as the piston 640 extends and contracts. Thus, the first and second reference surfaces 94 and 96 pivot about pivot axis "A" and about pivot axis "B" when the first and second pivot cylinders 602 and 604 are actuated, respectively. This series mounting of the cylinders 602 and 604 permits the first and second reference surfaces 94 and 96 to pivot through a large arc, for example, through an angle of about 165 degrees.

As illustrated in FIG. 9, the pistons 632 and 640 are shown in their most extended position. This places the first and second reference surfaces 94 and 96 in the initial starting position or rest position. This initial starting position is slightly different from the initial starting position of the first and second reference surfaces 94 and 96 illustrated in FIG. 7A. In this alternate embodiment, the initial starting position is equivalent to the position shown in FIG. 7B such that the first reference surface 94 is already parallel and coplanar to the rear endwall 38 of the tray 28. The operator need only place the tray 28 on the flat base platform 620 (FIG. 8) so that it essentially fits into the "corner" defined by the intersection of the first and second reference surfaces 94 and 96.

Contraction of the piston 632 into the first pivot cylinder 602 causes the first and second reference surfaces 94 and 96 to backwardly pivot (counter-clockwise) through an angle of about ninety degrees. Further backward pivoting of about forty-five degrees occurs when the piston 640 of the second pivot cylinder 604 contracts into cylinder 604. The first and second reference surfaces 94 and 96 thus may pivot through a total arc of about 165 degrees. The controller 532 directs the first and second pivot cylinders 602 and 604 to extend and contract their respective pistons 632 and 640, thus causing the reference surfaces 94 and 96 to forwardly and backwardly pivot.

Figure 11:
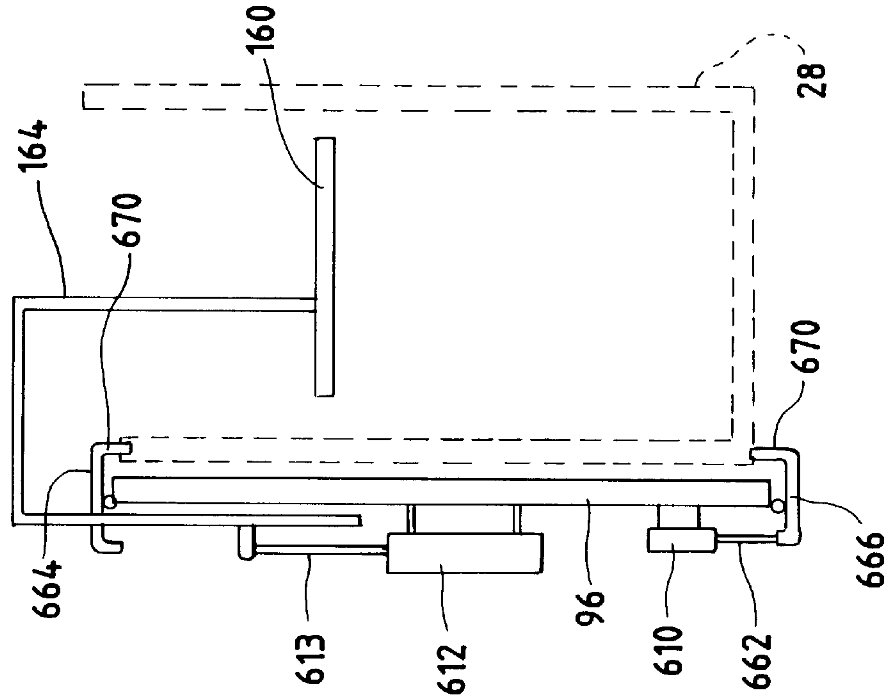
FIG. 11 is a side view of the second reference surface taken along the line 11—11 of FIG. 9 in the direction generally indicated.
Figure 10:
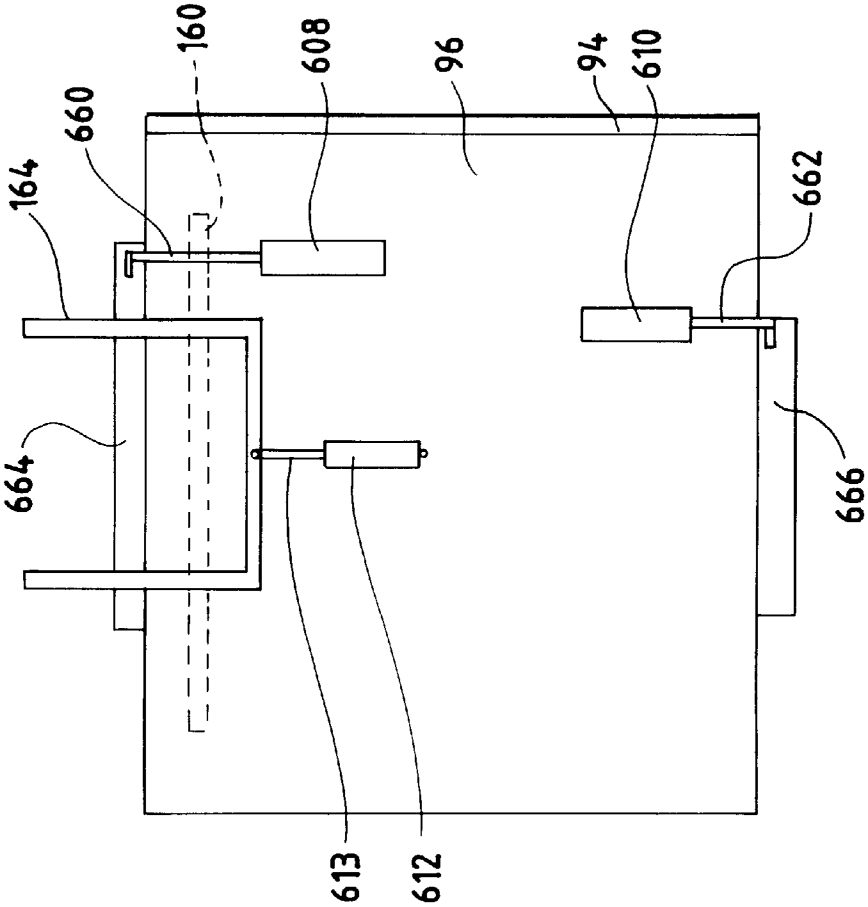
FIG. 10 is a rear plan view of the second reference surface taken along the line 10—10 of FIG. 9 in the direction generally indicated.

Referring now to FIGS. 8–11, FIGS. 10–11 illustrate rear and side views, respectively, of the first and second reference surfaces 94 and 96 and associated pneumatic cylinders 608, 610, and 612 attached thereto. For purposes of clarity, FIG. 11 shows only the support paddle cylinder 612 and the lower clamp cylinder 610. The support paddle 160 is formed as a generally rectangular plate which is reciprocally displaced toward the bottom of the tray 28 so that documents 26 contained in the tray are slightly compressed. The "U-shaped" slider arm 164 is fixedly attached to the support paddle 160 and extends along the rear face of the second reference surface 96 where it attaches to piston 613 of the paddle cylinder 612.

Each of the pneumatic cylinders including the first and second pivot cylinders 602 and 604, the rotation cylinder 606, the upper and lower clamp cylinders 608 and 610, and the paddle cylinder 612 is connected to the pneumatic manifold 524 through individual pneumatic switches (not shown), the function of which is under control of the controller 532 (FIGS. 8, 9). The controller 532 supplies six additional control signals 650–655 to control the above-described pneumatic cylinders 602, 604, 606, 608, 610 and 612 (FIG. 9) via the pneumatic switches (not shown).

The clamp cylinders 608 and 610 each include pistons 660 and 662 attached to upper and lower tray securing clamps 664 and 666. The upper and lower tray securing clamps 664 and 666 are pivotally attached to the second reference surface 96 and pivot relative thereto when the clamp cylinder pistons 660 and 662 extend and contract, respectively. Each tray securing clamp 664 and 666 has a curved hook-like end portion 670, best seen in FIG. 11. When the upper and lower clamp cylinders 608 and 610 are actuated, the corresponding clamp cylinder pistons 660 and 662 extend, and the hook-like portions 670 engage the tray 28 (shown in dashed lines in FIG. 11) to firmly secure the tray to the first and second reference surfaces 94 and 96. In this manner, the tray 28 remains secured to the reference surfaces 94 and 96 as the reference surfaces are pivoted and rotated.

Referring now to FIGS. 9–12, FIG. 12 illustrates use of the rotation cylinder 606 to effect rotation of the first and second reference surfaces 94 and 96. Rotation of the first and second reference surfaces 94 and 96 is similar to rotation of the reference surfaces shown in FIGS. 7H and 7I except that in this alternate embodiment, such rotation is effected by the rotation cylinder 606 under control of the controller 532 and is thus, automatic. As described above with respect to FIG. 9, the second reference surface 96 is indirectly coupled to the pivoting brace 634 and pivots relative thereto about pivot axes "A" and "B". Pivot axes "A" and "B" are also shown in FIG. 12 but appear as horizontal lines since the axes are viewed from the side.

Additionally, the reference surfaces 94 and 96 rotate about a rotation axis, referred to as "C" (FIG. 12) which is disposed at a ninety degree angle relative to the pivot axes "A" and "B". To effect such rotation about the rotation axis "C", each of the pivot axes "A" and "B" are attached toward the edge of the second reference surface 96 with a hinge mechanism 680. The hinge mechanism 680 permits the reference surfaces 94 and 96 to rotate relative to the pivot axes "A" and "B" (FIG. 9).

The rotation cylinder 606 includes a piston 682 which is attached to the hinge mechanism 680. Contraction of the rotation cylinder piston 682 into cylinder 606 causes the first and second reference surfaces 94 and 96 to rotate leftwardly (as shown) through about a forty-five degree angle. Similarly, extension of the rotation cylinder piston 682 causes the first and second reference surfaces 94 and 96 to rotate rightwardly through about a forty-five degree angle. Again, all such rotation is under direction of the controller 532 which controls the appropriate pneumatic switch (not shown) via the control lines 650–655 (FIG. 9).

Note that any or all of the cylinders, including the first and second pivot cylinders 602 and 604, the rotation cylinder 606, the upper and lower clamp cylinders 608 and 610, and the paddle cylinder 612 may be pneumatic actuators, hydraulic actuators, electro-mechanical actuators, servo-motor type actuators and the like, as is known in the art.

Note that the pivoting unloading document platform 600 according to the illustrated alternate embodiment shown in FIGS. 8–12 executes the same motions, such as pivoting and rotation, as the pivoting unloading document platform 18 shown in FIGS. 7B–7J.

Figure 13:
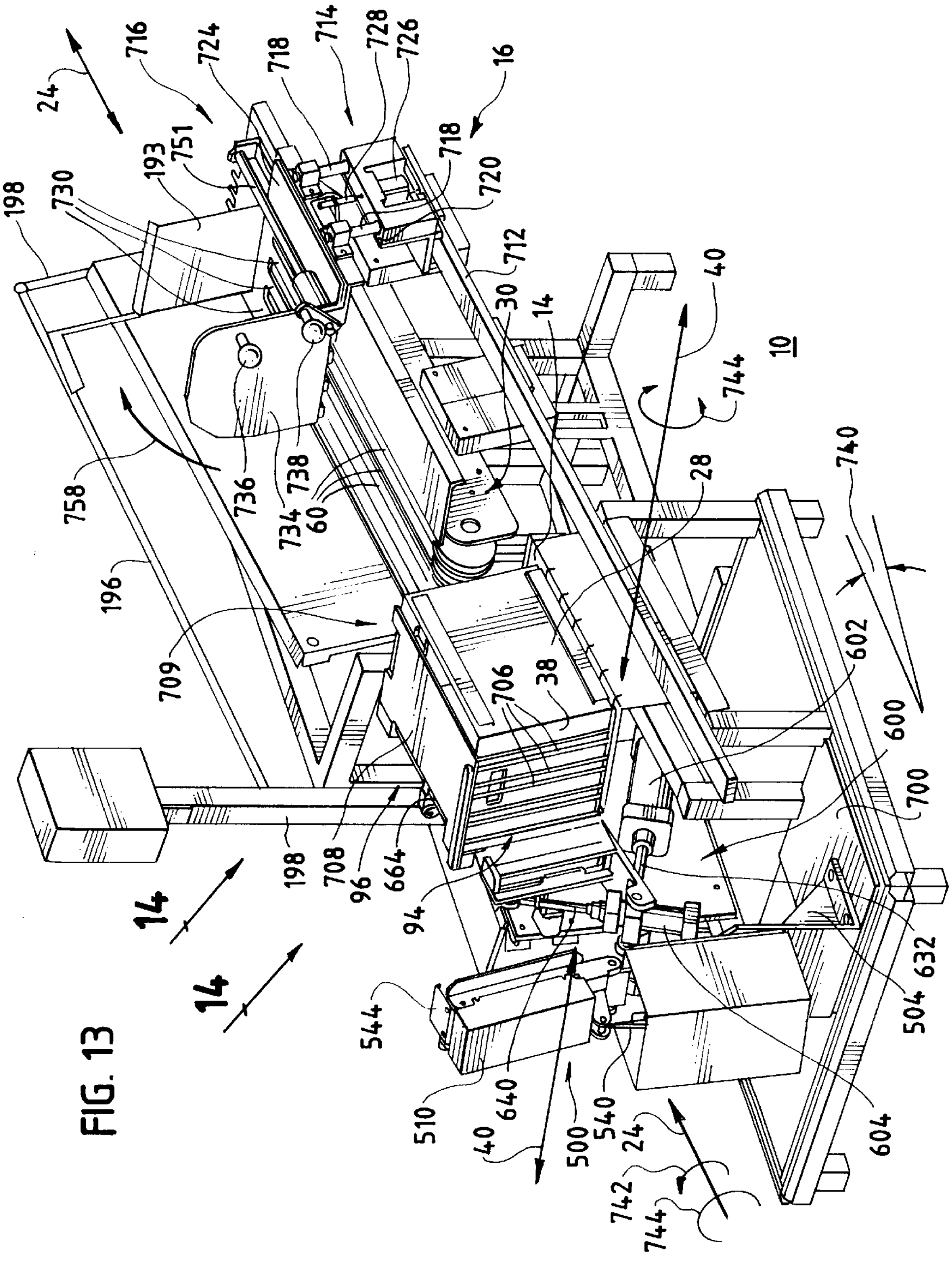
FIG. 13 is a perspective view of an alternate embodiment of the pivoting document unloading platform of FIG. 8, shown in operative association with a tray removing device, a feed ramp, and an in-feed management system.
Figure 14:
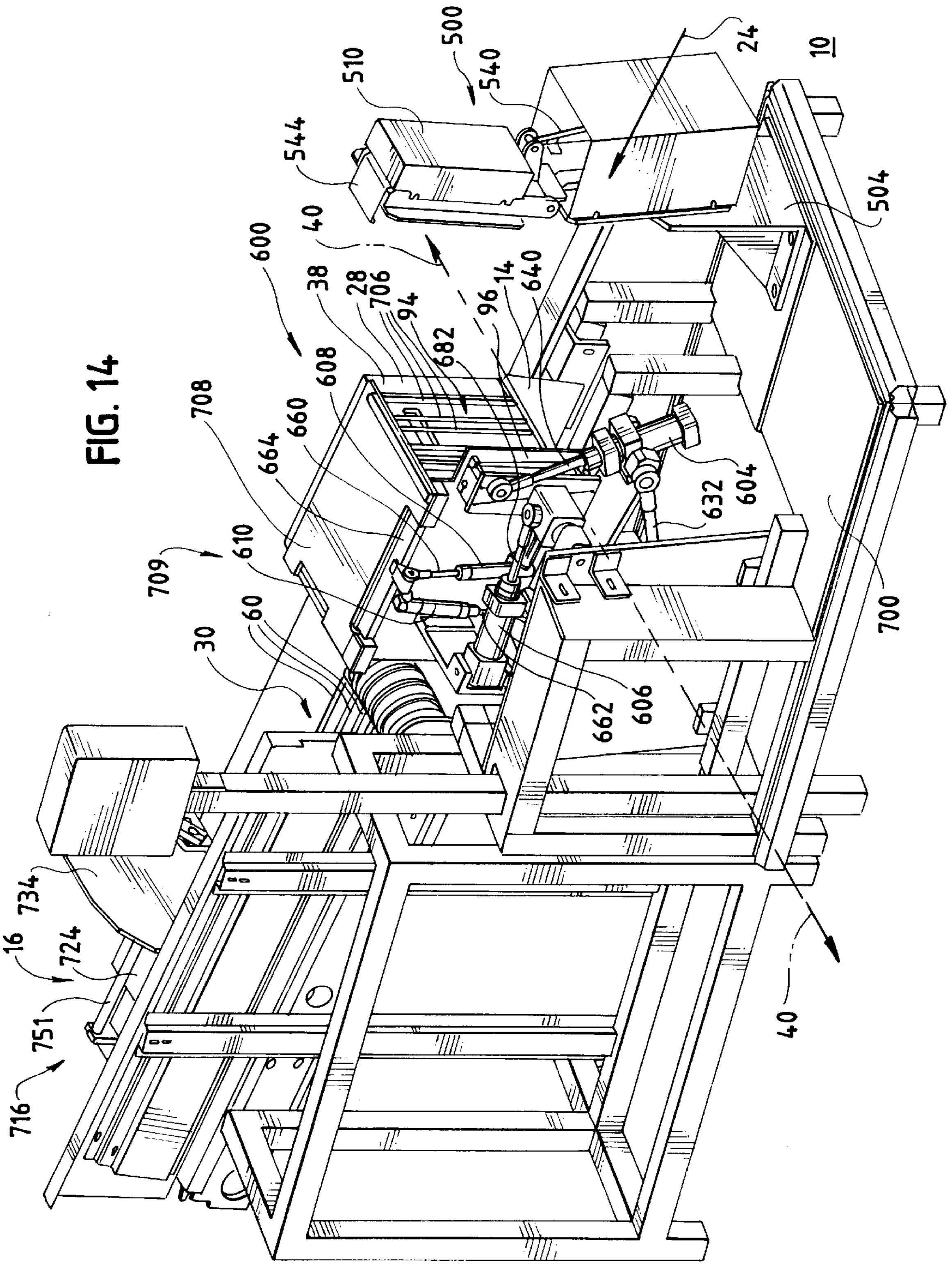
FIG. 14 is a perspective view of the alternate embodiment of FIG. 13 taken along the line 14—14 of FIG. 13 in the direction generally indicated.
Figure 15:
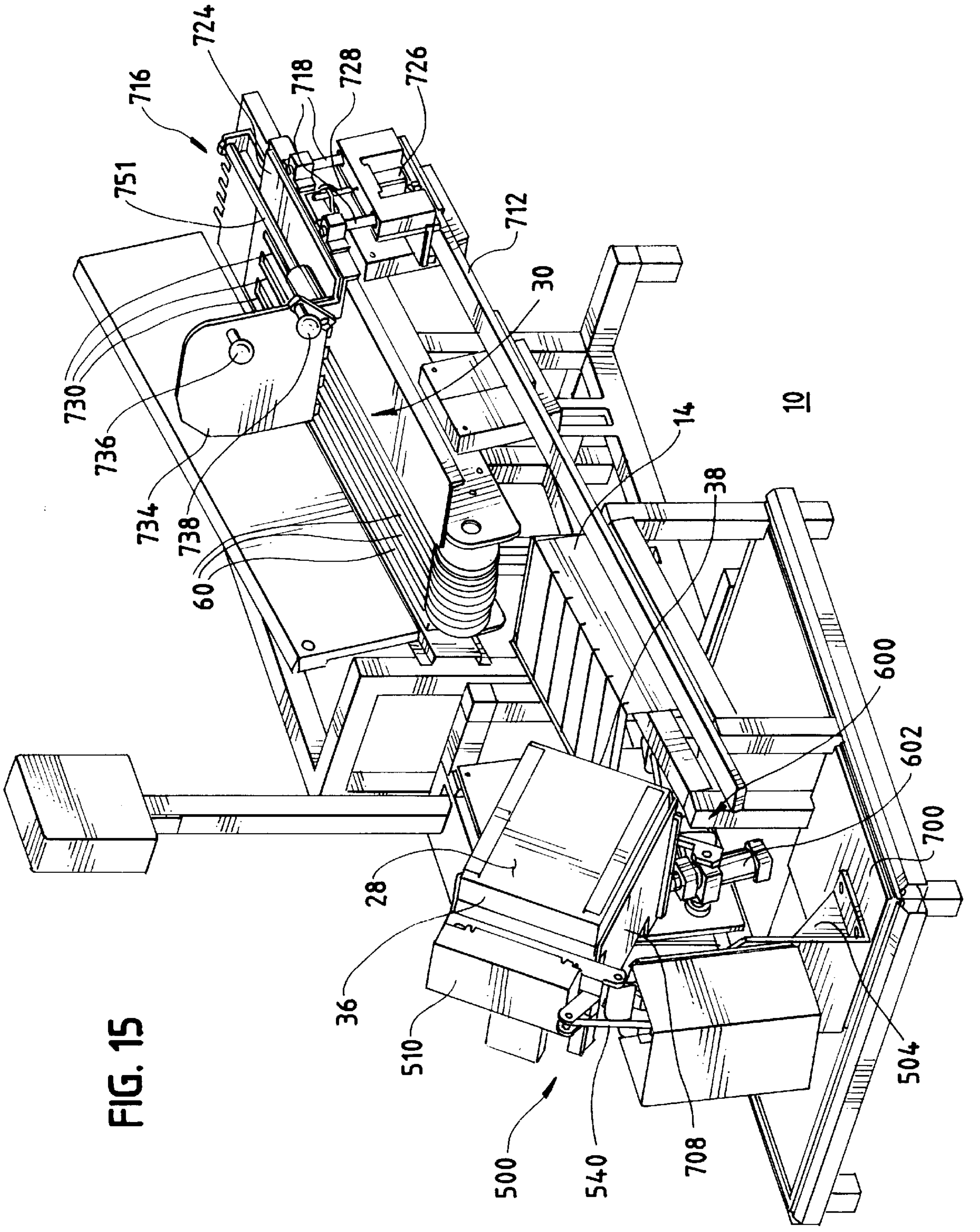
FIG. 15 is a perspective view of the alternate embodiment shown in FIG. 13 illustrating the tray removal device engaging the tray.

Referring now to FIGS. 13–15, an alternate embodiment of the apparatus 10 (FIG. 1) is shown where like reference numerals are used to identify like structures. In this embodiment, the tray removing device 500 is shown attached to the base portion 504 which is, in turn, fixedly mounted to a base platform 700 for stability and ease of manufacturing. The tray removing device 500 may be the same device as shown in FIGS. 8–12, or a similar device.

The automatic pivotal unloading platform 600 of FIGS. 13–15 is similar to the automatic pivotal unloading platform shown in FIGS. 9–12 with a few modifications, as will be described hereinafter. The first reference surface 94 is formed as a plurality of tubular rods 706 which provides a surface upon which the documents (not shown) are eventually disposed. The tubular rods 706 serve the same function as the spaced apart support fingers 180 of the first reference surface 94 shown in FIG. 1. Any suitable spaced apart support structure may be used.

The automatic pivotal unloading platform 600 does not include the support paddle 160 which is included in the embodiment shown in FIG. 1. Instead, a tray cover 708 is highly mounted to the second reference surface 96 and serves the same function as the support paddle 160. The tray cover 708 simply covers an open end 709 of the tray 28 to prevent the documents from falling out when pivoting and rotational movements are performed. The tray cover 708 also supports the documents when the documents are oriented in an on-edge vertical position on the first reference surface 94, as will be described hereinafter. The tray cover 708 is preferably manually engaged. The operator manually closes the tray cover 708 which remains fixed in place by a releasable latch (not show). Alternately, the tray cover 708 may be under control of the controller 532 (FIG. 8) which activates a pneumatic cylinder (not shown) to open and close the tray cover.

The in-feed management system 16 is different in structure from the in-feed management system shown in the embodiment of FIG. 5, although its function is similar. The in-feed management system 16 of FIGS. 13–15 includes a flat longitudinal guide member 712 disposed in a parallel and spaced apart orientation relative to the feed ramp 30, a mounting assembly 714, and a loading sled assembly 716. The mounting assembly 714 is configured to longitudinally slide along the guide member 712 under manual force applied by the user. Suitable bearings (not shown) permit the mounting assembly 714 to smoothly slide along the guide member 712 so that the loading sled assembly 716 slides along the top surface of the feed ramp 30 without contacting the conveyor belts 60.

The loading sled assembly 716 is mounted to the mounting assembly by two shafts 718 operatively received within cylindrical receptacles 720 of the mounting assembly 714. The shafts 718 are configured to extend and contract relative to the mounting assembly 714 to permit the loading sled assembly 716 to be vertically displaced. This facilitates raising and lowering a sled base 724 relative to the toothed conveyor belts 60 of the feed ramp 30. Note that in this illustrated embodiment, the sled base 724 rides just above the conveyor belts 60 and cannot be recessed below the surface of the conveyor belts, as is possible in the embodiment shown in FIG. 5. A sled base pneumatic cylinder 726, directed by the controller 532 (FIG. 8), extends and contracts a piston 728, which in turn causes the sled base 724 to raise and lower respectively, relative to the feed ramp 30.

The sled base 724 is formed from a plurality of gripping fingers 730 in a spaced apart longitudinal configuration. The gripping fingers 730 are arranged to be in alternating alignment with the tubular rods 706 of the first reference surface 94. The sled base 724 provides a base upon which the on-edge vertically oriented documents rest when transported from the pivotal unloading platform 600 to the feed ramp 30, as will be described in greater detail hereinafter.

The loading sled assembly 716 also includes a pivotally mounted rear paddle 734, a rear paddle handle 736, and a sled handle 738 for facilitating manual longitudinal movement of the loading sled assembly 716. The feed ramp 30 includes the forward paddle 193 that is slidingly mounted on the guide shaft 196. The guide shaft 196, in turn, is supported between the upright brackets 198, as is shown in greater detail in FIG. 1.

In operation, the sequence of steps performed in this embodiment is similar to the sequence of steps illustrated in FIGS. 7A–7V, with minor differences primarily directed toward the loading sled assembly. Initially, the documents are stacked within the tray 28 and the tray is placed on the tray platform 14 at a rest or a starting position. The tray platform 14 provides a stable surface upon which to place the tray 28. As described previously with respect to FIGS. 1–12, the tray platform 14, the feed ramp 30, and the pivoting unloading platform 600 are all horizontally in-line and are inclined preferably at about an eight degree angle relative to the floor, as shown by arrow 740 (not drawn to scale). Note that the tray platform 14, the feed ramp 30, and the pivoting unloading platform 600 are also rotated backwardly about the longitudinal axis 24 at a fixed angle of about eight degrees, as shown by arrow 742.

Next, the tray 28 containing the documents is placed on the tray platform 14 such that it essentially fits into the corner defined by the first and second reference surfaces 94 and 96. In this manner, the first reference surface 94 contacts the rear endwall 38 of the tray 28 and maintains planar communication with the rear endwall. The tray cover 708 is then rotated so that it covers the open end 709 of the tray 28.

A first sensor, operatively associated with the controller 532 (FIG. 8), senses when the tray 28 is in the correct position, and causes the controller to actuate the upper and lower clamp cylinders 608 and 610 (FIG. 14). This causes the corresponding clamp cylinder pistons 660 and 662 to extend, thus causing the upper and lower tray securing clamps 664 and 666 (FIG. 10) to engage the tray 28 to firmly secure the tray to the first and second reference surfaces 94 and 96. In this manner, the tray 28 remains secured to the reference surfaces 94 and 96 as the reference surfaces are pivoted and rotated.

Next, the first and second reference surfaces 94 and 96 and the tray 28 are simultaneously pivoted backwardly through an angle of about forty-five degrees about the primary axis 40 to effect registration of the documents toward the first reference surface (see FIG. 7D). In this position, first common edges of the documents are in planar alignment with the first reference surface 94 and with the rear endwall 38 of the tray 28. The first and second reference surfaces 94 and 96 are then further backwardly pivoted through an additional angle of about ninety degrees (see FIG. 7F) for a total amount of backward pivoting through an angle of about one-hundred and thirty-five degrees.

Next, the first and second reference surfaces 94 and 96 are rotated leftwardly about the longitudinal axis 24 along with the tray 28 and the documents, as shown by arrow 744 (FIG. 13). Such leftward rotation effects registration of the documents toward the second reference surface 96 (see FIG. 7H). In this position, the reference surfaces 94 and 96 and the tray 28 containing the documents have been backwardly pivoted and leftwardly rotated so that the documents are registered toward the first and second reference surfaces and against the face of the tray cover 708 by the affect of gravity acting on the weight of the documents.

Once the documents are properly aligned, the controller 532 (FIG. 8) directs the arm cylinder 520 (FIG. 8) of the tray removing device 500 to extend the piston 540, thus causing the tray removing arm 510 to forwardly pivot until it contacts the forward endwall 36 of the tray 28, as shown in FIG. 15. The tray removing arm 510 then releasably engages the forward endwall 36 by actuating upper and lower clamps 544 and 546 (FIGS. 8 and 13) to move toward each other and securely grip the tray 28.

Next, the piston 540 is returned to the contracted position causing the tray removing arm 510 to backwardly pivot. This removes the tray 28 in a upward arching direction from the first and second reference surfaces 94 and 96, thus leaving the aligned documents disposed on the first and second reference surfaces (see FIG. 7J). Since the documents have been pivoted backwardly and rotated leftwardly, they remain in position and cannot fall over. A second sensor (not shown) informs the controller 532 (FIG. 8) when the tray 28 has been removed from the first and second reference surfaces 94 and 96.

After the tray 28 has been removed from the first and second reference surfaces 94 and 96 by the tray removing arm 510, the first and second reference surfaces and the plurality of documents are rightwardly rotated about the longitudinal axis 24 (see FIG. 7K). The degree of rightward rotation is essentially equal to the degree of previous leftward rotation 744, as illustrated in FIG. 7H.

Next, the first and second reference surfaces 94 and 96 and the plurality of documents are forwardly pivoted about the primary axis 40, as shown by arrow 744 (FIG. 15). The degree of further forward pivoting places the first reference surface 94 in a coplanar relationship with the feed ramp 30, which is inclined at the eight degree angle, as previously described (see FIG. 7L). Therefore, if the tray 28 and the first and second reference surfaces 94 and 96 were initially backwardly pivoted through an angle of one-hundred and thirty-five degrees, forward pivoting through an angle of about forty-five degrees would leave the documents in an on-edge vertical position with the first reference surface in a coplanar relationship with the feed ramp 30. Note that with this position, the tray cover 708 is vertically oriented and functions to support the rear portion of the on-edge documents. Note that the documents remain in an upright position and do not fall forward due to the eight degree incline of the apparatus 10, generally. At this point, the documents are in an on-edge orientation ready to be transported to the feed ramp 30 for further processing.

The operator then backwardly displaces the loading sled assembly 716 by grasping the handle 738 so that the loading sled assembly slides backwardly toward the documents. Note, that the loading sled assembly 716 is sufficiently vertically elevated such that it clears the tray platform 14 during rearward displacement to achieve positioning just under the first reference surface 94. In this position, the loading sled assembly 716 and the associated gripping fingers 730 are positioned just beneath the first reference surface 94. A third sensor (not shown) informs the controller 532 (FIG. 8) that the loading sled assembly 716 is operatively disposed just under the first reference surface 94. The controller then activates the sled base pneumatic cylinder 726 which vertically raises the loading sled base 724 and associated gripping fingers 730. As the gripping fingers 730 are elevated and pass in between the tubular rods 706, the lower edge of the documents are raised above the level of the tubular rods and rest upon the griping fingers 730 of the loading sled base 724.

Next, the rear paddle 734 of the loading sled assembly 716 is upwardly rotated, as shown by arrow 750 in FIG. 13, and rearwardly displaced along a sled paddle shaft 751 toward the back end of the documents. The rear paddle 734 is then downwardly rotated so that it is "wedged" between the tray cover 708 and the rear portion of the stack of documents. The rear paddle 734 now supports the back end of the documents. The user then grasps the sled handle 738 and forwardly displaces the loading sled assembly 716 so that the on-edge vertically aligned documents are disposed over the conveyor belts 60 and are slightly elevated above the belts.

At some point prior to or coincident with the above step, the operator has removed the tray 28 from the tray removing arm 510. The second sensor (not shown), sensing removal of the tray, in conjunction with the third sensor (not shown), sensing displacement of the loading sled assembly 716 away from the pivoting unloading platform 600, causes the controller 532 (FIG. 8) to reset the position of the pivotal unloading device back to the starting position. Thus, the controller 532 (FIG. 8) returns the first and second reference surfaces 94 and 96 to the original position where another tray 28 may be placed on the first reference surface.

The front paddle 193 is then upwardly rotated and backwardly displaced along the guide shaft 196 so that it is wedged between the rear paddle 734 and the rearmost document of the stack of documents which is disposed on the sled base 723 just above the moving conveyor belts 60. The forward paddle 193 now supports the back end of the documents rather than the sled paddle 734. The operator then forwardly displaces the forward paddle 193 to essentially slide the documents off of the sled base 724 and onto the moving conveyor belts 60 where the documents are forwardly transported in an upright position and in the forward direction by movement of the conveyor belts. As shown in FIG. 13, the forward paddle 193 moves along with the stack of documents as the conveyor belts 60 move. Although not explicitly shown in FIG. 15, for purposes of clarity only, the forward paddle 193 is included and is under "tractor-feed" control, as is similar to the front paddle shown in FIG. 1.

Specific embodiments of a pivotal tray unloading apparatus according to the present invention have been described for the purpose of illustrating the manner in which the invention may be made and used. It should be understood that implementation of other variations and modifications of the invention and its various aspects will be apparent to those skilled in the art, and that the invention is not limited by these specific embodiments described. It is therefore contemplated to cover by the present invention any and all modifications, variations, or equivalents that fall within the true spirit and scope of the basic underlying principles disclosed and claimed herein.

What is claimed is:

1. An apparatus for automatically removing a generally rectangular container from an unloading device, the container having a bottom surface, upstanding sidewalls and forward and rear endwalls, the apparatus comprising in combination:

an unloading device having a first generally planar reference surface and a second generally planar reference surface associated with the first reference surface at a substantially right angle, said reference surfaces adapted to pivot and rotate to cause first and second edges of documents previously disposed in the container to be placed upon and to be aligned with and registered toward the first and second reference surfaces, respectively;

a device for removing the generally rectangular container comprising:

(a) a base portion to support the container removing apparatus;

(b) a container removing arm pivotally attached to the base portion configured to releasably engage the container and remove the container from the first and second reference surfaces once the documents are registered toward the reference surfaces;

(c) container engaging means operatively connected to the container removing arm, said container engaging means arranged to contact and releasably engage at least one of the bottom surface, the upstanding sidewalls, the forward endwall, and the rear endwall of the container;

(d) powered means for pivotally displacing the container removing arm relative to the reference surfaces; and (e) a controller operatively coupled to the powered means to selectively control forward and backward pivoting of the container removing arm, said controller operatively coupled to the container engaging means to selectively control engagement of the container engaging means with the container such that backward pivoting of the container removing arm while the container engaging means engage the container facilitates removal of the container from the unloading device.

2. The apparatus according to claim 1 wherein the powered means is an arm actuator operatively coupled to the container removing arm and is responsive to signals provided by the controller, said signals causing the container removing arm to alternately pivot in the forward and backward direction.

3. The apparatus according to claim 2 wherein the arm actuator is selected from the group of actuators consisting of pneumatic actuators, hydraulic actuators, electromechanical actuators, and servo-motor actuators.

4. The apparatus according to claim 1 wherein the container engaging means comprises at least one clamp, and further includes at least one clamp actuator operatively coupled to the at least one container engaging clamp and responsive to signals provided by the controller, said signals causing the at least one container engaging clamp to alternately release and engage the container.

5. The apparatus according to claim 4 wherein the at least one clamp actuator is selected from the group of actuators consisting of pneumatic actuators, hydraulic actuators, electro-mechanical actuators, and servo-motor actuators.

6. An apparatus for automatically removing a generally rectangular container from an unloading device, the container having a bottom surface, upstanding widewalls and forward and rear endwalls, the apparatus comprising in combination:

an unloading device having a first generally planar reference surface and a second generally planar reference surface associated with the first reference surface at a substantially right angle, said reference surfaces adapted to pivot and rotate to cause first and second edges of documents previously disposed in the container to be placed upon and to be aligned with and registered toward the first and second reference surfaces, respectively;

a device for removing the generally rectangular container comprising:

(a) a base portion to support the container removing apparatus;

(b) a container removing arm pivotally attached to the base portion configured to releasably engage the container and remove the container from the first and second reference surfaces once the documents are registered toward the reference surfaces;

(c) container engaging clamps operatively connected to the container removing arm, said container engaging clamps arranged to contact and releasably engage at least one of the bottom surface, the upstanding sidewalls, the forward endwall, and the rear endwall of the container; and (d) means for pivotally displacing the container removing arm to selectively control forward and backward pivoting of the container removing arm, such that backward pivoting of the container removing arm while the container engaging clamps engage the container facilitates removal of the container from the unloading device.

7. An apparatus for unloading a plurality of generally rectangular documents onto a feed ramp, said documents disposed in a generally rectangular container, the container having a bottom surface, upstanding sidewalls and forward and rear endwalls, the apparatus comprising:

a first generally planar reference surface;

a second reference surface fixedly attached to the first reference surface at substantially a right angle;

a container cover operatively coupled to at least one of said first and second reference surfaces;

said first and second reference surfaces configured to pivot as a unit forwardly and backwardly about a primary axis, said primary axis defined to be coaxial with a common edge of the bottom surface and the rear endwall of the container;

at least one clamp attached to at least one of the first and second reference surfaces, said at least one clamp configured to releasably engage the container to secure the container to the reference surfaces;

said forward and backward pivoting of the reference surfaces adapted to effect registration of the plurality of documents toward the first reference surface such that first common edges of the documents are in planar alignment with the first reference surface;

said first and second reference surfaces configured to rotate in a first and second direction about a longitudinal axis, said longitudinal axis defined to be perpendicular to the primary axis;

said rotation of the reference surfaces in the first direction adapted to effect registration of the plurality of documents toward the second reference surface such that second common edges of the documents are in planar alignment with the second reference surface, said second common edges being perpendicular to the first common edges;

said rotation in the second direction and further pivoting of the reference surfaces adapted to effect positioning of the documents in an on-edge orientation having said first and second common edges in registration with the first and second reference surfaces, respectively, said first reference surface being in a generally coplanar relationship with the feed ramp; and a container removing arm configured to releasably engage the container and remove the container from the first and second reference surfaces after the documents are registered against the first and second reference surfaces and the at least one clamp releases the container.

8. The apparatus according to claim 7 wherein the container removing arm includes at least one container clamp mounted thereto to releasably engage a portion of the container.

9. The apparatus according to claim 7 further including a controller, said controller operatively coupled to a pivot control actuator to selectively control pivoting of the first and second reference surfaces in the forward and backward directions, said controller operatively coupled to a rotation control actuator to selectively control the rotation of the first and second reference surfaces in the first and second directions, said controller operatively coupled to a clamp control actuator to releasably control engagement of the at least one clamp disposed on the reference surfaces, and said controller operatively coupled to an arm control actuator disposed on the container removing arm to selectively control displacement of the container removing arm.

10. The apparatus according to claim 9 wherein at least one of the pivot control actuator, the rotation control actuator, the clamp control actuator, and the arm control actuator are selected from the group of actuators consisting of pneumatic actuators, hydraulic actuators, electromechanical actuators, and servo-motor actuators.

11. The apparatus according to claim 9 wherein the pivot control actuator is a pneumatic actuator operatively coupled to at least one of the first and second reference surfaces, said pivot control actuator configured to effect pivoting of the first and second reference surfaces in the forward and backward directions.

12. The apparatus according to claim 9 wherein the rotation control actuator is a pneumatic actuator operatively coupled to at least one of the first and second reference surfaces, said rotation control actuator configured to rotate the first and second reference surfaces in the first and second directions.

13. The apparatus according to claim 9 wherein the clamp control actuator is a pneumatic actuator operatively coupled to the at least one clamp, said at least one clamp pivotally attached to at least one of the first and second reference surfaces, said clamp control actuator configured to pivotally displace the clamps such that the clamps releasably engage the container to secure the container to the reference surfaces.

14. The apparatus according to claim 9 wherein the arm control actuator is a pneumatic actuator operatively coupled to the container removing arm, said arm control actuator configured to pivotally displace the container removing arm to facilitate removal of the container from the first and second reference surfaces.

15. The apparatus according to claim 9 wherein the controller is operatively coupled to a pneumatic cover actuator, said pneumatic cover actuator operatively coupled to the container cover to facilitate sealing of the container such that documents are retained within the container during said pivoting and rotating of the first and second reference surfaces.

16. An apparatus for automatically removing a generally rectangular container from an unloading device that places the container in a predetermined position, the container having a bottom surface, upstanding sidewalls and forward and rear endwalls, the apparatus for removing the generally rectangular container comprising:

a base portion to support the apparatus;

a container removing arm pivotally attached to the base portion configured to releasably engage the container and remove the container from the unloading device;

container engaging clamps operatively connected to the container removing arm, said clamps arranged to contact and releasably engage at least one of the bottom surface, the upstanding sidewalls, the forward endwall, and the rear endwall of the container;

powered means for pivotally displacing the container removing arm relative to the unloading device; and a controller operatively coupled to the powered means to selectively control forward and backward pivoting of the container removing arm, said controller operatively coupled to the container engaging clamps to selectively control engagement of the container engaging clamps such that backward pivoting of the container removing arm while the container engaging clamps engage the container facilitates removal of the container from the unloading device.

17. The apparatus according to claim 16 wherein the powered means is an arm actuator operatively coupled to the container removing arm and responsive to signals provided by the controller, said signals causing the container removing arm to pivot in the forward and backward direction.

18. The apparatus according to claim 17 wherein the arm actuator is selected from the group of actuators consisting of pneumatic actuators, hydraulic actuators, electromechanical actuators, and servo-motor actuators.

19. The apparatus according to claim 16 further including a clamp actuator operatively coupled to the container engaging clamps and responsive to signals provided by the controller, said signals causing the clamps to releasably engage the container.

20. A method for automatically removing a generally rectangular container from an unloading device that places the container in a predetermined position, the container having a bottom surface, upstanding sidewalls and forward and rear endwalls, the method comprising the steps of:

forwardly pivoting a container removing arm to releasably engage the container placed in the predetermined position;

engaging container clamps operatively connected to the container removing arm, said container clamps arranged to contact and releasably engage at least one of the bottom surface, the upstanding sidewalls, the forward endwall, and the rear endwall of the container;

backwardly pivoting the container removing arm while the container clamps engage the container, said backward pivoting displacing the container from the predetermined position to a removal position;

disengaging the container clamps from the container; and removing the container from the container removing arm.

* * * * *